Figure 1:
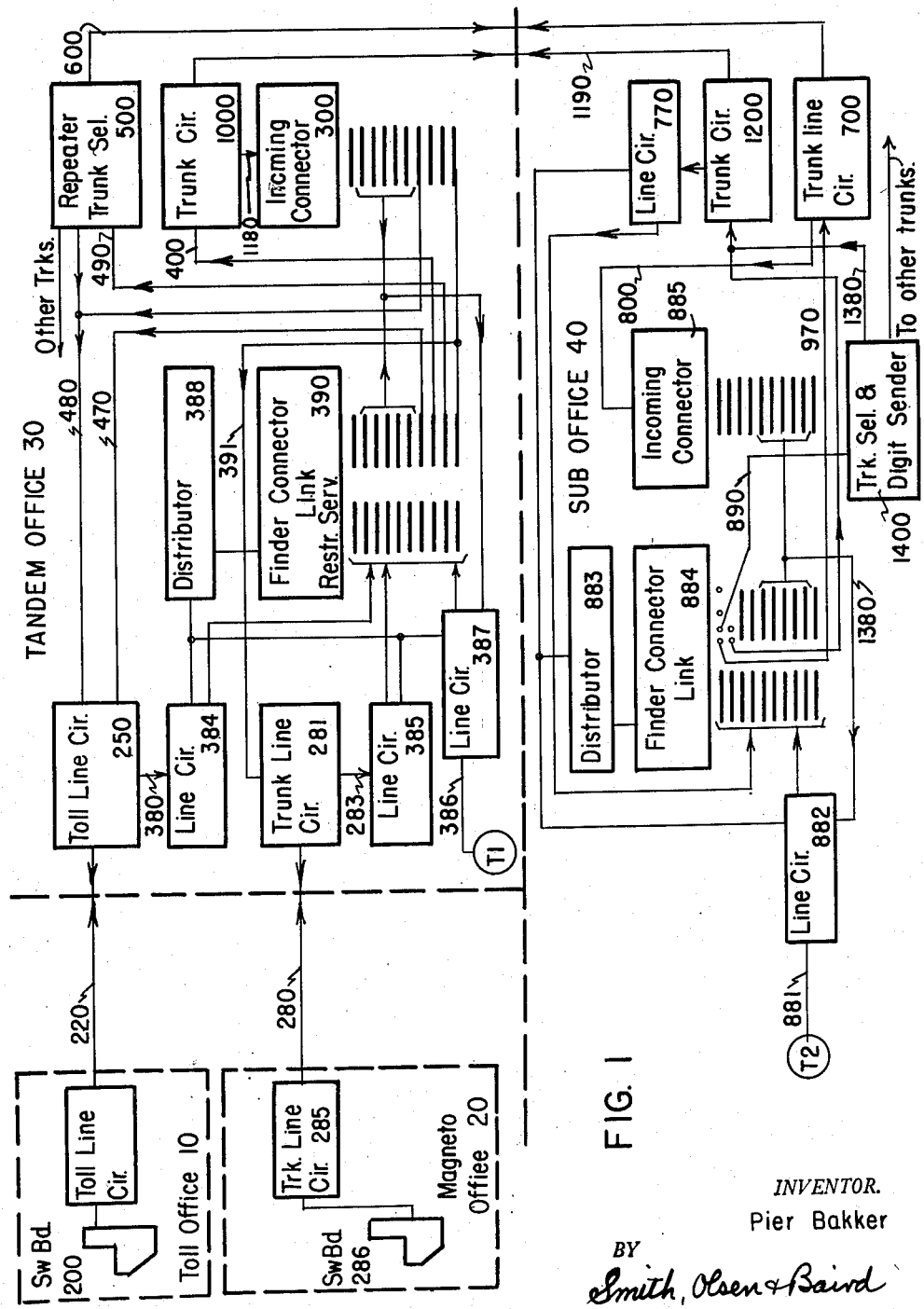

March 24, 1953 P. BAKKER 2,632,813
COMMUNITY AUTOMATIC EXCHANGE NETWORKS
Original Filed July 22, 1947 14 Sheets-Sheet 1

INVENTOR.
Pier Bakker
BY
Smith, Olsen & Baird
Attys.

INVENTOR.
Pier Bakker

March 24, 1953 P. BAKKER 2,632,813
COMMUNITY AUTOMATIC EXCHANGE NETWORKS
Original Filed July 22, 1947 14 Sheets-Sheet 7

INVENTOR.
Pier Bakker
BY
Smith, Olsen & Baird
Attys.

INVENTOR.
Pier Bakker

March 24, 1953 P. BAKKER 2,632,813
COMMUNITY AUTOMATIC EXCHANGE NETWORKS
Original Filed July 22, 1947 14 Sheets-Sheet 10

INVENTOR.
Pier Bakker
BY
Smith, Olsen & Baird
Attys.

INVENTOR.
Pier Bakker

March 24, 1953 P. BAKKER 2,632,813
COMMUNITY AUTOMATIC EXCHANGE NETWORKS
Original Filed July 22, 1947 14 Sheets-Sheet 13

INVENTOR.
Pier Bakker
BY
Smith, Olsen & Baird
Attys.

March 24, 1953 P. BAKKER 2,632,813
COMMUNITY AUTOMATIC EXCHANGE NETWORKS
Original Filed July 22, 1947 14 Sheets-Sheet 14

*INVENTOR.*
Pier Bakker
BY
*Smith, Olsen & Baird*
Attys.

Patented Mar. 24, 1953

2,632,813

UNITED STATES PATENT OFFICE 2,632,813

COMMUNITY AUTOMATIC EXCHANGE NETWORKS

Pier Bakker, Chicago, Ill., assignor to Automatic Electric Laboratories, Inc., Chicago, Ill., a corporation of Delaware Original application July 22, 1947, Serial No. 762,715, now Patent No. 2,607,854, dated August 19, 1952. Divided and this application April 6, 1950, Serial No. 154,356

11 Claims. (Cl. 179—27)

1

The present invention relates to telephone systems and more particularly to community automatic exchange (C. A. X) networks. This application is a division of the copending application of Pier Bakker, Serial No. 762,715, filed July 22, 1947.

In a C. A. X network, there is frequently provided a toll office including a switchboard, a tandem office of the automatic type, and a sub-office of the automatic type; whereby traffic between the switchboard in the toll office and the subscriber substations in the sub-office must be trunked through the tandem office. Also the tandem office frequently comprises restricted service features preventing some of the subscriber substations therein from completing connections directly to subscriber substations in the sub-office, without the aid of the operator at the switchboard in the toll office.

It is a general object of the present invention to provide in a C. A. X network of the character described, improved switching apparatus for setting up the various connections between the different offices in a simple and efficient manner without sacrificing supervision or complicating the directory number plan.

Another object of the invention is to provide in a telephone system of the type noted, an improved trunk selector-digit sender and repeater-trunk selector arrangement in which first automatic switching apparatus is responsive to a given digit to select either the repeater-trunk selector or the trunk selector-digit sender depending upon traffic conditions; whereupon the selected repeater-trunk selector selects an idle trunk line extending to the desired destination, or the selected trunk selector-digit sender selects an idle trunk extending to second automatic switching apparatus and then operates the second switching apparatus to select an idle trunk line extending to the desired destination.

A further object of the invention is to provide in a trunk circuit, including two incoming trunks, an improved arrangement whereby a tone test is performed when one of the incoming trunks is employed and a reverse battery control is performed when the other of the incoming trunks is employed.

Further features of the invention pertain to the particular arrangement of the circuit elements of the system, whereby the above-outlined and additional operating features thereof are attained.

2

Sect. 1.—The general arrangement of the telephone system

The invention, both as to its organization and method of operation, together with further objects and advantages thereof, will best be understood by reference to the following specification taken in connection with the accompanying drawings in which Figure 1 is a schematic diagram of the area served by a telephone system embodying the present invention and illustrating the general arrangement of the apparatus incorporated in several of the offices thereof; and Figs. 2 to 14, inclusive, taken together, illustrate the details of certain of the apparatus incorporated in the telephone system, which apparatus has embodied therein the features of the invention as briefly outlined above. Specifically, in order to form a unified diagram, Figs. 2 to 9, inclusive, should be arranged vertically in side-by-side relation from left to right, and Figs. 10 to 14, inclusive, should be arranged vertically in side-by-side relation from left to right and disposed respectively below Figs. 5 to 9, inclusive.

Figure 2:
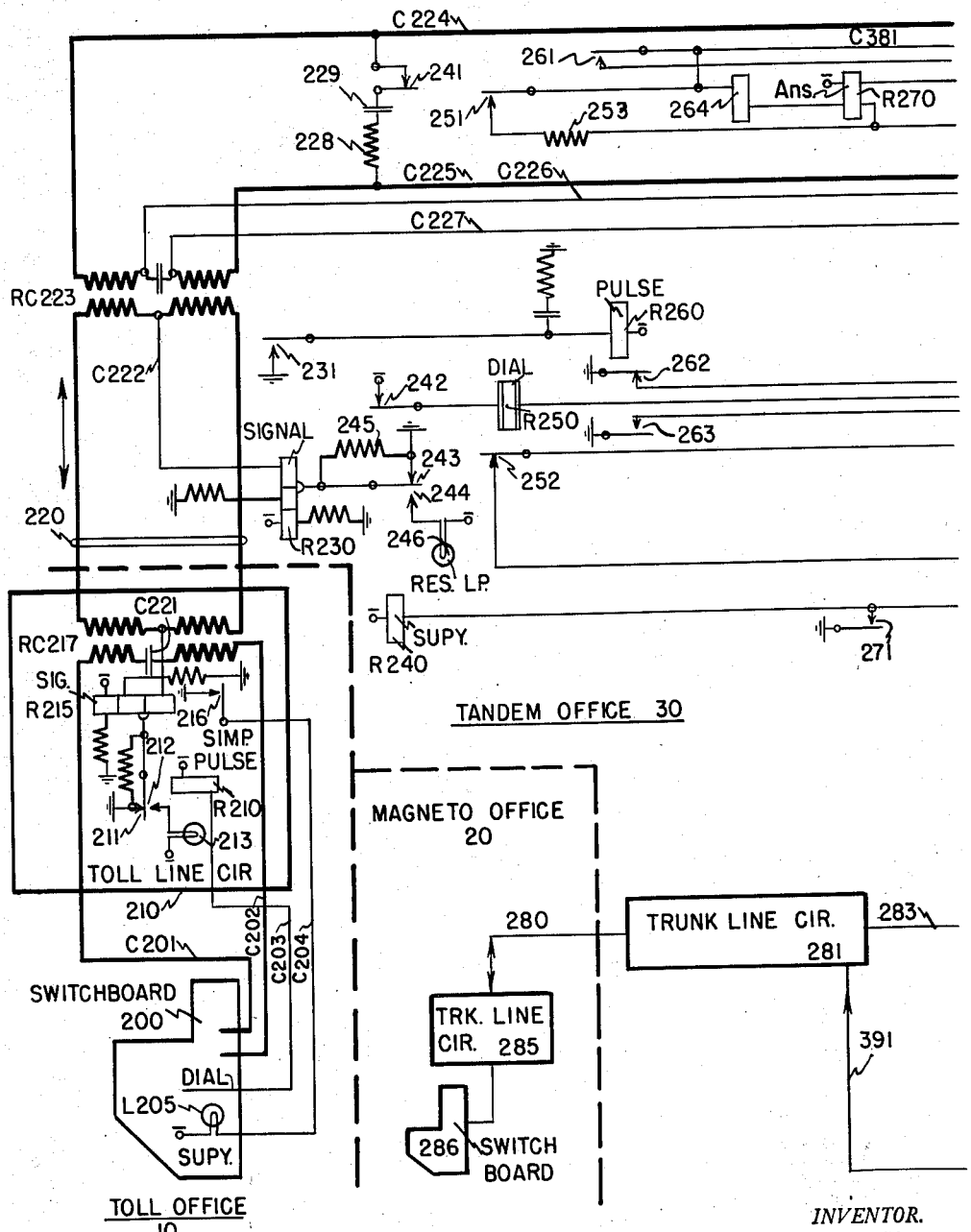
Figure 3:
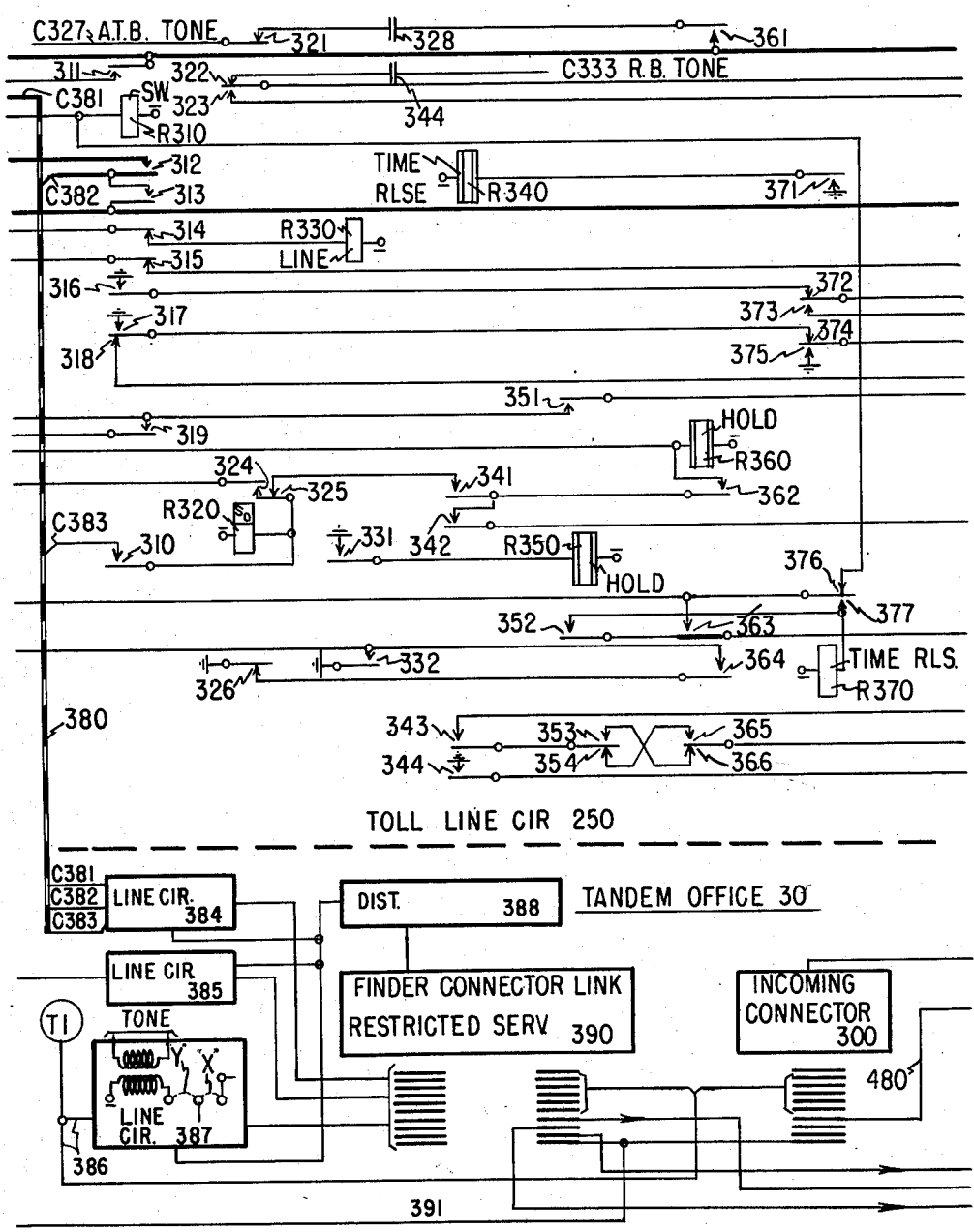
Figure 4:
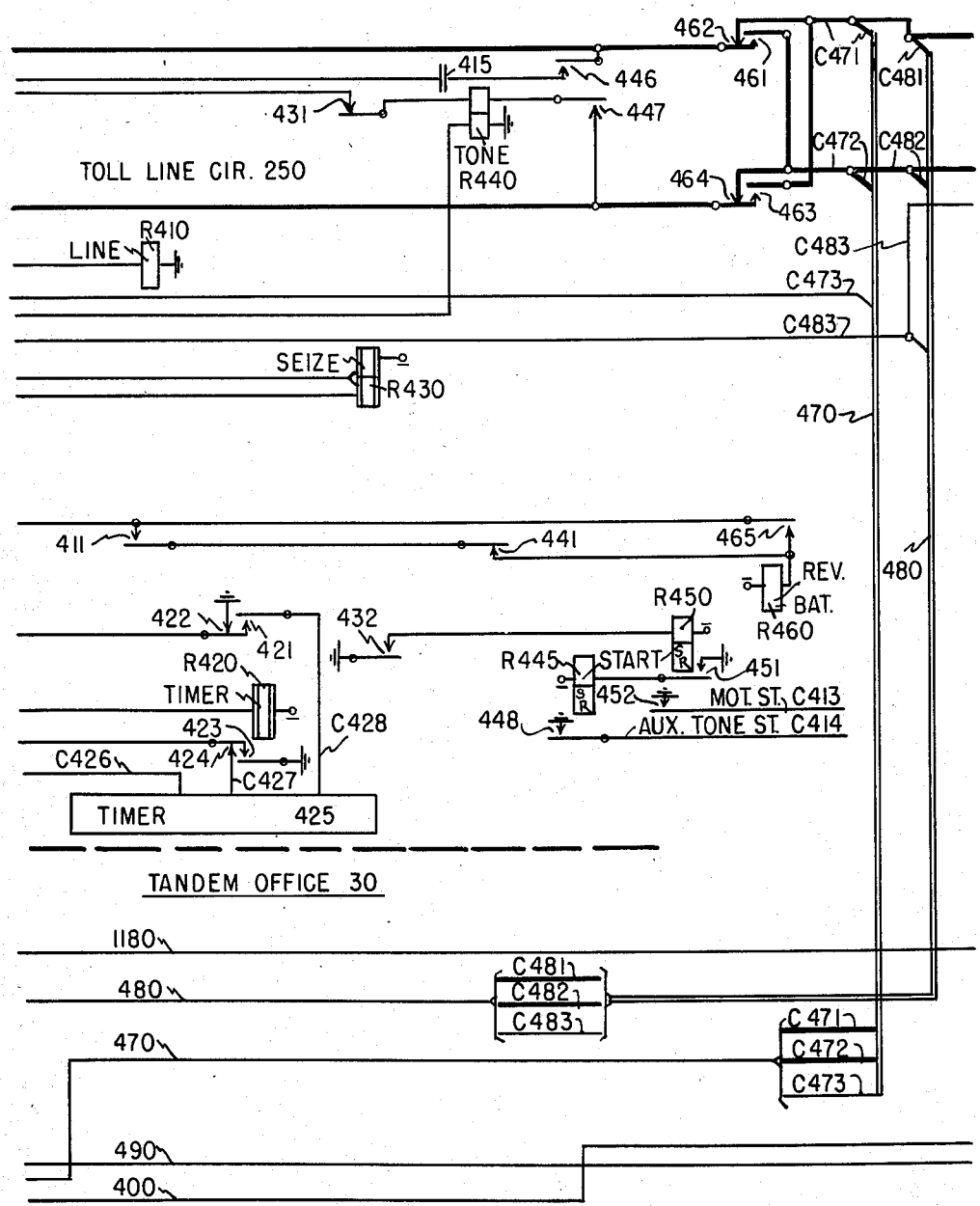
Figure 5:
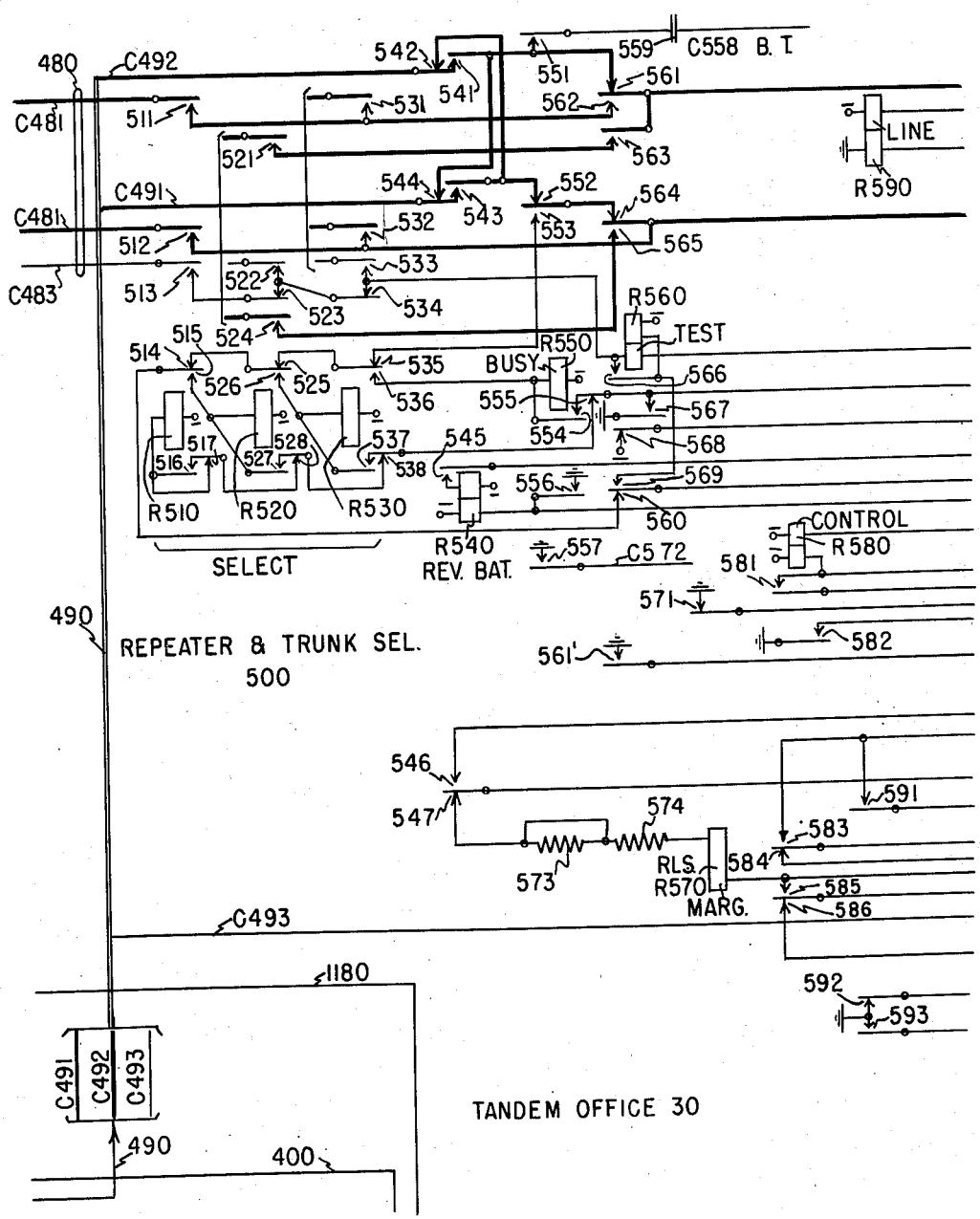
Figure 6:
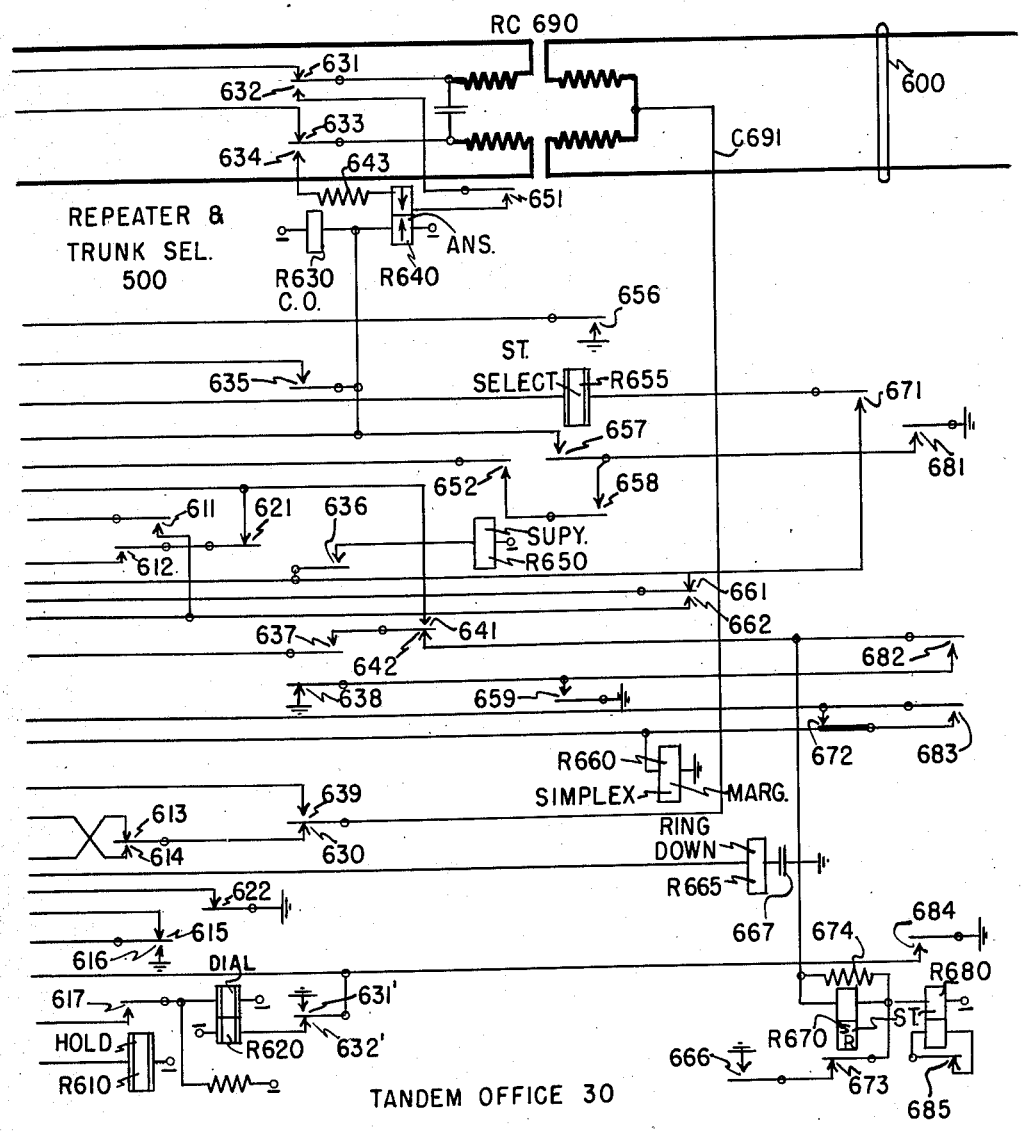
Figure 7:
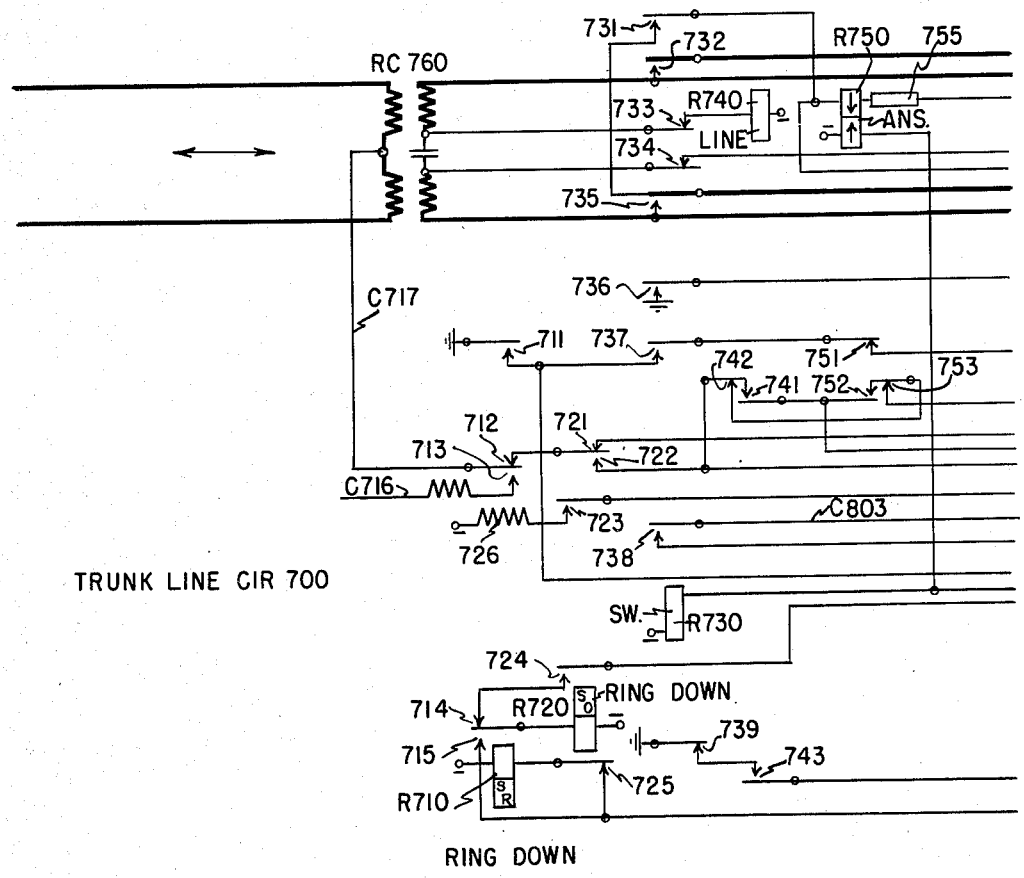
Figure 7:
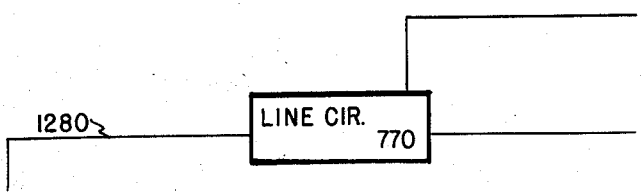
Figure 8:
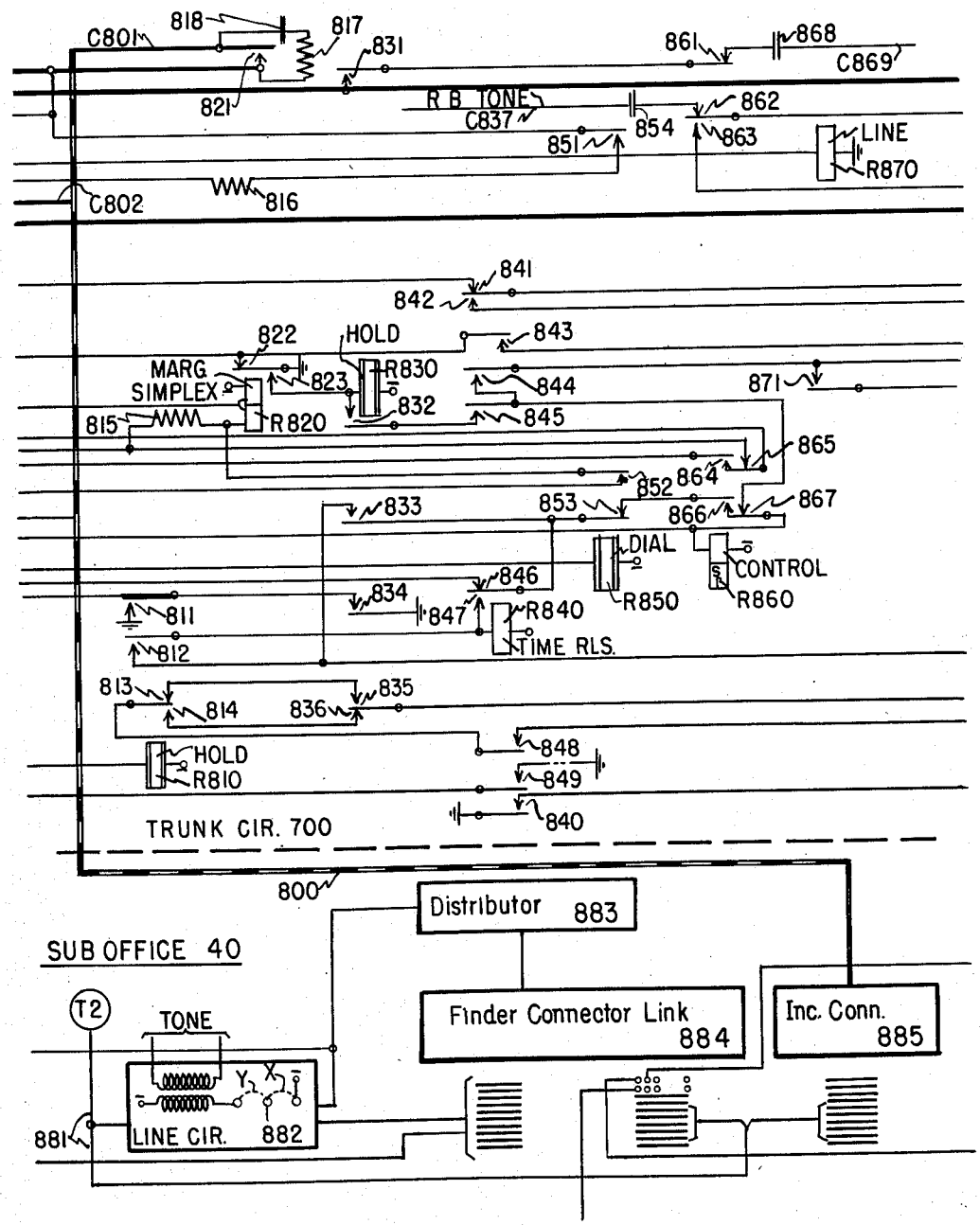
Figure 9:
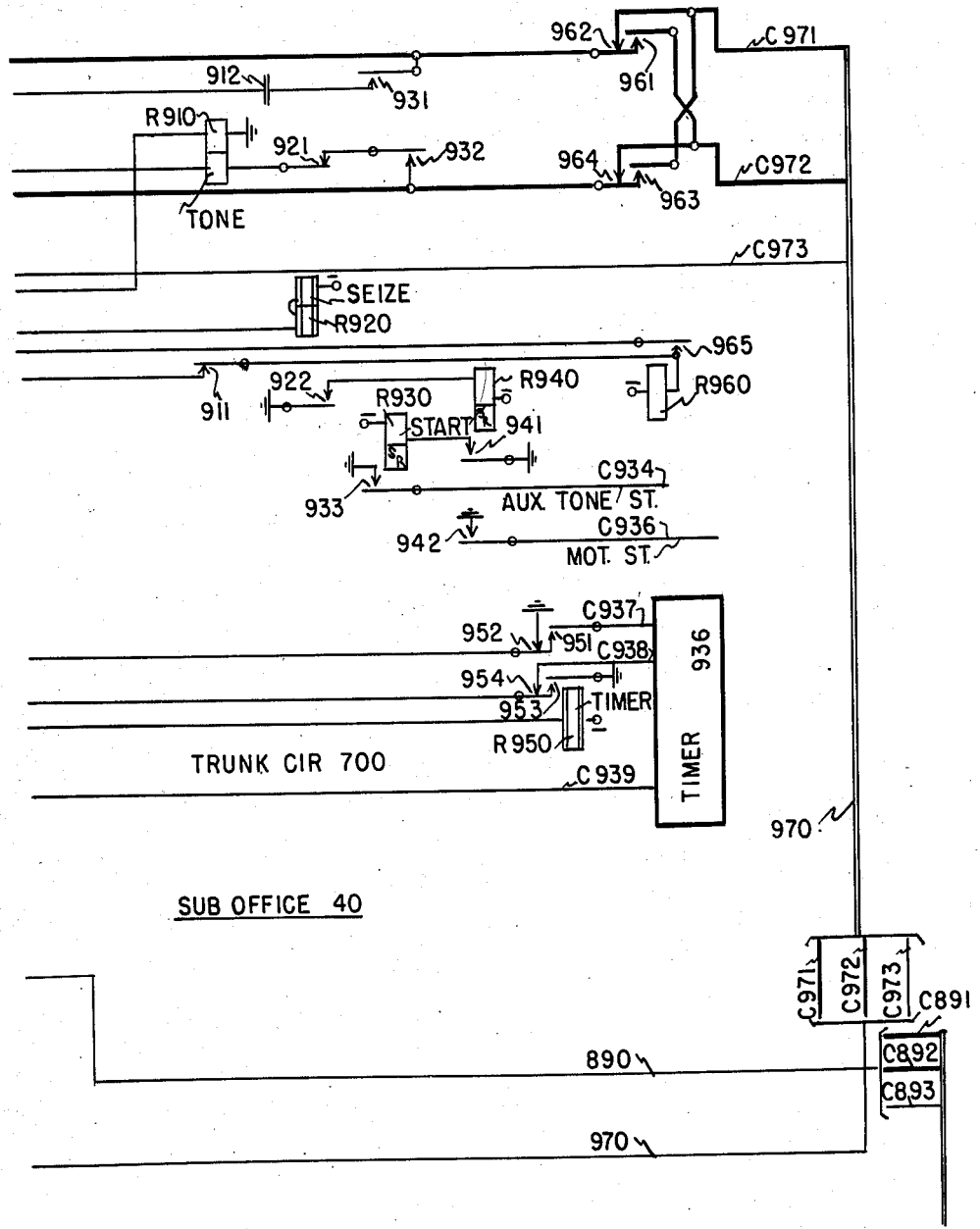
Figure 10:
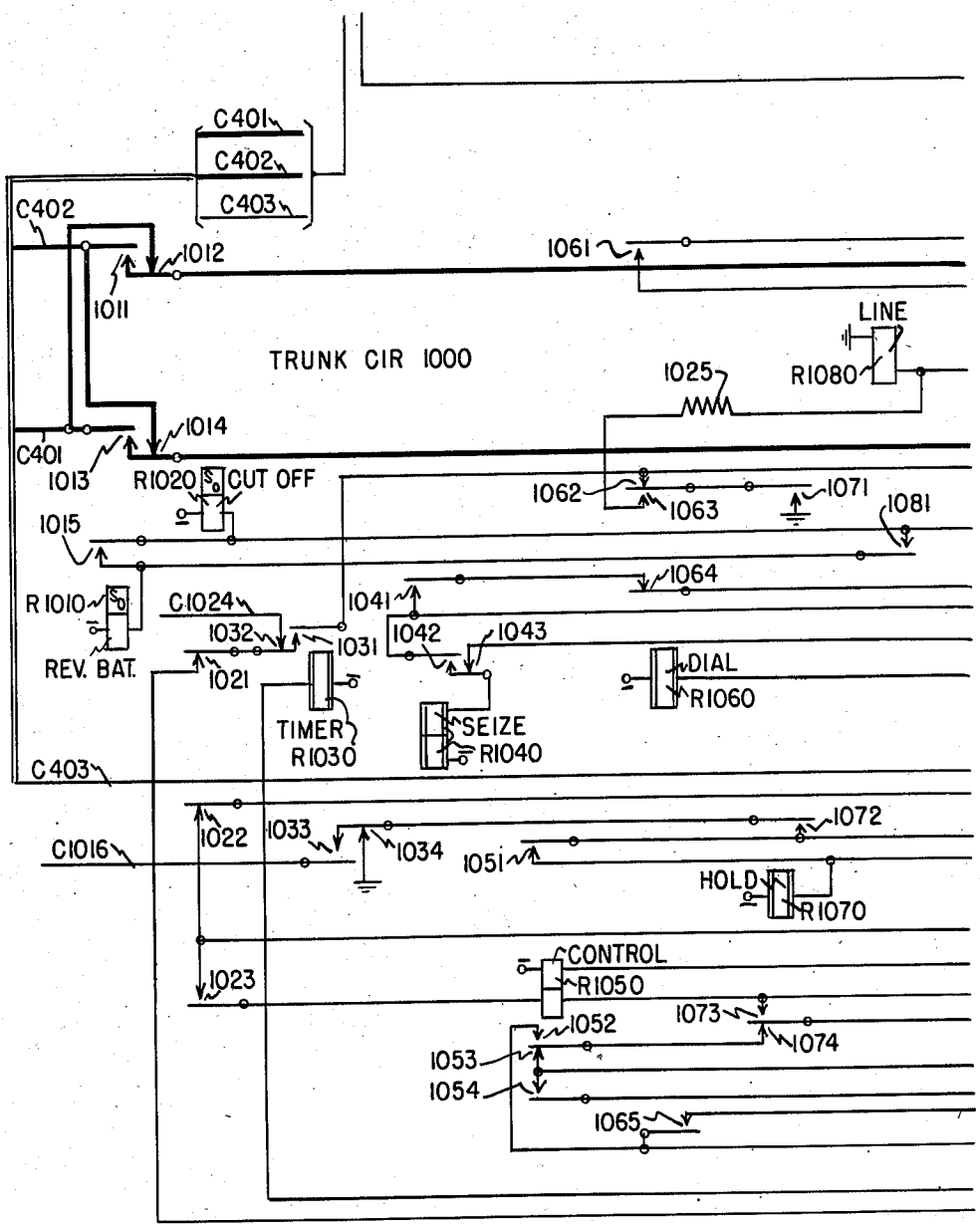
Figure 11:
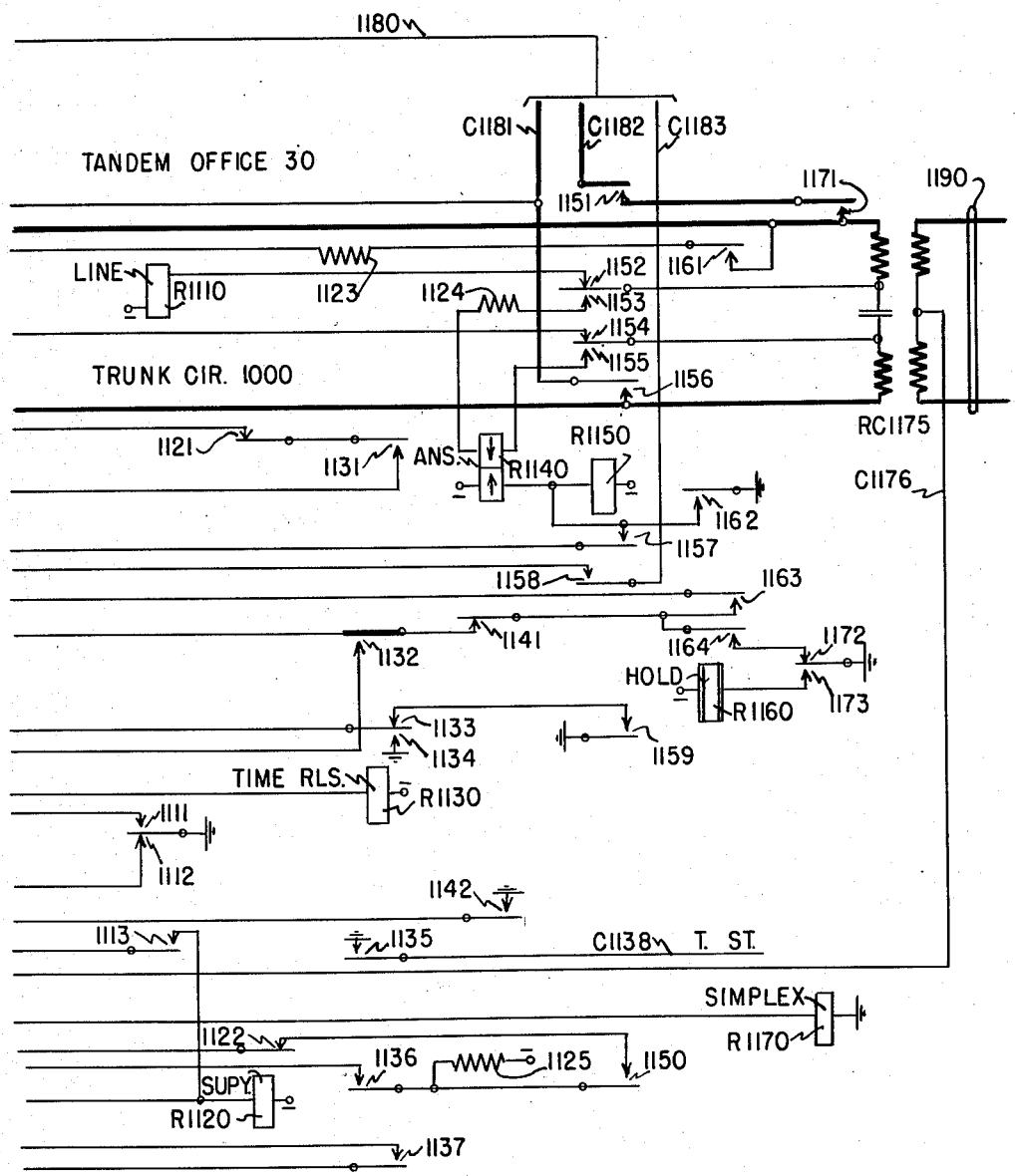
Figure 12:
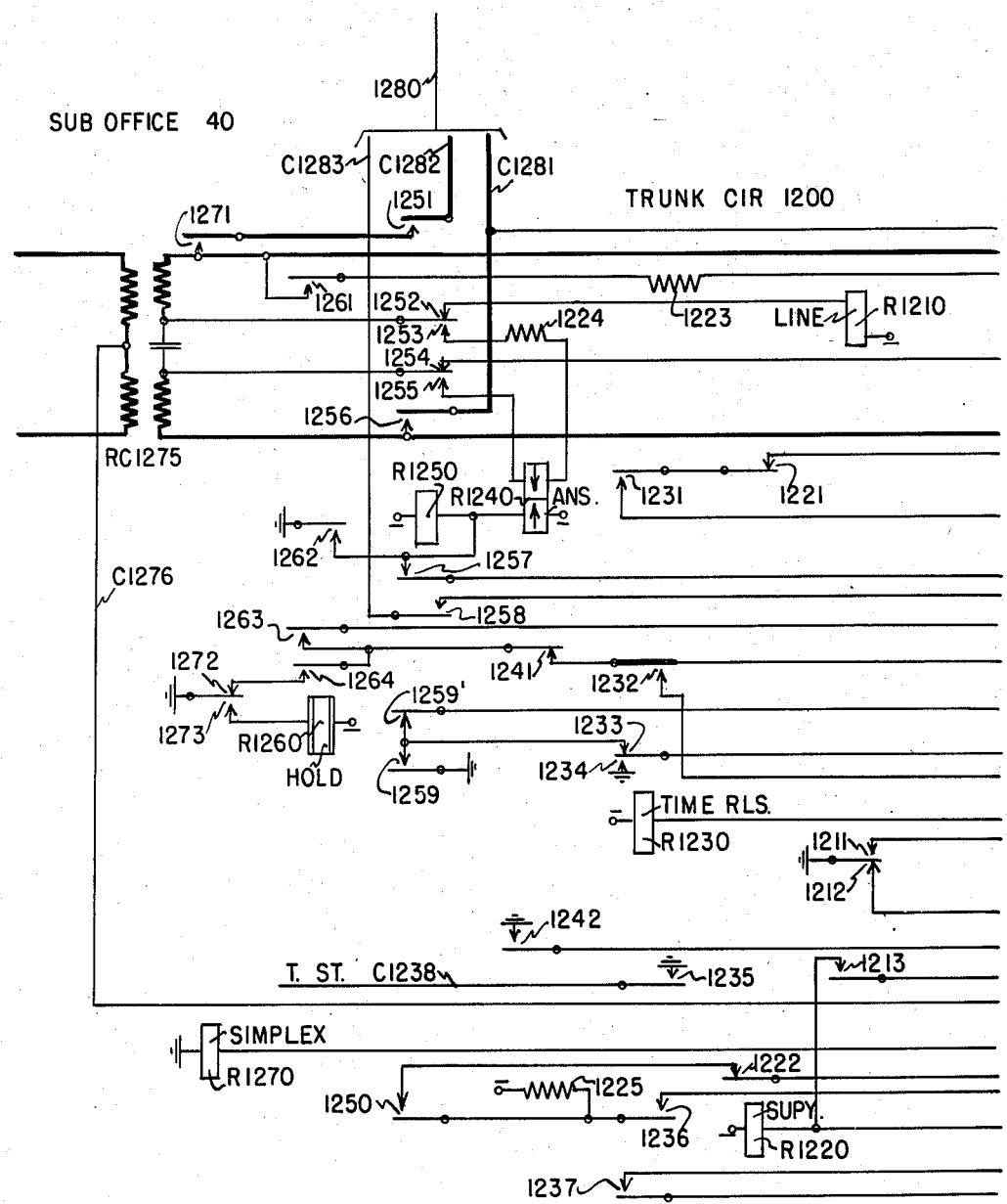
Figure 13:
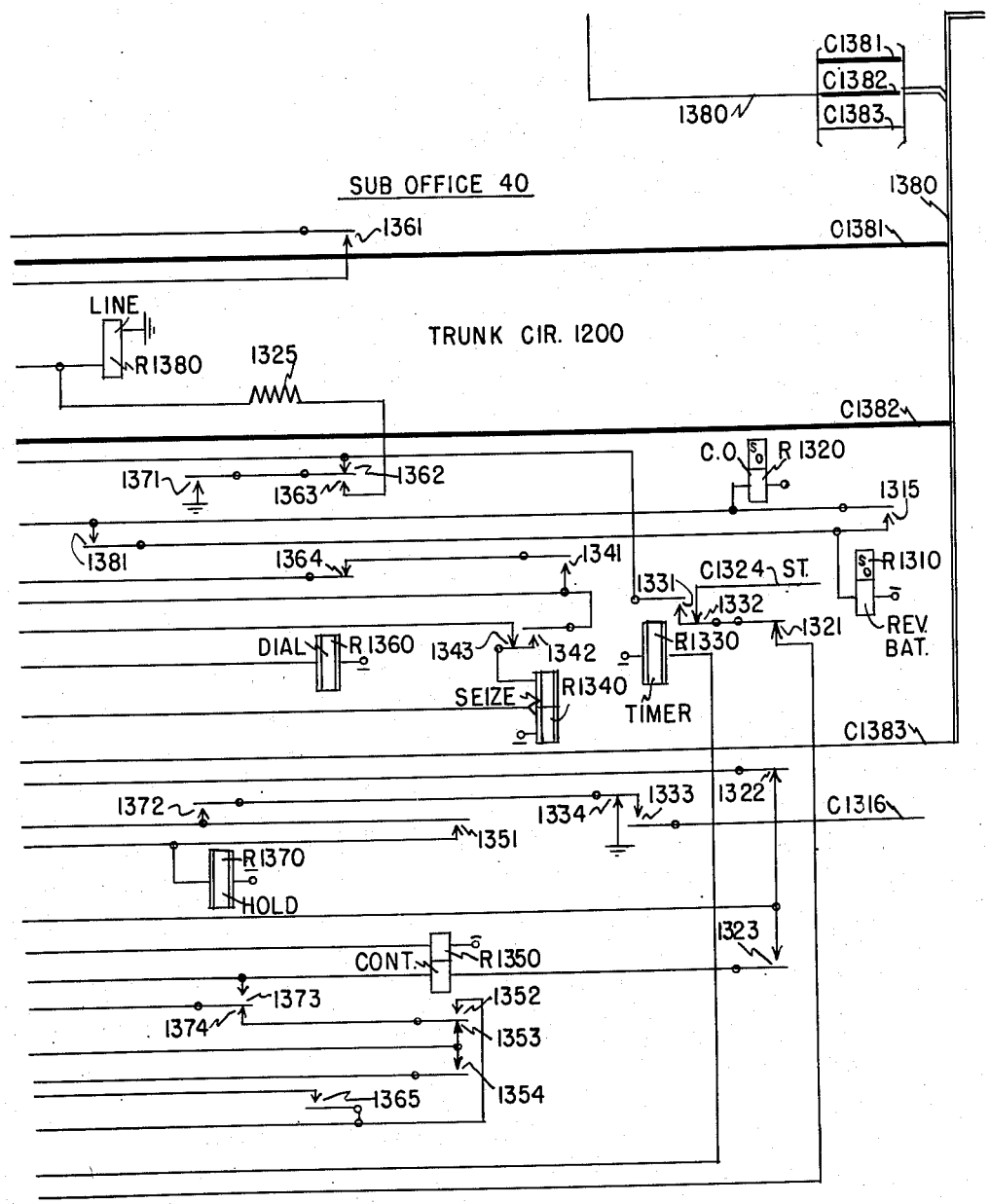
Figure 14:
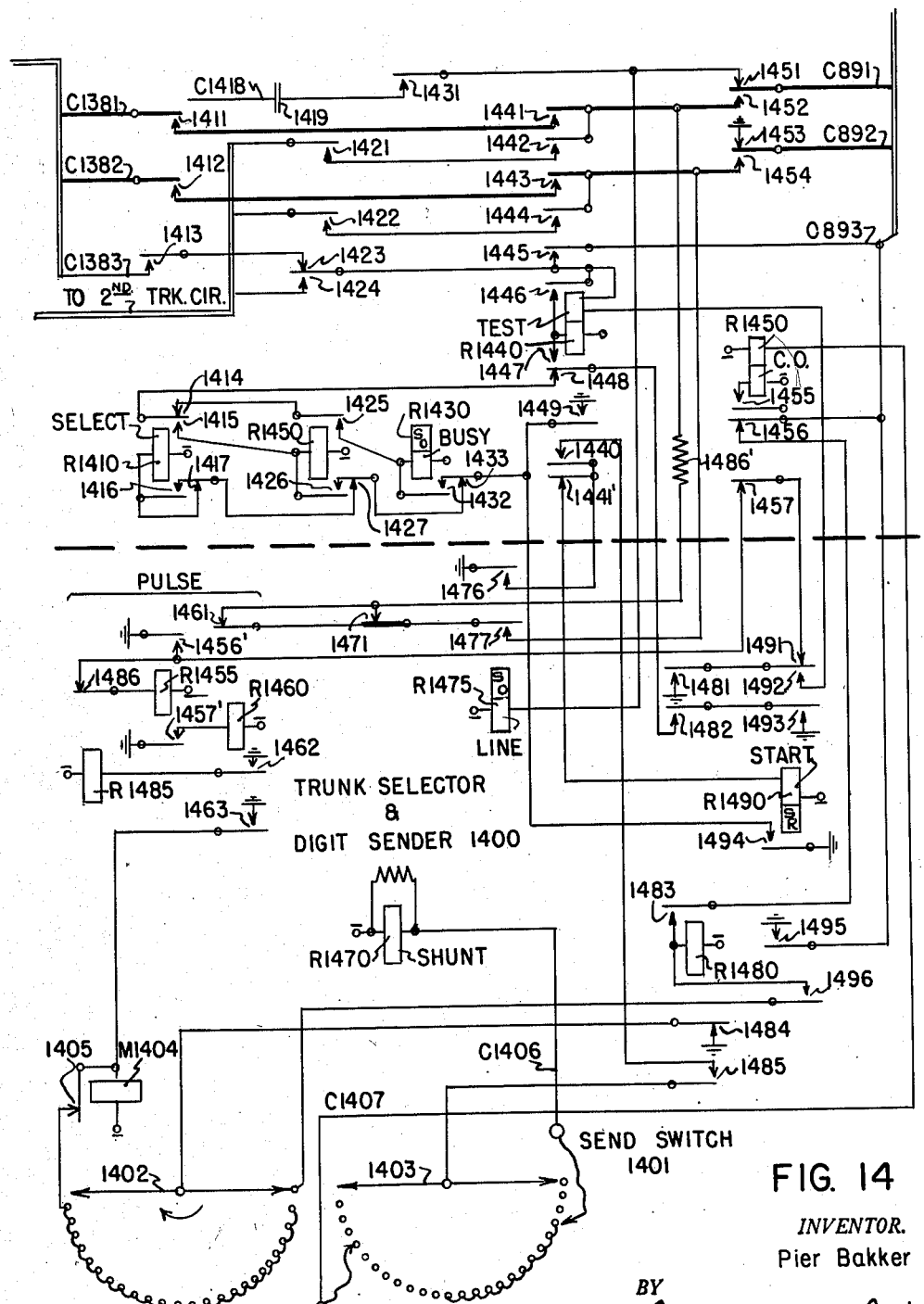

More particularly, Fig. 2 illustrates the details of one of the toll line circuits incorporated in the toll office; Figs. 2 to 4, inclusive, illustrate the details of one of the toll circuits incorporated in the tandem office; Figs. 5 and 6 illustrate the details of the repeater and trunk selector incorporated in the tandem office; Figs. 10 and 11 illustrate the details of one of the trunk circuits incorporated in the tandem office; Figs. 7 to 9, inclusive, illustrate the details of a trunk circuit incorporated in the sub-office; Figs. 12 and 13 illustrate the details of one of a group of trunk circuits incorporated in the sub-office; and Fig. 14 illustrates the details of a trunk selector and digit sender incorporated in the sub-office.

Referring now more particularly to Fig. 1, the telephone system there illustrated serves an area comprising a toll office 10, a magneto office 20, a tandem office 30 and a sub-office 40, the toll office 10 being disposed relatively remote from the tandem office 30, and the tandem office 30 being disposed relatively near to the magneto office 20 and to the sub-office 40. The toll office 10 serves subscriber substations of any suitable type and comprises a manual dial switchboard 200; while the magneto office 20 serves subscriber substations of the magneto type and comprises a manual dial switchboard 286. The tandem office 30 is a relatively small office of the automatic type, serving a number of different groups of subscriber substations rendered different classes of service and at least one group of paystations. One of the groups of subscriber substations includes the subscriber substation T1. Also, the sub-office 40 is a relatively small office of the automatic type serving a group of subscriber substations, including the subscriber substation T2.

The toll office 10 and the tandem office 30 are interconnected by a small group of toll lines; which group may comprise three individual toll lines, including the toll line 220. The magneto office 20 and the tandem office 30 are interconnected by a small group of trunk lines; which group may comprise three individual trunk lines, including the trunk line 280. The tandem office 30 and the sub-office 40 are interconnected by a single trunk line 600; and also by a small group of trunks; which group may comprise two individual trunks, including the trunk 1190. Each of the toll lines 220, etc., terminates in toll line circuits respectively disposed in the toll office 10 and in the tandem office 30, the toll line 220 terminating in the toll line circuits 210 and 250 respectively disposed in the toll office 10 and in the tandem office 30. Each of the trunk lines 280, etc., terminates in trunk line circuits respectively disposed in the magneto office 20 and in the tandem office 30, the trunk line 280 terminating in the trunk line circuits 285 and 281 respectively disposed in the magneto office 20 and in the tandem office 30. The trunk line 600 terminates in a repeater and trunk selector 500 disposed in the tandem office 30 and in a trunk line circuit 700 disposed in the sub-office 40. Finally, each of the trunks 1190, etc., terminates in trunk circuits respectively disposed in the tandem office 30 and in the sub-office 40, the trunk 1190 terminating in the trunk circuits 1000 and 1200 respectively disposed in the tandem office 30 and in the sub-office 40. In the toll office 10, each of the toll line circuits 210, etc., is accessible to the switchboard 200; and in the magneto office 20, each of the trunk line circuits 285, etc., is accessible to the switchboard 286.

The tandem office 30 also comprises automatic switching apparatus including a plurality of finder-connector links 390, etc., provided with an associated distributor 388, and two incoming connectors 300, etc., respectively individually associated with the trunk circuits 1000 etc., the trunk circuit 1000 being connected to the individually associated incoming connector 300 by a trunk 1180. Each toll line circuit 250, etc., is provided with a line circuit individual thereto, the toll line circuit 250 being provided with the line circuit 384 individually connected thereto by the trunk 380. Also each trunk line circuit 281, etc., is provided with a line circuit individual thereto, the trunk line circuit 281 being provided with the line circuit 385 individually connected thereto by the trunk 283. Finally, each subscriber substation is provided with a line circuit individual thereto connected to the associated subscriber line, the subscriber substation T1 being provided with the line circuit 387 individually connected to the associated subscriber line 386. The various line circuits 384, 385, 387, etc., are respectively connected to the distributor 388 and are accessible to the finders of the various links 390, etc. Each toll line circuit 250, etc., is provided with two incoming trunks, the toll line circuit 250 being provided with the two incoming trunks 470 and 480; and each trunk line circuit 281, etc., is provided with an incoming trunk, the trunk line circuit 281 being provided with the incoming trunk 391. Also the repeater and trunk selector 500 is provided with an incoming trunk 490; and each of the trunk circuits 1000, etc., is provided with an incoming trunk, the trunk circuit 1000 being provided with the incoming trunk 400. The incoming trunks 480, etc., extending to the toll line circuits 250, etc., are accessible to the repeater and trunk selector 500 and to the two incoming connectors 300, etc.; while the trunks 470, etc., extending to the toll line circuits 250, etc., are accessible to the connectors of the various links 390, etc. The incoming trunks 391, etc., extending to the trunk line circuits 281, etc. are accessible both to the connectors of the links 390, etc., and to the two incoming connectors 300, etc. The various subscriber lines 386, etc., are accessible to the connectors of the various links 390, etc., and to the two incoming connectors 300, etc. The incoming trunk 490 extending to the repeater and trunk selector 500 is accessible to the connectors of the various links 390, etc.; while the incoming trunks 400, etc., extending to the trunk circuits 1000, etc. are accessible to the connectors of the various links 390, etc.

The sub-office 40 comprises automatic switching apparatus, including a plurality of finder-connector links 884, etc., provided with an associated distributor 883; and an incoming connector 885 individually associated with the trunk line circuit 700 and connected thereto by the trunk 860. Each trunk circuit 1200, etc., is provided with a line circuit individual thereto, the trunk circuit 1200 being provided with the line circuit 770 individually connected thereto by the trunk 1280. Each subscriber substation is provided with a line circuit individual thereto connected to the associated subscriber line, the subscriber substation T2 being provided with the line circuit 882 individually connected to the associated subscriber line 881. The various line circuits 770, 882, etc., are respectively connected to the distributor 883 and are accessible to the finders of the various links 884, etc. Each trunk circuit 1200, etc., is provided with an incoming trunk, the trunk circuit 1200 being provided with the incoming trunk 1380; and the trunk line circuit 700 is provided with an incoming trunk 970. Also the sub-office 40 comprises a trunk selector and digit sender 1400 provided with an incoming trunk 890. The incoming trunks 1380, 970, 890, etc., are accessible to the connectors of the various links 884, etc.; while the trunk selector and digit sender 1400 has access to the incoming trunks 1380, etc., extending to the trunk circuits 1200, etc. Finally both the connectors of the various links 884, etc., and the incoming connector 885 have access to the various subscriber lines 881, etc.

Sect. 2.—*The apparatus incorporated in the telephone system*

In the toll office 10, the switchboard 200 is of the conventional manual dial type, including cord circuits, not shown. Each of the toll line circuits is identical to the toll line circuit 210; which comprises, as shown in Fig. 2, a relay group including a simplex pulse relay R210 and a signal relay R215, as well as a repeating coil RC217.

In the magneto office 20, the switchboard 286 is of the conventional manual dial type and may be identical to the switchboard 200. Similarly, the trunk line circuits 285, etc., may be identical to the toll line circuit 210.

In the tandem office, the toll line circuits 250, etc., and the trunk line circuits 281, etc., may be identical; the toll line circuit 250 comprises, as shown in Figs. 2, 3 and 4, a repeating coil RC223, a timer 425, and a relay group including a signal relay R230, a supervisory relay R240, a dial relay R250, a pulse relay R260, an answer relay R270, a switch relay R310, a control relay R320, a line relay R330, a time release relay R340, two hold relays R350 and R360, a time release relay R370, a line relay R410, a timer relay R420, a seize relay R430, a tone relay R440, two start relays R445 and R450 and a reverse battery relay R460.

The repeater and trunk selector 500 comprises, as shown in Figs. 5 and 6, a repeating coil RC690 and a relay group including three select relays R510, R520 and R530, a reverse battery relay R540, a busy relay R550, a test relay R560, a release relay R570, a control relay R580, a line relay R590, a hold relay R610, a dial relay R620, a cut-off relay R630, an answer relay R640, a supervisory relay R650, a start select relay R655, a simplex relay R660, a ring-down relay R665 and two start relays R670 and R680.

The trunk circuits 1000, etc., are identical; and the trunk circuit 100 comprises, as shown in Figs. 10 and 11, a repeating coil RC1175, a timer, not shown, and a relay group including a reverse battery relay R1010, a cut-off relay R1020, a timer relay R1030, a seize relay R1040, a control relay R1050, a dial relay R1060, a hold relay R1070, two line relays R1080 and R1110, a supervisory relay R1120, a time release relay R1130, an answer relay R1140, a switch relay R1150, a hold relay R1160, and a simplex relay R1170.

Also, in the tandem office 30, the line circuits 384, 385 and 387 may be of any suitable types, while the distributor 388 is of any conventional type. The subscriber substations T1, etc., are provided with conventional substation equipment; and the paystations, not shown, are of the conventional prepayment type. Further, the private subscriber lines are provided with call registers and meters, not shown. Finally, the finder-connector links 390, etc., are of the Strowger restricted service type disclosed in the co-pending application of Pier Bakker, Serial No. 723,525, filed January 22, 1947; while each of the incoming connectors 300, etc., is of the Strowger type and is substantially identical to the connector portion of the link 390. In passing, it is noted that the link 390 is of the mixed service type and is responsive to the single digits 7, 8, 9 and 0, respectively, to select the groups of trunks terminated in the first, second, third and fourth levels thereof and then automatically to operate in order to select an idle trunk in the previously selected group or level. Also the link 390 is responsive to the prefix digits 2 or 3 followed by one of the digits 5, 6, 7, 8 and 9 to select the respectively corresponding fifth, sixth, seventh, eighth and ninth levels thereof, terminating the lines extending to the subscriber substations and paystations. Thereafter, the link 390 is responsive to any third digit from 1 to 0 to select the respectively corresponding line in the previously selected level. Finally, the finder-connector link 390 is responsive to any fourth digit from 1 to 0 to bring about code ringing of the selected line in the event it is idle. The combination of the first or prefix digit and the fourth code digit permits the link 390 to ring the called line with any one of twenty individual codes; whereby as many as twenty party subscriber substations may be arranged on any single party line.

Also the link 390 comprises a restricted service arrangement, whereby certain of the subscriber lines may not extend connections via the two groups of trunks that are respectively selected in response to dialing the digits 7 and 9; and none of the subscriber lines may extend connections via the trunks that are selected in response to dialing the digit 8.

In the sub-office 40, the trunk line circuit 700 comprises, as shown in Figs. 7, 8 and 9, a repeating coil RC760, a timer 936 and a relay group including two ring-down relays R710 and R720, a switch relay R730, a line relay R740, an answer relay R750, a hold relay R810, a simplex relay R820, a hold relay R830, a time release relay R840, a dial relay R850, a control relay R860, a line relay R870, a tone relay R910, a seize relay R920, two start relays R930 and R940, a timer relay R950 and a reverse battery relay R960.

Also, the trunk circuits 1200, etc., are identical to the trunk circuit 1000; the trunk circuit 1200 comprising, as shown in Figs. 12 and 13, a repeating coil RC1275, a timer, not shown, and a relay group including a reverse battery relay R1310, a cut-off relay R1320, a timer relay R1330, a seize relay R1340, a control relay R1350, a dial relay R1360, a hold relay R1370, two line relays R1380 and R1210, a supervisory relay R1220, a time release relay R1230, an answer relay R1240, a switch relay R1250, a hold relay R1260 and a simplex relay R1270.

Also in the sub-office 40, the line circuits 770, 882, etc., may be of any suitable types; while the distributor 883 is of any conventional type. The subscriber substations T2, etc., are provided with conventional substation equipment; while links 884, etc., and the incoming connector 885, are of the conventional Strowger types.

Finally, the trunk selector and digit sender 1400 comprises, as shown in Fig. 14, a relay group including two select relays R1410 and R1420, a busy relay R1430, a test relay R1440, a cut-off relay R1450, three pulse relays R1485, R1445, and R1460, a shunt relay R1470, a line relay R1475, a control relay R1480, and a start relay R1490. Also, the trunk selector and digit sender 1400 comprises a send switch 1401 of the rotary type, including two wipers 1402 and 1403 provided with a magnet M1404 for driving the wipers noted step-by-step in the clockwise direction away from their home positions with respect to the associated contact banks.

A better understanding of the connection and arrangement of the apparatus incorporated in the telephone system will be facilitated from a consideration of the extension of calls involving the various offices.

*Sec. 3.—Local calls in the tandem office*

First assuming that a call is initiated at the subscriber substation T1 in the tandem office 30 that is to be completed locally to another subscriber substation therein, the line circuit 387 is controlled via the subscriber line 386 in order to govern operation of the distributor 388; whereby an idle one of the links, such, for example, as the link 390 is assigned thereby. The finder of the assigned link 390 operates to find the subscriber line 386 extending to the calling subscriber substation T1; whereby the line circuit 387 is operated in order to mark the subscriber line 386 as busy to the other links 390, etc. Also the connector of the link 390 operates to return dial tone over the subscriber line 386 to the calling subscriber substation T1; whereby the subscriber at the calling subscriber substation T1 proceeds to dial the directory number of the called subscriber substation, which number might be 3654. The first digit 3 received by the link 390 indicates that the present call is a local call and selects a portion of the ringing code. The connector of the link 390 responds to the second digit 6 to select the corresponding sixth level; and then responds to the third digit 5 to select the corresponding fifth line in the previously selected level; which line extends to the called subscriber substation. The connector of the link 390 then responds to the fourth digit 4 to select the remainder of the ringing code that is to be employed to ring the called subscriber line. The first or prefix digit 3, in conjunction with the fourth digit 4, selects one of twenty ringing codes at this time; whereby the particular selected ringing code is projected over the called subscriber line in order to signal the corresponding one of the twenty party subscriber substations connected to the called subscriber line, assuming the called subscriber line is of the twenty party type and provided it is idle at this time. The operation of the connector of the link 390 to return busy tone current to the calling subscriber substation T1 in the event the called subscriber line is busy is in accordance with conventional practice; and the remainder of the operation of the connector of the link 390 in response to the answering of the call on the called subscriber line, as well as the subsequent release of the established connection, are in accordance with conventional practice.

In view of the foregoing, it will be understood that a call from a subscriber substation in the tandem exchange 30 may be completed locally to a paystation therein in an identical manner. Also, it will be understood that a call may be initiated at a paystation in the tandem exchange 30 by depositing a coin or check thereat and then subsequently completed locally to a called subscriber substation or paystation therein in a conventional manner.

*Sect. 4.—A call from a subscriber substation or a paystation in the tandem office to a subscriber substation in the sub-office*

First assuming that a call is to be extended from a subscriber substation, such, for example, as the subscriber substation T1 in the tandem office 30 to a called subscriber substation, such, for example, as the subscriber substation T2 in the sub-office 40, the subscriber at the calling subscriber substation T1 first initiates the call; whereby the link 390 may be taken for use in the manner previously explained. The subscriber at the calling subscriber substation T1 then dials the prefix digit 9 followed by the directory number of the called subscriber substation T2; which number might be 23; whereby 9–23 may be dialed. The connector of the link 390 responds to the digit 9 to select the corresponding third level and then an idle trunk terminated therein, such, for example, as the trunk 400 extending to the trunk circuit 1000, the trunk 400 being marked as idle to the connector of the link 390 by the absence of ground potential upon the control conductor C403 thereof. When the connector of the link 390 seizes the trunk 400, a loop circuit is completed for energizing in series the windings of the line relays R1080 and R1110 in the trunk circuit 1000; this loop circuit extending from ground potential by way of the winding of the line relay R1080, the contacts 1154, the lower left-hand winding of the repeating coil RC1175 and the contacts 1014 to the line conductor C402 of the trunk 400, and from battery potential by way of the winding of the line relay R1110, the contacts 1152, the upper left-hand winding of the repeating coil RC1175 and the contacts 1012 to the line conductor C401 of the trunk 400. At this time the line conductors C401 and C402 of the trunk 400 are connected together by way of the link 390 and the subscriber line 386 at the calling subscriber substation T1. When this loop circuit is thus completed, both of the line relays R1080 and R1110 operate. Upon operating, the line relay R1110 completes, at the contacts 1111, a circuit for operating the hold relay R1070. Upon operating, the hold relay R1070 completes at the contacts 1073, a path, including the contacts 1113, for applying battery potential by way of the winding of the supervisory relay R1120 to the simplex conductor C1176; which simplex conductor C1176 is connected by way of the upper and lower right-hand windings of the repeating coil RC1175, the line conductors of the trunk 1190 and the upper and lower left-hand windings of the repeating coil RC1275 to the simplex conductor C1276; which simplex conductor C1276 is connected by way of the contacts 1374 and 1353 and the winding of the simplex relay R1270 in the trunk circuit 1200 to ground potential. Accordingly, at this time the winding of the supervisory relay R1120 in the trunk circuit 1000 is energized in series with the winding of the simplex relay R1270 in the trunk circuit 1200; whereby both the supervisory relay R1120 and the simplex relay R1270 operate. Also upon operating, the hold relay R1070 in the trunk circuit 1000 completes, at the contacts 1072, a circuit, including the contacts 1034, for operating the time release relay R1130. Upon operating, the time release relay R1130 completes, at the contacts 1134, a path for applying ground potential to the control conductor C403 of the trunk 400, thereby to mark the trunk 400 as busy to the other links 390 etc., having access thereto. Also the time release relay R1130 completes, at the contacts 1135, a path for applying ground potential to the timer start conductor C1138 in order to initiate operation of the associated timer, not shown. Further the time release relay R1130 completes, at the contacts 1137, a path, including the contacts 1021 and 1032, for applying battery potential by way of the winding of the timer relay R1030 to the timer conductor C1024; however, the timer relay R1030 is not operated at this time.

Upon operating the simplex relay R1270 in the trunk circuit 1200 completes, at the contacts 1273, a circuit for operating the hold relay R1260. Upon operating, the hold relay R1260 completes, at the contacts 1262, a circuit for operating the switch relay R1250 and a multiple circuit for energizing the lower winding of the answer relay R1240. When the lower winding of the answer relay R1240 is thus energized, it does not operate at this time. Upon operating the switch relay R1250 interrupts, at the contacts 1252 and 1254, normal connections between the windings of the line relays R1210 and R1380 and the upper right-hand winding and the lower right-hand winding, respectively, of the repeating coil RC1275; and completes, at the contacts 1251, 1253, 1255 and 1256, a path, including the resistor 1224 and the upper right-hand winding and the lower right-hand winding of the repeating coil RC1275, for bridging the upper winding of the answer relay R1240 across the line conductors C1281 and C1282 of the trunk 1280 extending to the line circuit 770. Further, the switch relay R1250 completes, at the contacts 1259, a path, including the contacts 1233, for applying ground potential to the control conductor C1383 of the trunk 1380, thereby to mark the trunk 1380 as busy to the various links 884, etc., having access thereto.

When the upper winding of the answer relay R1240 is thus bridged across the line conductors C1281 and C1282 of the trunk 1280, it is energized, but it is not poled to operate. Also, the line circuit 770 operates to control the distributor 883; whereby an idle one of the finder-connector links, such for example, as the link 884 is assigned for use at this time. The finder of the link 884 finds the calling trunk 1280 marked by the line circuit 770; whereby the connector of the link 884 is conditioned to be responsive to digits received over the trunk 1280.

When the subscriber at the calling subscriber substation T1 dials the first digit 2 of the directory number of the called subscriber substation T2, the line relays R1080 and R1110 in the trunk circuit 1000 follows. Each time the line relay R1110 restores and then reoperates, it interrupts and then recompletes, at the contacts 1111, the previously mentioned circuit for maintaining operated the hold relay R1070; whereby the latter relay remains operated during impulsing as it is of the slow-to-release type. Also each time the line relay R1110 restores and then reoperates, it completes and then interrupts, at the contacts 1112, a circuit, including the contacts 1022 and 1132, for operating the dial relay R1060; whereby the latter relay operates and remains operated during impulsing as it is of the slow-to-release type. Upon operating, the dial relay R1060 completes, at the contacts 1063, a path, including the contacts 1071, for connecting the resistor 1025 in shunt to the winding of the line relay R1080 in order to improve impulsing over the loop circuit extending back to the calling subscriber substation T1. Also the dial relay R1060 completes, at the contacts 1065, a path, including the contacts 1136, for connecting the resistor 1125 in shunt to the winding of the supervisory relay R1120 in order to improve impulsing over the speakers conductor C1176. Also each time the line relay R1110 restores and then reoperates, it interrupts and then recompletes, at the contacts 1113, the previously traced circuit for energizing in series the winding of the supervisory relay R1120 in the trunk circuit 1000 and the winding of the simplex relay R1270 in the trunk circuit 1200; whereby the relays mentioned follow; followed by the supervisory relay R1120 in the trunk circuit 1000 being without effect.

The first time the simplex relay R1270 in the trunk circuit 1200 restores and then reoperates, it completes and then interrupts, at the contacts 1272, a circuit, including the contacts 1264, 1263 and 1343, for energizing in series the upper and lower windings of the seize relay R1340; whereby the latter relay operates. Upon operating the seize relay R1340 completes, at the contacts 1342, a holding circuit, including the contacts 1258 and the grounded control conductors C1283 of the trunk 1280, for energizing in series the upper and lower windings thereof. Also each time the simplex relay R1270 restores and then reoperates, it interrupts and then recompletes at the contacts 1273, the previously mentioned circuit for maintaining operated the hold relay R1260; whereby the latter relay remains operated during impulsing as it is of the slow-to-release type. Also, each time the simplex relay R1270 restores and then reoperates, it completes and then interrupts, at the contacts 1272, a circuit, including the contacts 1264 and 1241, for operating the dial relay R1360; whereby the latter relay operates and remains operated during impulsing as it is of the slow-to-release type. Upon operating the dial relay R1360 completes, at the contacts 1361, a path, including the resistor 1223 and the contacts 1261, 1271 and 1251, across the line conductors C1281 and C1282 of the trunk 1280; thereby to improve impulsing over the trunk 1280 and the line circuit 770 to the connector of the link 884. Finally, each time the simplex relay R1270 restores and then reoperates, it interrupts and then recompletes, at the contacts 1271, the previously traced path across the line conductors C1281 and C1282 of the trunk 1280; whereby the impulses of the second digit 2 are transmitted over the trunk 1280 and the line circuit 770 to the connector of the link 884 in order to effect corresponding operation thereof.

At the conclusion of the second digit 2 dialed at the calling subscriber substation T1, the line relays R1080 and R1110 in the trunk circuit 1000 remain operated; whereby the hold relay R1070 is retained in its operated position and shortly thereafter the dial relay R1060 restores. Upon restoring the dial relay R1060 removes the resistors 1025 and 1125 from across the winding of the line relay R1080 and the winding of the supervisory relay R1120, respectively. Also at this time the winding of the supervisory relay R1120 in the trunk circuit 1000 and the winding of the simplex relay R1270 in the trunk circuit 1200 are steadily energized in series circuit relation; whereby the relays mentioned are retained in their operated positions.

The operated simplex relay R1270 in the trunk circuit 1200 retains operated the hold relay R1260 and effects restoration of the dial relay R1360 shortly thereafter, since the latter relay is of the slow-to-release type. Upon restoring the dial relay R1360 interrupts, at the contacts 1361, the previously traced path for connecting the resistor 1223 across the line conductors C1281 and C1282 of the trunk 1280; whereby the upper winding of the answer relay R1240 is no longer short-circuited by the resistor 1223. Also upon restoring, the dial relay R1360 completes, at the contacts 1364, a holding circuit, including the contacts 1342, 1341, 1257 and 1262, for energizing in series the upper and lower windings of the seize relay R1340; and a multiple path, also including the contacts 1258, for applying ground potential in the trunk circuit 1200 to the control conductor C1283 of the trunk 1280, thereby to retain operated the link 884.

In view of the foregoing explanation of the manner in which the second digit 2 dialed at the calling subscriber substation T1 is received by the trunk circuit 1000 and repeated therefrom over the trunk 1100 to the trunk circuit 1200 and then repeated therefrom to the connector of the link 884, it will be understood that the third digit 3 dialed at the calling subscriber substation T1 is transmitted in an identical manner to the connector of the link 884. The connector of the link 884 responds to the digits 2 and 3 to select the subscriber line 881 extending to the called subscriber substation T2. The subsequent operation of the connector of the link 884 depends upon the idle or busy condition of the called subscriber substation T2 at this time; and in the event the called subscriber substation T2 is busy at this time, the connector of the link 884 operates in order to return busy tone current over the trunk 1280 to the trunk circuit 1200; which busy tone current traversing the upper right-hand winding and the lower right-hand winding of the repeating coil RC1275 induces a corresponding busy tone current in the left-hand windings thereof. The busy tone current is returned over the trunk 1190 and traversing the right-hand windings of the repeating coil RC1175 induces a corresponding busy tone current in the upper left-hand winding and the lower left-hand winding thereof; which busy tone current is returned over the loop circuit to the calling subscriber substation T1 in order to indicate to the subscriber thereat that the desired connection cannot be had at this time by virtue of the busy condition of the called subscriber substation T2.

On the other hand, in the event the called subscriber substation T2 is idle at this time, ringing current is projected from the connector of the link 884 over the subscriber line 881 thereto and the line circuit 882 is operated in order to mark the subscriber line 881 as busy to the other links 884, etc., having access thereto. Also, ringback tone current is returned from the connector of the link 884 over the previously traced connection to the calling subscriber substation T1 in order to indicate to the subscriber thereat that the called subscriber substation T2 is being rung.

When the subscriber at the called subscriber substation T2 answers the call, the connector of the link 884 operates in order to reverse the polarity of the trunk 1280; whereby the upper winding of the answer relay R1240 is poled to operate. Upon operating, the answer relay R1240 completes, at the contacts 1242, a circuit for energizing the upper winding of the control relay R1350; whereby the latter relay operates. Upon operating the control relay R1350 completes, at the contacts 1354 a holding circuit, including the contacts 1222 and 1250 and the resistor 1225, for energizing the winding of the simplex relay R1270; interrupts, at the contacts 1353, the previously traced original path for connecting ground potential by way of the winding of the simplex relay R1270 to the simplex conductor C1276; and completes, at the contacts 1352, a path, including the contacts 1374 for connecting battery potential by way of the winding of the supervisory relay R1220 to the simplex conductor C1276. Accordingly, at this time the winding of the supervisory relay R1220 in the trunk circuit 1200 is short-circuited in series with the winding of the supervisory relay R1120 in the trunk circuit 1000; whereby the supervisory relay R1220 is retained in its restored position and the supervisory relay R1120 restores.

Upon restoring, the supervisory relay R1120 in the trunk circuit 1000 completes, at the contacts 1121, a circuit, including the contacts 1071, 1062 and 1131, for energizing the winding of the cut-off relay R1020, and a multiple circuit, also including the contacts 1081, for energizing the winding of the reverse battery relay R1010; whereby the cut-off relay R1020 and the reverse battery relay R1010 operate shortly thereafter, both of these relays being of the slow-to-operate type. Upon operating, the cut-off relay R1020 interrupts, at the contacts 1021, the previously traced connection between the winding of the timer relay R1030 and the timer conductor C1024, thereby positively to prevent operation of the timer relay R1030 under the control of the associated timer, not shown. Upon operating, the reverse battery relay R1010 completes, at the contacts 1015, a holding circuit for energizing the winding thereof, and including the contacts 1131, 1121, 1062 and 1071. Also the reverse battery relay R1010 reverses, at the contacts 1011, 1012, 1013 and 1014, the polarity of the trunk 400 with respect to the line relays R1080 and R1110; which reversal of polarity over the trunk 400 and the link 390 is effective to operate a meter, not shown, individually associated with the calling subscriber substation T1 or otherwise to assess a charge against the calling subscriber substation T1. At this time an established connection is completed between the calling subscriber substation T1 in the tandem office 30 and the called subscriber substation T2 in the sub-office 40.

At the conclusion of the established connection, when the subscriber at the called subscriber substation T2 disconnects, the connector of the link 884 is operated in order again to reverse the polarity of the trunk 1280; whereby the answer relay R1240 in the trunk circuit 1200 is poled to restore. Upon restoring, the answer relay R1240 interrupts, at the contacts 1242, the previously mentioned circuit for energizing the upper winding of the control relay R1350, thereby to cause the latter relay to restore. Upon restoring, the control relay R1350 interrupts, at the contacts 1352, the previously traced path for connecting battery potential by way of the winding of the supervisory relay R1220 to the simplex conductor C1276; interrupts, at the contacts 1354, the previously traced holding circuit for maintaining operated the simplex relay R1270; and recompletes, at the contacts 1353, the previously traced original path for applying ground potential by way of the winding of the simplex relay R1270 to the simplex conductor C1276. Accordingly, at this time, the winding of the simplex relay R1270 in the trunk circuit 1200 is again energized in series with the winding of the supervisory relay R1120 in the trunk circuit 1000; whereby the simplex relay R1270 is retained in its operated position and the supervisory relay R1120 reoperates. Upon reoperating, the supervisory relay R1120 interrupts, at the contacts 1121, the previously traced circuits for maintaining operated the cut-off relay R1020 and the reverse battery relay R1010. Upon restoring, the reverse battery relay R1010 again reverses, at the contacts 1011, 1012, 1013 and 1014, the polarity of the trunk 400 with respect to the line relays R1080 and R1110 in the trunk circuit 1000; however, without effect at this time. Upon restoring, the cut-off relay R1020 again completes, at the contacts 1021, the previously traced connection between the winding of the timer relay R1030 and the timer conductor C1024 extending to the timer, not shown; whereby operation of the timer is again rendered effective.

When the subscriber at the calling subscriber substation T1 disconnects, the loop circuit extending to the line relays R1080 and R1110 in the trunk circuit 1000 is interrupted; whereby the relays mentioned restore. Upon restoring, the line relay R1110 interrupts, at the contacts 1111, the previously mentioned circuit for maintaining operated the hold relay R1070; whereby the latter relay restores shortly thereafter, it being of the slow-to-release type. Upon restoring the hold relay R1070 interrupts, at the contacts 1072, the previously traced circuit for maintaining operated the time release relay R1130. Upon restoring, the time release relay R1130 interrupts, at the contacts 1134, the previously mentioned path for applying ground potential to the control conductor C403 of the trunk 400, thereby to effect the release of the link 390, and to mark the trunk 400 as idle to the links 390, etc., having access thereto. When the link 390 is thus released, the line circuit 387 is operated in order again to mark the subscriber line 386 as idle to the links 390, etc., having access thereto. Also upon restoring, the time release relay R1130 interrupts, at the contacts 1135, the previously mentioned circuit for applying ground potential to the timer start conductor C1138 in order to arrest operation of the timer, not shown. Also, the time release relay R1130 interrupts, at the contacts 1137, the previously traced connection between the winding of the timer relay R1030 and the timer conductor C1024. Also when the line relay R1110 restored, it interrupted, at the contacts 1113, the previously traced path for applying battery potential by way of the winding of the supervisory relay R1120 to the simplex conductor C1176 in order to effect restoration of the supervisory relay R1120. Finally, upon restoring, the hold relay R1070 recompleted, at the contacts 1074, the previously traced original path for applying ground potential by way of the winding of the simplex relay R1170 to the simplex conductor C1176; whereby the winding of the simplex relay R1170 in the trunk circuit 1000 is short-circuited in series with the winding of the simplex relay R1270 in the trunk circuit 1200. Accordingly, at this time, the simplex relay R1170 is retained in its restored position and the simplex relay R1270 restores.

Upon restoring, the simplex relay R1270 in the trunk circuit 1200 interrupts, at the contacts 1273, the previously mentioned circuit for maintaining operated the hold relay R1260; whereby the latter relay restores shortly thereafter, it being of the slow-to-release type. Upon restoring, the hold relay R1260 interrupts, at the contacts 1262, the circuit for maintaining operated the switch relay R1250 and the multiple circuit for energizing the lower winding of the answer relay R1240. Upon restoring, the switch relay R1250 interrupts, at the contacts 1251, 1253, 1255 and 1256, further points in the previously traced path for connecting the upper winding of the answer relay R1240 across the line conductors C1281 and C1282 of the trunk 1280. Also, the hold relay R1260 interrupts, at the contacts 1262, the previously traced path for applying ground potential to the control conductor C1283 of the trunk 1280, thereby to bring about the release of the link 884. Finally, the hold relay R1260 interrupts, at the contacts 1262, the previously traced holding circuit for maintaining operated the seize relay R1340 in order to cause the latter relay to restore shortly thereafter, it being of the slow-to-release type. Finally, the switch relay R1250 interrupts, at the contacts 1259, the previously traced path for applying ground potential to the control conductor C1383 of the trunk 1380, thereby to mark the trunk 1380 as idle to the links 884, etc., having access thereto. When the link 884 is thus released, the line circuit 882 operates again to mark the subscriber line 881 as idle to the links 884, etc., having access thereto. At this time the established connection between the calling subscriber substation T1 and the called subscriber substation T2 is released, and all of the apparatus involved therein is completely released and available for further use.

Reconsidering the extension of the connection from the calling subscriber substation T1 in the tandem office 30 to the called subscriber substation T2 in the sub-office 40, it is again noted that when the call was answered at the called subscriber substation T2, the supervisory relay R1120 in the trunk circuit 1000 was restored to bring about operation of the cut-off relay R1020 in the manner previously explained. Thus it will be understood that in the event the call is not answered at the called subscriber substation T2 within a predetermined time interval that the cut-off relay R1020 will remain in its restored position for the predetermined time interval mentioned in order to bring about operation of the timer relay R1030 under the control of the associated timer, not shown, as explained below. Also, at the conclusion of the established connection, when the subscriber at the called subscriber substation T2 disconnects, the supervisory relay R1120 in the trunk circuit 1000 is reoperated effecting restoration of the cut-off relay R1020; whereby the timer relay R1030 may be operated under the control of the associated timer, not shown, after the predetermined time interval mentioned.

Now assuming that the subscriber at the called subscriber substation T2 does not answer the call within the predetermined time interval mentioned, or that the subscriber at the calling subscriber substation T1 does not disconnect within the predetermined time interval mentioned, after the subscriber at the called subscriber substation T2 disconnects the restored cut-off relay R1020 in the trunk circuit 1000 permits the winding of the timer relay R1030 to be connected for the predetermined time interval mentioned to the timer conductor C1024; whereupon the timer, not shown, operates to apply ground potential to the timer conductor C1024. This application of ground potential to the timer conductor C1024 completes the previously traced circuit for operating the timer relay R1030. Upon operating the timer relay R1030 completes, at the contacts 1031, a holding circuit, including the contacts 1071, 1062, 1021 and 1137, for energizing the winding thereof; and interrupts, at the contacts 1032, the previously traced original operating circuit for energizing the winding thereof. Also the timer relay R1030 completes, at the contacts 1033, an alternative holding circuit, including the contacts 1072 and the timer conductor C1016, for maintaining operated the time release relay R1130, the timer conductor C1016 having ground potential thereon at this time. Finally, the timer relay R1030 interrupts, at the contacts 1034, the previously traced original circuit for maintaining operated the timer release relay R1130. After an additional time interval the timer, not shown, operates to interrupt the application of ground potential upon the timer conductor C1016, thereby to effect the restoration of the time release relay R1130. Accordingly, at the expiration of the predetermined time interval mentioned and the additional time interval mentioned, the time release relay R1130 restores. Upon restoring, the time release relay R1130 interrupts, at the contacts 1134, the previously mentioned path for applying ground potential to the control conductor C403 of the trunk 400, thereby to effect the release of the link 390; whereby the line relays R1080 and R1110 in the trunk circuit 1000 are restored. Upon restoring, the line relay R1110 effects the restoration of the hold relay R1070 shortly thereafter. Also, upon restoring, the time release relay R1130 interrupts, at the contacts 1137, the previously traced holding circuit for maintaining operated the timer relay R1030; whereby the latter relay restores shortly thereafter, it being of the slow-to-release type. Further, the time release relay R1130 interrupts, at the contacts 1135, the previously mentioned path for applying ground potential to the timer start conductor C1138 in order to arrest operation of the associated timer, not shown. When the line relay R1110 restored, it effected restoration of the supervisory relay R1120 and reconnection of ground potential by way of the winding of the simplex relay R1170 to the simplex conductor C1176; all in the manner previously explained. At this time the trunk circuit 1000 is completely released and is marked as idle to the links 390, etc., having access thereto by virtue of the absence of ground potential from the control conductor C403 of the trunk 400.

When the trunk circuit 1000 is thus released, the trunk circuit 1200 is released in order to effect the release of the link 884; all in the manner previously explained. Also when the link 390 is released, the line circuit 387 is operated in order to lock out of service the subscriber line 386 extending to the calling subscriber substation T1. Subsequently, when the subscriber at the calling subscriber substation T1 disconnects, the line circuit 387 is controlled in order again to place the subscriber line 386 in service and to mark it as idle to the links 390, etc., having access thereto.

In view of the foregoing description, it will be understood that a connection may be extended from a calling pay station in the tandem office 30 to a called subscriber substation in the sub-office 40 in a substantially identical manner. In this conjunction it is noted that the pay stations in the tandem office 30 are of the prepayment type and that when the call is answered at the called subscriber substation or pay station in the sub-office 40, the reverse battery relay R1010 in the trunk circuit 1000 operates to reverse the polarity of the trunk 400 in the manner previously explained; which reversal of polarity over the trunk 400 is effective to collect the coin or check deposited at the calling pay station in the tandem office 30.

Finally, in conjunction with the extension of connections from subscriber substations in the tandem office 30 to subscriber substations in the sub-office 40, it is noted that some of the subscriber substations in the tandem office 30 are of the restricted service type as previously noted; whereby such restricted service subscriber substations may not extend connections to called subscriber substations in the sub-office 40; and in the event such is attempted, the link 390, etc., in use responds to the prefix digit 9 that is dialed thereinto in the manner previously explained in order to cause busy tone current to be returned over the subscriber line to the calling restricted service subscriber substation in the tandem office 30 in order to indicate to the subscriber thereat that the desired connection may not be had because of the restriction noted. Accordingly, it is necessary for restricted service subscriber substations in the tandem office 30 to obtain the assistance of the operator at the switchboard 200 in the toll office 10 in the extension of connections to called subscriber substations in the sub-office 40. Accordingly, it is necessary for the subscriber at a restricted service subscriber substation in the tandem office 30 first to extend a connection to the switchboard 200 in the toll office 10 in order to obtain the desired connection mentioned; all explained more fully hereinafter.

*Sect. 5.—A call from a subscriber substation or a paystation in the tandem office to the switchboard in the toll office*

First assuming that a call is to be extended from a subscribed substation, such, for example, as the subscriber substation T1 in the tandem office 30 to the operator switchboard 200 in the toll office 10, the subscriber at the calling subscriber substation T1 first initiates the call; whereby the link 390 may be taken for use in the manner previously explained. The subscriber at the calling subscriber substation T1 then dials the single digit 0; whereby the connector of the link 390 responds to the digit 0 to select the corresponding fourth level and then an idle trunk terminated therein, such, for example, as the trunk 470 extending to the toll line circuit 250, the trunk 470 being marked as idle to the connector of the link 390 by the absence of ground potential upon the control conductor C473 thereof. When the connector of the link 390 seizes the trunk 470, a loop circuit is completed for energizing in series the windings of the line relays R330 and R410 in the toll line circuit 250; this loop circuit extending from ground by way of the winding of the line relay R410, the contacts 315, the conductor C227, the upper right-hand winding of the repeating coil RC223, the conductor C225 and the contacts 464 to the line conductor C472 of the trunk 470; and from battery potential by way of the winding of the line relay R330, the contacts 314, the conductor C226, the upper left-hand winding of the repeating coil RC223, the conductor C224 and the contacts 462 to the line conductor C471 of the trunk 470. At this time the line conductors C471 and C472 of the trunk 470 are connected together by way of the link 390 and the subscriber line 386 at the calling subscriber substation T1. When this loop circuit is thus completed, both of the line relays R330 and R410 operate. Upon operating the line relay R330 completes, at the contacts 331, a circuit for operating the hold relay R350; and completes, at the contacts 332, a circuit for operating the supervisory relay R240. Upon operating the hold relay R350 completes, at the contacts 351, a circuit, including the contacts 262, for energizing in series the upper and lower windings of the seize relay R430; thereby to cause the latter relay to operate. Also the hold relay R350 completes, at the contacts 352, a circuit, including the contacts 422, for operating the time release relay R370. Upon operating, the time release relay R370 completes, at the contacts 371, a circuit for operating the time release relay R340; and completes, at the contacts 373, a path for applying ground potential by way of the lower winding of the tone relay R440 to the control conductor C473 of the trunk 470; whereby the lower winding of the tone relay R440 is energized, causing the latter relay to operate. Also the application of ground potential by way of the lower winding of the tone relay R440 to the control conductor C473 of the trunk 470 retains operated the link 390 and marks the trunk 470 as busy to the other links 390, etc. Further the time release relay R370 completes, at the contacts 375, a path for applying ground potential to the control conductor C483 of the trunk 480, thereby to mark the trunk 480 and consequently the toll line circuit 250 as busy to the repeater and trunk selector 500.

Upon operating the time release relay R340 completes, at the contacts 344, a path for applying ground potential to the timer start conductor C426, thereby to initiate operation of the timer 425. Also, the time release relay R340 completes, at the contacts 343, a path, including the contacts 353, 366 and 424 for applying battery potential by way of the winding of the timer relay R420 to the timer conductor C427 extending to the timer 425; however, the timer relay R420 is not operated at this time. Upon operating, the seize relay R430 completes, at the contacts 432, a circuit for operating the start relay R450. Upon operating, the start relay R450 completes, at the contacts 451, a circuit for operating the start relay R445; and completes, at the contacts 452, a path for applying ground potential to the motor start conductor C413. Upon operating the start relay R445 completes, at the contacts 448, a path for applying ground potential to the auxiliary tone start conductor C414. Accordingly, at this time the operation of the motor equipment and the auxiliary tone equipment, both not shown, are initiated. Also the start relay R445 completes, at the contacts 446, a connection, including the contacts 462, the condenser 415, the contacts 322 and the condenser 344, between the line conductor C471 of the trunk 470 and the ring-back tone conductor C333; whereby ring-back tone current is returned over the trunk 470, the link 390 and the subscriber line 386 to the calling subscriber substation T1 in order to indicate to the subscriber thereat that the switchboard 200 in the toll office 10 is being rung.

Upon operating the supervisory relay R240 interrupts, at the contacts 241, a normally completed termination circuit including the condenser 229 and the resistor 228 across the conductors C224 and C225 extending to the outside terminals of the upper windings of the repeating coil RC223. Also the supervisory relay R240 interrupts, at the contacts 243, the normal path for applying ground potential by way of the upper winding of the signal relay R230 to the simplex conductor C222; and completes, at the contacts 244, a path for applying battery potential by way of the ballast lamp 246 to the junction between the upper end intermediate windings of the signal relay R230. At this time the lower winding of the signal relay R230 is normally energized; and now the upper and intermediate windings thereof are energized in opposite directions; whereby the signal relay R230 is retained in its restored position. However, ground potential is removed from the simplex conductor C222 and battery potential is applied thereto and consequently over the lower windings of the repeating coil RC223, the line conductors of the toll line 220 and the upper windings of the repeating coil RC217 to the simplex conductor C221 in the toll line circuit 210. This application of battery potential to the simplex conductor C221 completes a direct circuit, including the contacts 211, for energizing the right-hand winding of the signal relay R215 and a series circuit for energizing the intermediate and right-hand windings of the signal relay R215. The left-hand winding of the signal relay is normally energized; whereby the signal relay R215 is operated at this time. Upon operating, the signal relay R215 completes, at the contacts 216, a circuit, including the conductor C204, for illuminating the supervisory lamp L205 at the switchboard 200 in order to indicate to the operator thereat that a call is waiting to be answered on the toll line circuit 210.

The operator at the switchboard 200 answers the call by connecting an idle one of the cord circuits thereat, not shown, to the line conductors C201 and C202 and ground potential to the control conductor C203 extending to the toll line circuit 210; whereby the simplex pulse relay R210 in the toll line circuit 210 is operated. Upon operating the simplex pulse relay R210 interrupts, at the contacts 211, the previously traced original circuit for energizing the right-hand winding of the signal relay R215; and completes, at the contacts 212, a path for applying battery potential by way of the ballast lamp 213 through the right-hand winding of the signal relay R215 to the simplex conductor C221; whereby the signal relay R215 is retained in its operated position. However, the application of battery potential to the simplex conductor C221 in the toll line circuit 210 and consequently over the toll line 220 to the simplex conductor C222 in the toll line circuit 250 is effective to short-circuit the upper winding of the signal relay R230; whereby the latter relay operates.

Upon operating the signal relay R230 completes, at the contacts 231, a circuit for operating the pulse relay R260. Upon operating the pulse relay R260 interrupts, at the contacts 262, the previously traced circuit for energizing in series the upper and lower windings of the seize relay R430, thereby to cause the latter relay to restore shortly thereafter, it being of the slow-to-release type. Also, the pulse relay R260 completes, at the contacts 263, a circuit for operating the hold relay R360. Upon operating the hold relay R360 completes, at the contacts 362, a circuit, including the contacts 263, 341 and 325, for energizing the winding of the control relay R320, thereby to cause the latter relay to operate shortly thereafter, it being of the slow-to-operate type. Upon operating, the control relay R320 completes, at the contacts 324, a holding circuit, including the contacts 252, 363 and 422, for energizing the winding thereof; and interrupts, at the contacts 325, the previously traced original operating circuit therefor. Also the control relay R320 interrupts, at the contacts 322, the previously traced path for returning ring-back tone current from the ring-back tone conductor C333 over the trunk 470 and the link 390 to the calling subscriber substation T1. Further the hold relay R360 interrupts, at the contacts 366, the previously traced connection between the winding of the timer relay R420 and the timer conductor C427 extending to the timer 425, thereby positively to prevent operation of the timer relay R420. Further, the hold relay R360 completes, at the contacts 363, a holding circuit, including the contacts 422 and 377, for maintaining operated the time release relay R370.

Upon restoring the seize relay R430 completes, at the contacts 431, a path, including the contacts 447, 323 and 446 and the condenser 415, for bridging the upper winding of the tone relay R440 across the conductors C224 and C225; whereby any tone voltage induced in the upper winding of the tone relay R440 by the lower winding thereof is impressed across the conductors C224 and C225 and returned over the toll line 220 to the toll line circuit 210 and consequently to the switchboard 200 in the toll office 10. However, in the present example, no tone voltage is induced in the upper winding of the tone relay R440 since the present call is initiated at the calling subscriber substation T1. Also upon restoring the seize relay R430 interrupts, at the contacts 432, the previously mentioned circuit for maintaining operated the start relay R450 in order to cause the latter relay to restore shortly thereafter since it is of the slow-to-release type. Upon restoring, the start relay R450 interrupts, at the contacts 451, the previously mentioned circuit for maintaining operated the start relay R445 in order to cause the latter relay to restore shortly thereafter since it is of the slow-to-release type. Upon restoring the start relay R445 interrupts, at the contacts 446 and 447, the path for bridging the upper winding of the tone relay R440 across the conductors C224 and C225, thereby to terminate the return of tone to the operator switchboard 200 in the toll office 10, in the event such tone is returned thereto.

At this time a connection is established between the calling subscriber substation T1 in the tandem office 30 and the called switchboard 200 in the toll office 10; whereupon the subscriber at the calling subscriber substation T1 advises the operator at the called switchboard 200 concerning the extension of the connection or the required service.

After the operator at the switchboard 200 has extended the established connection, should it be necessary for the subscriber at the calling subscriber substation T1 again to signal the operator at the switchboard 200, this may be accomplished by operating the switchhook at the calling subscriber substation T1. More particularly, when the subscriber at the calling subscriber substation T1 operates the switchhook thereat, the line relays R330 and R410 in the toll line circuit 250 follow over the loop circuit extending to the calling subscriber substation T1. Each time the line relay R330 restores and then reoperates, it interrupts and then recompletes, at the contacts 332, the previously mentioned circuit for maintaining operated the supervisory relay R240; whereby the latter relay follows. Each time the supervisory relay R240 restores and then reoperates, it controls the contacts 244 and 243; whereby battery is first removed from and ground potential is applied to the simplex conductor C222, and then conversely; whereby the signal relay R215 in the trunk circuit 210 restores and then reoperates. Each time the signal relay R215 restores and then reoperates, it interrupts and then recompletes, at the contacts 216, the previously mentioned circuit for illuminating the supervisory lamp L205 at the switchboard 200; whereby the latter lamp is flashed indicating that the subscriber at the calling subscriber substation T1 requires the services of the operator at the switchboard 200. The operator at the switchboard 200 then re-enters the connection and converses with the subscriber at the calling subscriber substation T1.

At the conclusion of the established connection, when the subscriber at the calling subscriber substation T1 in the tandem office 30 disconnects, the loop circuit extending by way of the link 390 and the trunk 470 to the toll line circuit 250 is interrupted; whereby the line relays R330 and R410 in the toll line circuit 250 restore. The line relay R330 effects the restoration of the supervisory relay R240; whereby the latter relay effects the restoration of the signal relay R215 in the toll line circuit 210; and the latter relay effects extinguishing of the supervisory lamp L205 at the switchboard 200; all in the manner previously explained. When the supervisory lamp L205 is thus extinguished, it indicates to the operator at the switchboard 200 that the subscriber at the calling subscriber substation T1 in the tandem office 30 has disconnected.

Also upon restoring the line relay R330 interrupts, at the contacts 331, the previously traced circuit for maintaining operated the hold relay R350; whereby the latter relay restores shortly thereafter, it being of the slow-to-release type. Upon restoring the hold relay R350 completes, at the contacts 354, an alternative connection, including the contacts 343, 365 and 424 between the winding of the timer relay R420 and the timer conductor C427 extending to the timer 425.

When the operator at the switchboard 200 then disconnects the cord circuit thereat from the conductors C201, C202 and C203 extending to the toll line circuit 210, the circuit for maintaining operated the simplex pulse relay R210 is interrupted. Upon restoring, the simplex pulse relay R210 controls the contacts 212 and 211; whereby battery potential is removed from and ground potential is reapplied to the simplex conductor C221 in the toll line circuit 210; thereby to bring about the restoration of the signal relay R230 in the toll line circuit 250. Upon restoring the signal relay R230 interrupts, at the contacts 231, the circuit for maintaining operated the pulse relay R260. Upon restoring the pulse relay R260 interrupts, at the contacts 263, the circuit for maintaining operated the hold relay R360, thereby to cause the latter relay to restore shortly thereafter, it being of the slow-to-release type. Upon restoring the hold relay R360 interrupts, at the contacts 365, the previously traced connection between the winding of the timer relay R420 and the timer conductor C427 extending to the timer 425; and interrupts, at the contacts 363, the previously traced holding circuit for maintaining operated the time release relay R370 and the previously traced multiple holding circuit for maintaining operated the control relay R320. Upon restoring the time release relay R370 interrupts, at the contacts 371, the previously mentioned circuit for maintaining operated the time release relay R340 in order to cause the latter relay to restore shortly thereafter, it being of the slow-to-release type. Also the time release relay R370 interrupts, at the contacts 373, the previously traced circuit for energizing the lower winding of the tone relay R440; whereby the latter relay restores. Also when the contacts 373 are opened, ground potential is removed from the control conductor C473 of the trunk 470 in order to effect the release of the link 390 and to mark the trunk 470 as idle to the links 390, etc., having access thereto; whereby the line circuit 387 is controlled in order to mark the subscriber line 386 as idle to the links 390, etc., having access thereto. Also upon restoring, the time release relay R370 interrupts, at the contacts 375, the previously mentioned path for applying ground potential to the control conductor C483 of the trunk 480, thereby to mark the trunk 480 and consequently the toll line circuit 250 as idle to the repeater and trunk selector 500. At this time the established connection between the calling subscriber substation T1 in the tandem office 30 and the called switchboard 200 in the toll office 10 is released and all of the apparatus involved therein is completely released and available for further use.

Reconsidering the extension of the connection from the calling subscriber substation T1 in the tandem office 30 to the called switchboard 200 in the toll office 10, it is again noted that when the call was answered at the called switchboard 200, the hold relay R360 was operated; whereby the hold relay R360 upon operating, interrupted, at the contacts 366, the previously traced connection between the timer conductor C427 and the winding of the timer relay R420. Thus it will be understood, that in the event the call is not answered at the called switchboard 200 within a predetermined time interval, that the hold relay R360 will remain in its restored position for the predetermined time interval in order to bring about operation of the timer relay R420 under the control of the associated timer 425 as explained below.

Now assuming that the operator at the switchboard 200 in the toll office 10 does not answer the call within the predetermined time interval mentioned, the winding of the timer relay R420 is connected by way of the previously traced path to the timer conductor C427 for the predetermined time interval mentioned; whereupon the timer 425 operates to apply ground potential to the timer conductor C427. This application of ground potential to the timer conductor C427 completes the previously traced circuit for operating the timer relay R420. Upon operating the timer relay R420 completes, at the contacts 423, a holding circuit, including the contacts 366, 353 and 343, for energizing the winding thereof; and interrupts, at the contacts 424, the previously completed original operating circuit for energizing the winding thereof. Also the timer relay R420 completes, at the contacts 421, an alternative holding circuit, including the contacts 352, for maintaining operated the time release relay R370, the timer conductor C428 having ground potential thereon at this time. Finally, the timer relay R420 interrupts, at the contacts 422, the previously completed original circuit for maintaining operated the time release relay R370. After an additional time interval, the timer 425 operates to interrupt the application of ground potential upon the timer conductor C428, thereby to effect the restoration of the time release relay R370. Accordingly, at the expiration of the predetermined time interval mentioned and the additional time interval mentioned, the time release relay R370 restores. Upon restoring the time release relay R370 interrupts, at the contacts 373, the previously traced circuit for energizing the lower winding of the tone relay R440 in order to cause the latter relay to restore. Also, when the contacts 373 are opened, ground potential is removed from the control conductor C473 of the trunk 470, thereby to effect the release of the link 390 and to mark the trunk 470 as idle to the links 390, etc., having access thereto; whereby the line relays R330 and R410 are restored. Also upon restoring the time release relay R370 interrupts, at the contacts 371, the previously mentioned circuit for maintaining operated the time release relay R340; whereby the latter relay restores shortly thereafter, it being of the slow-to-release type. Upon restoring the time release relay R340 interrupts, at the contacts 343, the previously traced circuit for holding operated the timer relay R420; whereby the latter relay restores shortly thereafter, it being of the slow-to-release type. Also the time release relay R340 interrupts, at the contacts 344, the previously mentioned path for applying ground potential to the timer start conductor C426, thereby to arrest operation of the timer 425. Upon restoring the line relay R330 interrupts, at the contacts 331, the previously mentioned circuit for maintaining operated the hold relay R350 in order to cause the latter relay to restore shortly thereafter, it being of the slow-to-release type. Also upon restoring the line relay R330 interrupts, at the contacts 332, the previously mentioned circuit for maintaining operated the supervisory relay R240. Upon restoring the supervisory relay R240 controls the contacts 244 and 243; whereby ground potential is returned upon the simplex conductor C222 of the toll line circuit 250 and consequently upon the simplex conductor C221 in the toll line circuit 210 in order to bring about the restoration of the signal relay R215 therein; all in the manner previously explained. Also upon restoring the time release relay R370 interrupts, at the contacts 375, the previously mentioned path for applying ground potential to the control conductor C483 of the trunk 480, thereby again to mark the trunk 480 and consequently the toll line circuit 250 as idle to the repeater and trunk selector 500.

When the link 390 is thus released, the line circuit 387 is operated in order to lock out of service the subscriber line 386 extending to the calling subscriber substation T1. Subsequently when the subscriber at the calling subscriber substation T1 disconnects, the line circuit 387 is controlled in order again to place the subscriber line 386 in service and to mark it as idle to the links 390, etc., having access thereto.

Again considering the established connection from the calling subscriber substation T1 in the tandem office 30 to the called switchboard 200 in the toll office 10, it is noted that when the subscriber at the calling subscriber substation T1 disconnects, the line relays R330 and R410 in the toll line circuit 250 restore in order to effect the restoration of the hold relay R350 shortly thereafter, all in the manner previously explained. At this time the hold relay R350 occupies its operated position; whereby the alternative connection including the contacts 424, 365, 354 and 343 is completed between the timer conductor C427 and the winding of the timer relay R420. Accordingly, in the event the operator at the switchboard 200 fails to disconnect within the predetermined time interval mentioned, the timer 425 brings about operation of the timer relay R420 in the manner previously explained. After the additional time interval mentioned, the timer 425 brings about the restoration of the time release relay R370 and the consequent restoration of the time release relay R340 shortly thereafter, all in the manner previously explained. Also, when ground potential is removed from the timer conductor C428 extending to the timer 425, the previously traced alternative holding circuit for maintaining operated the control relay R320 is interrupted. Upon restoring, the control relay R320 completes, at the contacts 326, an alternative circuit including the contacts 364 for reoperating the supervisory relay R240. Upon reoperating the supervisory relay R240 again controls the contacts 243 and 244; whereby the signal relay R230 in the toll line circuit 250 is retained in its operated position and the signal relay R215 in the toll line circuit 210 reoperates. Upon reoperating the signal relay R215 again closes the contacts 216 in order again to illuminate the supervisory lamp L205 at the switchboard 200.

Subsequently, when the operator at the switchboard 200 disconnects, the simplex pulse relay R210 in the toll line circuit 210 restores in order to control the contacts 212 and 211; whereby the signal relay R215 in the roll line circuit 210 is retained in its operated position and the signal relay R230 in the toll line circuit 250 is restored. Upon restoring the signal relay R230 effects the restoration of the pulse relay R260 and the consequent restoration of the hold relay R360 shortly thereafter; all in the manner previously explained. Upon restoring the hold relay R360 interrupts, at the contacts 364, the previously traced alternative circuit for maintaining operated the supervisory relay R240. Upon restoring the supervisory relay R240 controls the contacts 244 and 243, thereby to maintain the signal relay R230 in the toll line circuit 250 in its restored position and to bring about restoration of the signal relay R215 in the toll line circuit 210. At this time the toll line circuits 250 and 210 are completely released.

It is again noted that when the call from the calling subscriber substation T1 in the tandem office 30 was answered at the switchboard 200 in the toll office 10, the polarity of the trunk 470 extending between the toll line circuit 250 and the link 390 was not reversed; whereby no charge was assessed against the calling subscriber substation T1. Also it will be understood that a connection may be extended from a calling paystation in the tandem office 30 to the switchboard 200 in the toll office 10 in a substantially identical manner. In this conjunction it is noted that the paystations in the tandem office 30 are of the prepayment type, but that when the call is answered at the switchboard 200 that the polarity of the trunk 470 is not reversed; whereby the coin or check deposited at the calling paystation in the tandem office 30 is not collected. The person at the calling paystation in the tandem office 30 may obtain the refund of the coin or check deposited thereat by momentarily replacing the receiver of the telephone instrument thereat upon its associated switchhook. Subsequently, the operator at the switchboard 200 may require the person at the calling paystation to deposit the required coins or checks thereat after the call has been extended and completed; whereupon appropriate tones are transmitted from the calling paystation in the tandem office 30 over the connection to the called switchboard 200 in the toll office 10 identifying the deposited coins or checks.

It is noted that the calling paystation in the tandem office 30 is identified as such to the operator at the switchboard 200 in the toll office 10 when the call is answered at the switchboard 200 by the transmission of paystation tone over the connection. More particularly, paystation tone current is applied in the line circuit associated with the calling paystation in the tandem office 30 by way of the link 390 to the control conductor C473 of the trunk 470, assuming that the link 390 and the toll line circuits 250 and 210 are employed in the connection. This paystation tone current traverses a circuit, including the contacts 373 and the lower winding of the tone relay R440 inducing a corresponding tone voltage in the upper winding thereof. When the call is answered at the switchboard 200 in the toll office 10, the simplex pulse relay R210 in the toll line circuit 210 operates effecting operation of the signal relay R230 in the toll line circuit 250 in the manner previously explained. Upon operating the signal relay R230 effects operation of the pulse relay R260 and the consequent restoration of the seize relay R430 shortly thereafter. When the seize relay R430 restores, it completes, at the contacts 431, the previously traced connection bridging the upper winding of the tone relay R440 across the conductors C224 and C225; whereby the tone current mentioned is returned by way of the repeating coil RC223 in the toll line circuit 250 to the toll line 220. The tone current traversing the toll line 220 and the repeating coil RC217 in the toll line circuit 210 causes the tone current to traverse the line conductors C201 and C202 extending between the toll line circuit 210 and the switchboard 200; whereby the operator thereat is apprised that the calling station in the tandem office 30 is of the paystation type.

Also upon restoring the seize relay R430 in the toll line circuit 250 effects the restoration of the start relay R450 shortly thereafter and the consequent restoration of the start relay R445 shortly thereafter. Upon restoring the start relay R445 interrupts, at the contacts 446 and 447, the previously traced path for bridging the upper winding of the tone relay R440 across the conductors C224 and C225, thereby to cut off the return of the tone current to the switchboard 200 in the toll office 10.

In the event the operator at the switchboard 200 fails to recognize the tone, she may momentarily disconnect from and then reconnect to the toll line circuit 210 in order to cause the relays previously described in the toll line circuit 250 to be recycled; whereby the tone current is again returned to the switchboard 200 and then cut off in the manner described above; whereby the operator at the switchboard 200 has another opportunity to recognize the tone indicating that the calling station in the tandem office 30 is of the paystation type. Finally, in conjunction with the extension of connections from subscriber substations and paystations in the tandem office 30 to the switchboard 200 in the toll office 10, it is again noted that there are no restrictions in the link 390 in response to the reception of the single digit 0 and that all such calls may be routed to the switchboard 200 in the toll office 10.

*Sect. 6.—A call from a subscriber substation or a paystation in the tandem office to the switchboard in the magneto office*

First assuming that a call is to be extended from a calling subscriber substation, such, for example, as the subscriber substation T1 in the tandem office 30 to the switchboard 286 in the magneto office 20, the subscriber at the calling subscriber substation T1 initiates the call; whereby the link 390 may be taken for use in the manner previously explained. The subscriber at the calling subscriber substation T1 dials the single digit 7; whereby the connector of the link 390 selects a trunk extending to an idle trunk line circuit, such, for example, as the trunk 391 extending to the trunk line circuit 281. The trunk line circuit 281 is identical to the toll line circuit 250; whereby the trunk line circuit 281 operates in order to seize the trunk line circuit 285 over the trunk line 280. The trunk line circuit 285 is identical to the toll line circuit 210; whereby the call is routed to the switchboard 286 in the magneto office 20. The operator at the switchboard 286 answers the call; whereby the trunk line circuit 285 controls the trunk line circuit 281 over the trunk line 280 in order to complete a connection between the calling subscriber substation T1 in the tandem office 30 and the called switchboard 286 in the magneto office 20 in a manner identical to that previously explained. The subscriber at the calling subscriber substation T1 advises the operator at the switchboard 286 concerning the extension of the connection; whereby the subsequent extension of the connection and the ultimate release thereof are the same as previously described in Sect. 5.

In conjunction with the extension of the connection from the calling subscriber substation T1 in the tandem office 30 to the switchboard 286 in the magneto office 20, it is noted that when the call is answered at the switchboard 286 the trunk line circuit 281 does not effect the reversal of polarity over the trunk 391; whereby no charge is assessed against the calling subscriber substation T1. However, it is noted that the link 390 does comprise restrictions against certain subscriber substations in the tandem office 30 extending connections to the switchboard 286 in the magneto office 20. Of course, after a connection is extended from a calling paystation in the tandem office 30 to the switchboard 286 in the magneto office 20, the coin or check deposited at the calling paystation in the tandem office 30 is not collected and is subsequently refunded; whereby the operator at the switchboard 286 may cause the person at the calling paystation in the tandem office 30 to deposit the required coin or check in the manner previously explained.

*Sect. 7.—A call from the switchboard in the toll office to a subscriber substation or paystation in the tandem office*

First assuming that a call is to be extended from the calling switchboard 200 in the toll office 10 to a called subscriber substation, such, for example, as the subscriber substation T1 in the tandem office 30, the operator at the switchboard 200 seizes a toll line circuit terminating an idle toll line extending between the toll office 10 and the tandem office 30, such, for example, as the toll line circuit 210 terminating the toll line 220. More particularly, the conductors C201, C202 and C203 extending to the toll line circuit 210 are seized; whereby the simplex pulse relay R210 operates. Upon operating the simplex pulse relay R210 controls the contacts 211 and 212; whereby the signal relay R215 in the toll line circuit 210 is retained in its restored position and the signal relay R230 in the toll line circuit 250 operates. Upon operating the signal relay R230 completes, at the contacts 231, the circuit for operating the pulse relay R260. Upon operating the pulse relay R260 completes, at the contacts 263, the previously mentioned circuit for operating the hold relay R360. Upon operating the hold relay R360 completes, at the contacts 363, a circuit, including the contacts 422 and 376, for operating the switch relay R310 and a multiple circuit for energizing the upper winding of the answer relay R270. Also the hold relay R360 completes, at the contacts 364, a circuit, including the contacts 326, for operating the supervisory relay R240. Upon operating the supervisory relay R240 controls the contacts 243 and 244; whereby the signal relay R230 in the toll line circuit 250 is retained in its operated position and the signal relay R215 in the toll line circuit 210 is operated. Upon operating the signal relay R215 completes, at the contacts 216, the previously mentioned circuit for illuminating the supervisory lamp L205 at the switchboard 200, thereby to give the operator thereat premature answer supervision, or stop in dial supervision. Specifically, the illumination of the supervisory lamp L205 indicates to the operator at the switchboard 200 that she should not dial at this time as the switching apparatus in the tandem office 30 is not in readiness to receive the first digit. Upon operating the switch relay R310 completes, at the contacts 311, 312 and 313, a bridge connection, including the contacts 261, between the impedance 264 and the lower winding of the answer relay R270 and the line conductors C381 and C382 of the trunk 380 extending to the line circuit 384; whereby the lower winding of the answer relay R270 is energized but is not poled to operate. Also the switch relay R310 interrupts, at the contacts 314 and 315, the normal connections between the line relays R330 and R410 and the conductors C226 and C227 extending to the upper windings of the repeating coil RC223; and completes, at the contacts 316, a path, including the contacts 372, for applying ground potential to the control conductor C473 of the trunk 470 in order to mark the trunk 470 as busy to the connectors of the links 390, etc., having access thereto. Also the switch relay R310 interrupts, at the contacts 318, the normally completed path, including the contacts 374, for applying battery potential by way of the upper winding of the seize relay R430 to the control conductor C483 of the trunk 480; and completes, at the contacts 317, a path, including the contacts 374, for applying ground potential to the control conductor C483. This application of ground potential to the control conductor C483 of the trunk 480 marks the trunk 480 as busy to the repeater and trunk selector 500. Finally, the switch relay R310 completes, at the contacts 310, a path for applying battery potential by way of the winding of the control relay R320 to the control conductor C383 of the trunk 380 extending to the line circuit 384.

When the lower winding of the answer relay R270 is thus bridged across the line conductors C381 and C382 of the trunk 380, the line circuit 384 is controlled in order to govern the distributor 388; whereby an idle one of the links 390, etc., is assigned for use at this time and in order to cause the finder of the assigned link to find the trunk 380. First assuming that the distributor 388 assigns the link 390 for use at this time and that the finder thereof finds the trunk 380, ground potential in the link 390 is applied to the control conductor C383 of the trunk 380, thereby completing a circuit for energizing the winding of the control relay R320; whereupon the latter relay operates shortly thereafter, it being of the slow-to-operate type. Upon operating, the control relay R320 completes, at the contacts 324, a holding circuit, including the contacts 252, 363 and 422, for energizing the winding thereof; and interrupts, at the contacts 326, the previously traced circuit for maintaining operated the supervisory relay R240. Upon restoring the supervisory relay R240 controls the contacts 244 and 243; whereby the signal relay R230 in the toll line circuit 250 is retained in its operated position and the signal relay R215 in the toll line circuit 210 is restored. Upon restoring the signal relay R215 interrupts, at the contacts 216, the previously mentioned circuit for illuminating the supervisory lamp L205 at the switchboard 200 in order to indicate to the operator thereat that she may dial the first digit since the switching apparatus in the tandem office 30 is in readiness to be controlled thereby. Also the control relay R320 interrupts, at the contacts 321, a normally completed connection, including the condenser 328 and the contacts 361 between the all-trunks-busy conductor C327 and the conductor C224. At this point, it is noted that the normally completed connection above described causes all-trunks-busy tone current to be returned from the toll line circuit 250 over the toll line 220 and the toll line circuit 210 to the switchboard 200 in the toll office 10. Normally this all-trunks-busy tone is returned to the switchboard 200 only during the brief time interval that the delay in dial signal is returned. However, should all of the links 390, etc., be busy at this time, the distributor 388 could not operate to assign an idle link; whereby the control relay R320 in the toll line circuit 250 would not be operated in a brief time interval. Thus the continued return of the all-trunks-busy tone from the toll line circuit 250 to the switchboard 200 would indicate to the operator thereat that all of the links 390, etc., in the tandem office 30 are busy at this time. In this event the operator at the switchboard 200 would disconnect from the conductors C201, C202 and C203 extending therefrom to the toll line circuit 210 in order to bring about the release of the toll line circuit 250 in a manner substantially identical to that described hereinafter.

Continuing now with the extension of the present connection and assuming that the link 390 has been connected to the trunk 380 in the manner explained above, the operator at the switchboard 200 proceeds to dial the directory number of the called subscriber substation T1 in the tandem office 30, which number may be 2543.

When the operator at the switchboard 200 dials the first digit 2, the simplex pulse relay R210 follows controlling the contacts 212 and 211; whereby the signal relay R215 in the toll line circuit 210 is retained in its restored position and the signal relay R230 in the toll line circuit 250 follows. Each time the signal relay R230 restores and then reoperates, it interrupts and then recompletes, at the contacts 231, the circuit for maintaining operated the pulse relay R260; whereby the latter relay follows. Each time the pulse relay R260 restores and then reoperates, it interrupts and then recompletes, at the contacts 261, the previously traced loop circuit extending by way of the line conductors C381 and C382 of the trunk 380 to the link 390; whereby the first digit 2 is transmitted to the connector of the link 390. Also each time the pulse relay R260 restores and then reoperates, it interrupts and then recompletes, at the contacts 263, the previously traced circuit for maintaining operated the hold relay R360; whereby the latter relay is retained in its operated position during impulsing, as it is of the slow-to-release type. Finally, each time the pulse relay R260 restores and then reoperates, it completes and then interrupts, at the contacts 262, a circuit, including the contacts 319 and 242, for operating the dial relay R250; whereby the latter relay operates and remains operated during impulsing as it is of the slow-to-release type. Upon operating the dial relay R250 completes, at the contacts 251, a path, including the resistor 253, for short-circuiting the impedance 264 in series with the lower winding of the answer relay R270, thereby to improve impulsing over the loop circuit, including the trunk 380, extending to the link 390. At the conclusion of the first digit 2 the simplex relay R210 in the toll line circuit 210 is retained in its operated position in order to control the contacts 212 and 211; whereby the signal relay R215 in the toll line circuit 210 is retained in its restored position and the signal relay R230 in the toll line circuit 250 is retained in its operated position. The operated signal relay R230 retains operated the pulse relay R260 and the latter relay retains operated the hold relay R360. Shortly thereafter the dial relay R250 restores as it is of the slow-to-release type, interrupting, at the contacts 251, the previously traced path for short-circuiting in series the impedance 264 and the lower winding of the answer relay R270.

In view of the foregoing explanation of the manner in which the first digit 2 dialed at the switchboard 200 is transmitted to the link 390, it will be understood that the remaining digits 5, 4 and 3 are transmitted thereto in an identical manner. At the conclusion of the fourth digit 3, the connector of the link 390 has selected the subscriber line 386 extending to the called subscriber substation T1 as well as the proper ringing code to be utilized for ringing purposes; which operation takes place at this time, assuming that the called subscriber substation T1 is idle. As ringing current is projected over the subscriber line 386 to the called subscriber substation T1, ring-back tone current is returned over the connection to the calling switchboard 200 in order to indicate to the operator thereat that the called subscriber substation T1 is being rung. On the other hand in the event the called subscriber substation T1 is busy at this time, busy tone current is returned over the connection to the calling switchboard 200 in order to indicate the condition noted; whereupon the operator at the switchboard 200 disconnects from the toll line circuit 210 in order to effect the release of the apparatus in a manner substantially identical to that described hereinafter.

Again assuming that the called subscriber substation T1 is idle at this time, when the call is answered thereat, the connector of the link 390 operates in order to reverse the polarity of the trunk 380; whereby the lower winding of the answer relay R270 is poled to operate. Upon operating the answer relay R270 completes, at the contacts 271, an alternative circuit for operating the supervisory relay R240; whereby the latter relay controls the contacts 243 and 244; retaining the signal relay R230 in the toll line circuit 250 in its operated position and effecting operation of the signal relay R215 in the toll line circuit 210. Upon operating the signal relay R215 completes, at the contacts 216, the previously traced circuit for illuminating the supervisory lamp L205 at the switchboard 200 in order to render to the operator thereat answer supervision. The operator at the calling switchboard 200 in the toll office 10 then converses with the subscriber at the called subscriber substation T1 in the tandem office 30 advising that there is a call for him. The operator at the switchboard then disconnects from the established connection in accordance with conventional practice.

During the established connection, the subscriber at the called subscriber substation T1 in the tandem office 30 may recall the operator at the switchboard 200 by controlling the associated switchhook thereat in order to cause the link 390 to bring about repeated reversals of polarity over the trunk 380; whereby the answer relay R270 follows. Each time the answer relay R270 restores and then reoperates, it interrupts and then recompletes, at the contacts 271, the circuit for maintaining operated the supervisory relay R240; whereby the latter relay follows. The supervisory relay R240 controls the contacts 244 and 243, thereby to retain operated the signal relay R230 in the toll line circuit 250 and to effect corresponding restoration and then reoperation of the signal relay R215 in the toll line circuit 210. Each time the signal relay R215 restores and then reoperates, it interrupts and then recompletes, at the contacts 216, the previously traced circuit for illuminating the supervisory lamp L205 whereby the latter lamp is flashed giving the operator at the switchboard 200 switchhook supervision. The operator at the switchboard 200 then reenters the connection and converses with the subscriber at the called subscriber substation T1.

At the conclusion of the established connection, the subscriber at the called subscriber substation T1 disconnects in order to cause the link 390 to reverse the polarity of the trunk 380, bringing about the restoration of the answer relay R270 and the consequent restoration of the supervisory relay R240. Upon restoring, the supervisory relay R240 controls the contacts 244 and 243, thereby to maintain operated the signal relay R230 in the toll line circuit 250 and to effect restoration of the signal relay R215 in the toll line circuit 210. Upon restoring the signal relay R215 interrupts, at the contacts 216, the circuit for illuminating the supervisory lamp L205 in order to render disconnect supervision to the operator at the switchboard 200. The operator at the switchboard 200 then disconnects from the conductors C201, C202 and C203 extending to the toll line circuit 210 in order to bring about the restoration of the simplex pulse relay R210. Upon restoring the simplex pulse relay R210 controls the contacts 211 and 212 in order to retain restored the signal relay R215 in the toll line circuit 210 and to bring about the restoration of the signal relay R230 in the toll line circuit 250. Upon restoring the signal relay R230 effects the restoration of the pulse relay R260; whereby the latter relay effects the restoration of the hold relay R360 shortly thereafter. Upon restoring the hold relay R360 interrupts, at the contacts 363, the circuit for maintaining operated the switch relay R310 and the multiple circuit for energizing the upper winding of the answer relay R270. Upon restoring the switch relay R310 interrupts, at the contacts 310, the circuit for maintaining operated the control relay R320 and the path for applying battery potential by way of the winding of the control relay R320 to the control conductor C383 of the trunk 380; whereby the link 390 is released. When the link 390 is thus released, the line circuit 387 is controlled in order to mark the subscriber line 386 extending to the called subscriber substation T1 as idle to the links 390, etc., having access thereto. At this time the established connection between the calling switchboard 200 in the toll office 10 and the called subscriber substation T1 in the tandem office 30 is released and all of the apparatus involved therein is completely released and available for further use.

In view of the foregoing, it will be understood that a connection from the calling switchboard 200 in the toll office 10 to a called paystation in the tandem office 30 may be set up in an identical manner.

*Sect. 8.—A call from the switchboard in the toll office to a subscriber substation in the sub-office*

First assuming that a call is to be extended from the calling switchboard 200 in the toll office 10 to a called subscriber substation, such, for example, as the subscriber substation T2 in the sub-office 40, the operator at the switchboard 200 seizes a toll line circuit terminating an idle toll line extending between the toll office 10 and the tandem office 30. For example, the operator at the switchboard 200 may route the connection via the toll line circuit 210, the toll line 220, the toll line circuit 250 and the trunk 380 to the link 390; all in the manner described in Sect. 7. When the toll line circuit 250 is first seized, a delay-in-dial signal is returned over the connection to the calling switchboard 200; and when the link 390 is operatively connected to the trunk 380, the delay-in-dial signal is cut off; all in the manner previously explained in Sect. 7.

At this time the link 390 is in readiness to receive the first digit and the operator dials the prefix digit 8, whereby the connector of the link 390 operates to select the trunk 490 extending to the repeater and trunk selector 500; whereupon the idle or busy condition thereof is tested. More particularly, the connector of the link 390 tests the trunk 490 as busy in the event ground potential appears upon the control conductor C493 thereof and tests the trunk 490 as idle by the absence of ground potential upon the control conductor C493 thereof. In the event the connector of the link 390 tests the trunk 490 as busy, busy tone current is returned over the connector to the calling switchboard 200 in the manner previously explained. On the other hand, in the event the connector of the link 390 tests the trunk 490 as idle, it operates to seize the trunk 490 and to complete a loop circuit for energizing the lower winding of the answer relay R270 in the toll line circuit 250 in series with the upper and lower windings of the line relay R590 in the repeater and trunk selector 500. This loop circuit extends from ground by way of the lower winding of the line relay R590, the contacts 633, the lower left-hand winding of the repeating coil RC690, the contacts 564, 552 and 542, to the line conductor C492 of the trunk 490; and from battery potential by way of the upper winding of the line relay R590, the contacts 631, the upper left-hand winding of the repeating coil RC690, the contacts 561 and 544, to the line conductor C491 of the trunk 490. The line conductors of the trunk 490 are extended by way of the link 390 to the line conductors C381 and C382 of the trunk 380 and thence looped together by way of the impedance 264 and the lower winding of the answer relay R270. When this series circuit is thus completed, the answer relay R270 is not poled to operate; however, the line relay R590 operates. Upon operating, the line relay R590 completes, at the contacts 593, a circuit for operating the hold relay R610; whereby the latter relay operates to complete, at the contacts 616, a path for applying ground potential to the control conductor C493 of the trunk 490. The application of ground potential to the control conductor C493 of the trunk 490 marks the trunk 490 as busy to the other links having access thereto and retains operated the link 390. Also the hold relay R610 interrupts, at the contacts 613, the normal connection, including the condenser 667, the contacts 584 and 630, for connecting the winding of the ring-down relay R665 to the simplex conductor C691; and completes, at the contacts 614, a connection, including the contacts 630 and 591, for applying ground potential by way of the simplex relay R660 to the simplex conductor C691. The ground potential applied to the simplex conductor C691 in the repeater and trunk circuit 500 is connected by way of the right-hand windings of the repeating coil RC890 to the line conductors of the trunk line 600 and consequently by way of the left-hand windings of the repeating coil RC670 to the simplex conductor C717 in the trunk circuit 700. This application of ground potential to the simplex conductor C717 completes a circuit, including the contacts 712, 721, 865 and the resistor 815, for energizing in series the upper and lower windings of the simplex relay R820 in the trunk circuit 700 and the winding of the simplex relay R660 in the repeater and trunk selector 500. When this series circuit is completed, the simplex relay R660 does not operate as it is of the marginal type; however, the simplex relay R820 does operate.

Upon operating the simplex relay R820 completes, at the contacts 823, a circuit for operating the hold relay R830. Upon operating, the hold relay R830 completes, at the contacts 833, a circuit, including the contacts 846 and 952, for operating the switch relay R730 and a multiple circuit for energizing the lower winding of the answer relay R750. Upon operating the switch relay R730 interrupts, at the contacts 733 and 734, the normal connections between the windings of the line relays R740 and R870 and the right-hand windings of the repeating coil RC760; and completes, at the contacts 736, a path, including the contacts 841, for applying ground potential to the control conductor C973 of the trunk 970, thereby to mark the trunk 970 as busy to the links 884, etc., having access thereto. Further, the switch relay R730 completes, at the contacts 731, a circuit, including the contacts 821, for bridging the impedance 755 and the upper winding of the answer relay R750 across the line conductors C801 and C802 of the trunk 800 extending to the incoming connector 885; and completes, at the contacts 732 and 735, an operative connection, including the contacts 821, between the line conductors C801 and C802 of the trunk 800 and the right-hand windings of the repeating coil RC760. Also the switch relay R730 completes, at the contacts 738, a path for applying battery potential by way of the winding of the control relay R860 to the control conductor C803 of the trunk 800; whereby the incoming connector 885 is seized; and when it is in readiness to receive the first digit, it operates to return ground potential over the control conductor C803 of the trunk 800, completing a circuit substantially identical to that traced above for operating the control relay R860.

Upon operating, the control relay R860 completes, at the contacts 866, a holding circuit, including the contacts 853, 833 and 952, for energizing the winding thereof; and completes, at the contacts 864, a direct path, including the contacts 753, 742, 721 and 712 for connecting battery potential by way of the upper winding of the simplex relay R820 to the simplex conductor C717. Also the control relay R860 interrupts, at the contacts 865, the previously traced original path for applying battery potential by way of the upper and lower windings of the simplex relay R820 and the resistor 815 to the simplex conductor C717. Accordingly, at this time the winding of the simplex relay R660 in the repeater and trunk selector 500 is energized in series with the upper winding of the simplex relay R820 in the trunk circuit 700; whereby the simplex relay R820 is retained in its operated position and the simplex relay R660 operates as it is of the marginal type.

Upon operating the simplex relay R660 in the repeater and trunk selector 500 completes, at the contacts 662, a circuit, including the contacts 571 and 611; for energizing the upper winding of the control relay R580; whereupon the latter relay operates; and completes, at the contacts 582, a holding circuit, including the contacts 611, for energizing the upper winding thereof.

At this time the operator at the switchboard 200 dials the directory number of the called subscriber substation T2 in the sub-office 40, which number may be 23. More particularly, the simplex pulse relay R210 in the toll line circuit 210 follows the impulses of the digit 2 repeating to the signal relay R230 in the toll line circuit 250 in the manner previously explained. The signal relay R230 repeats, at the contacts 231, to the pulse relay R260; and the latter relay repeats, at the contacts 261, to the line relay R590 in the repeater and trunk selector 500. The dial relay R250 in the toll line circuit 250 is operated and remains operated during impulsing, as previously noted. Each time the line relay R590 restores and then reoperates, it completes and then interrupts, at the contacts 592, a circuit, including the contacts 617, for energizing the upper winding of the dial relay R620 causing the latter relay to operate and remain operated during impulsing, as it is of the slow-to-release type. Upon operating the dial relay R620 interrupts, at the contacts 621, a point in a circuit traced hereinafter for operating the reverse battery relay R540 in order positively to prevent operation of the latter relay at this time. Also each time the line relay R590 restores and then reoperates, it interrupts and then recompletes, at the contacts 591, the previously traced circuit for energizing the winding of the simplex relay R660 in the repeater and trunk circuit 500 in series with the upper winding of the simplex relay R820 in the trunk circuit 700; whereby the relays mentioned follow. Restoration and reoperation of the simplex relay R660 is without effect at this time; while the simplex relay R820 repeats, at the contacts 821, the impulses of the digit over the line conductors of the trunk 800 to the incoming connector 885. Also, each time the simplex relay R820 restores and then reoperates, it completes and then interrupts, at the contacts 822, a circuit, including the contacts 751 and 737, for operating the dial relay R850; whereby the latter relay operates and remains operated during impulsing as it is of the slow-to-release type. Upon operating, the dial relay R850 completes, at the contacts 851, a path, including the resistor 816, for short-circuiting in series the upper winding of the answer relay R750 and the impedance 755.

At the conclusion of the digit 2, the simplex pulse relay R210 in the toll line circuit 210 is retained in its operated position in order to maintain the signal relay R230 in the toll line circuit 250 in its operated position. The operated signal relay R230 maintains operated the pulse relay R260; and shortly thereafter the dial relay R250 restores. The operated pulse relay R260 in the toll line circuit 250 retains operated the line relay R590 in the repeater and trunk selector 500. The operated line relay R590 retains interrupted, at the contacts 592, the circuit for maintaining operated the dial relay R620; whereby the latter relay restores shortly thereafter, it being of the slow-to-release type. The simplex relay R660 in the repeater and trunk circuit 500 and the simplex relay R820 in the trunk circuit 700 are retained in their operated positions. The operated simplex relay R820 retains interrupted, at the contacts 822, the circuit for maintaining operated the dial relay R850; whereby the latter relay restores shortly thereafter, it being of the slow-to-release type. Upon restoring the dial relay R850 interrupts, at the contacts 851, the previously traced path for short-circuiting in series the upper winding of the answer relay and the impedance 755.

In view of the foregoing, it will be understood that the digit 3 dialed at the calling switchboard 200 is repeated in an identical manner between the toll line circuit 210 and the toll line circuit 250, between the toll line circuit 250 and the repeater and trunk selector 500, between the repeater and trunk selector 500 and the trunk circuit 700 and from the trunk circuit 700 to the incoming connector 885. The incoming connector 885 responds to the two digits 2 and 3 in order to select the subscriber line 881 extending to the called subscriber substation T2. The subsequent operation of the incoming connector 885 depends upon the idle or busy condition of the called subscriber substation T2 at this time; and in the event the called subscriber substation T2 is busy, busy tone current is returned over the trunk 800, the trunk circuit 700, the trunk line 600, the repeater and trunk selector 500, the trunk 490, the link 390, the trunk 380, the toll line circuit 250, the toll line 220, and the toll line circuit 210 to the calling switchboard 200 in order to indicate to the operator thereat the condition noted. On the other hand in the event the called subscriber substation T2 is idle at this time, ring-back tone current is returned over the connection to the calling switchboard 200 and ringing current is projected over the subscriber line 881 to the called subscriber substation T2.

Assuming that the called subscriber substation T2 is idle at this time, when the subscriber thereat answers the call, the incoming connector 885 operates to reverse the polarity of the trunk 800; whereby the upper winding of the answer relay R750 is poled to operate. Upon operating the answer relay R750 completes, at the contacts 752, a path, including the contacts 742, 864, 721 and 712, for connecting battery potential by way of the upper and lower windings of the simplex relay R820 and the resistor 815 in series to the simplex conductor C717; and interrupts, at the contacts 753, the previously traced original path for connecting battery potential by way of the upper winding of the simplex relay R820 to the simplex conductor C717. Accordingly, at this time, the upper and lower windings of the simplex relay R820 are energized in series with the resistor 815 and the winding of the simplex relay R660; thus the simplex relay R820 in the trunk circuit 700 is retained in its operated position and the simplex relay R660 in the repeater and trunk selector 500 restores as it is of the marginal type. Upon restoring the simplex relay R660 completes, at the contacts 661, a holding circuit, including the contacts 571 and 581, for energizing the lower winding of the control relay R580; and a multiple circuit, also including the contacts 612 and 621, for energizing the lower winding of the reverse battery relay R540 in order to cause the latter relay to operate. Upon operating the reverse battery relay R540 reverses, at the contacts 541, 542, 543 and 544, the polarity of the trunk 490 with respect to the upper and lower windings of the line relay R590; whereby the lower winding of the answer relay R270 in the toll line circuit 250 is poled to operate. Upon operating the answer relay R270 effects operation of the supervisory relay R240; whereupon the latter relay controls the contacts 243 and 244 in order to retain operated the signal relay R230 in the toll line circuit 250 and to bring about operation of the signal relay R215 in the toll line circuit 210. Upon operating the signal relay R215 completes, at the contacts 216, the previously traced circuit for illuminating the supervisory lamp L205 at the switchboard 200 in order to render to the operator thereat answer supervision. The operator at the calling switchboard 200 in the toll office 10 then converses with the subscriber at the called subscriber substation T2 in the sub-office 40 advising that there is a call for him. The operator at the switchboard 200 then disconnects from the established connection in accordance with conventional practice.

During the established connection, the subscriber at the called subscriber substation T2 in the sub-office 40 may recall the operator at the switchboard 200 by controlling the associated switchhook thereat, in order to cause the incoming connector 885 to bring about repeated reversals of polarity over the trunk 800; whereby the answer relay R750 in the trunk circuit 700 follows. Each time the answer relay R750 restores, it recompletes, at the contacts 753, the previously traced direct circuit for applying battery potential by way of the upper winding of the simplex relay R820 to the simplex conductor C717; and interrupts, at the contacts 752, the previously traced circuit for applying battery potential by way of the upper and lower windings of the simplex relay R820 and the resistor 815 to the simplex conductor C717. On the other hand, each time the answer relay R750 reoperates, it recompletes, at the contacts 752, the above-traced high resistance circuit; and interrupts, at the contacts 753, the above traced low resistance circuit. The application alternately of low and high resistance battery potential to the simplex conductor C717 causes the simplex relay R660 in the repeater and trunk selector 500 alternately to operate and then to restore. Each time the simplex relay R660 operates and then restores, it interrupts and then recompletes, at the contacts 661, the previously traced circuit for maintaining operated the reverse battery relay R540; whereby the latter relay follows reversing alternately, at the contacts 541, 542, 543 and 544, the polarity of the trunk 490; whereby the answer relay R270 in the toll line circuit 250 follows causing the supervisory relay R240 likewise to follow. As the supervisory relay R240 follows, it controls the contacts 244 and 243 in order to retain operated the signal relay R230 in the toll line circuit 250 and to effect alternate restoration and reoperation of the signal relay R215 in the toll line circuit 210; whereby the latter relay flashes, at the contacts 216, the supervisory lamp L205 in order to render recall supervision to the operator at the switchboard 200. The operator at the switchboard 200 then re-enters the connection and converses with the subscriber at the called subscriber substation T2.

At the conclusion of the established connection, the subscriber at the called subscriber substation T2 disconnects in order to cause the incoming connector 885 to reverse the polarity of the trunk 800 effecting the restoration of the answer relay R750. Upon restoring the answer relay R750 completes, the previously traced low resistance circuit for energizing the upper winding of the simplex relay R820 in series with the winding of the simplex relay R660; whereby the simplex relay R820 in the trunk circuit 700 is retained in its operated position and the simplex relay R660 in the repeater and trunk selector 500 reoperates. Upon reoperating the simplex relay R660 effects the restoration of the reverse battery relay R540; whereby the latter relay reverses, at the contacts 541, 542, 543 and 544, the polarity of the trunk 490 in order to bring about the restoration of the answer relay R270 in the toll line circuit 250 and the consequent restoration of the supervisory relay R240. Upon restoring the supervisory relay R240 controls the contacts 244 and 243, thereby to retain operated the signal relay R230 in the toll line circuit 250 and to bring about restoration of the signal relay R215 in the toll line circuit 210. Upon restoring the signal relay R215 interrupts, at the contacts 216, the circuit for illuminating the supervisory lamp L205 at the switchboard 200 in order to render to the operator thereat disconnect supervision.

The operator at the switchboard 200 then disconnects from the line conductors C201, C202 and C203 extending to the toll line circuit 210 in order to bring about the release of the toll line circuit 210, the toll line circuit 250 and the link 390; all in the manner described in Sect. 7. When the link 390 is thus released, the line relay R590 in the repeater and trunk selector 500 restores, interrupting, at the contacts 593, the circuit for maintaining operated the hold relay R610 in order to cause the latter relay to restore shortly thereafter, it being of the slow-to-release type. Upon restoring the hold relay R610 interrupts, at the contacts 616, the previously mentioned path for applying ground potential to the control conductor C493 of the trunk 490; thereby again to mark the trunk 490 as idle to the links 390, etc., having access thereto. Also upon restoring the hold relay R610 interrupts, at the contacts 614, a further point in the path for connecting ground potential by way of the winding of the simplex relay R660 to the simplex conductor C691; and recompletes, at the contacts 613, the previously traced normal connection, including the condenser 667, between the winding of the ring-down relay R665 and the simplex conductor C691. Further, the hold relay R610 interrupts, at the contacts 611, the holding circuit for energizing the upper winding of the control relay R580 in order to cause the latter relay to restore. When ground potential is thus removed from the simplex conductor C691 and consequently from the simplex conductor C717, the simplex relay R820 in the trunk circuit 700 restores, interrupting, at the contacts 823, the previously traced circuit for maintaining operated the hold relay R830 in order to cause the latter relay to restore shortly thereafter, it being of the slow-to-release type. Upon restoring the hold relay R830 interrupts, at the contacts 833, the previously traced circuit for maintaining operated the switch relay R730 and the previously traced multiple circuit for energizing the lower winding of the answer relay R750. Upon restoring the switch relay R730 interrupts, at the contacts 738, the previously traced connection between the winding of the control relay R860 and the control conductor C803 of the trunk 800, thereby to effect the restoration of the control relay R860 and to bring about the release of the incoming connector 885. When the incoming connector 885 is thus released, the line circuit 882 is controlled in order again to mark the subscriber line 881 extending to the called subscriber substation T2 as idle to the connectors of the links 884, etc., having access thereto. At this time the established connection between the calling switchboard 200 in the toll office 10 and the called subscriber substation T2 in the sub-office 40 is released and all of the apparatus involved therein is completely released and available for further use.

*Sect. 9.—A call from the switchboard in the toll office to the switchboard in the magneto office*

First assuming that a call is to be extended from the calling switchboard 200 in the toll office 10 to the called switchboard 286 in the magneto office 20, the operator at the calling switchboard 200 first seizes an idle toll line circuit such, for example, as the toll line circuit 210; whereby the toll line circuit 250 is seized over the toll line 220 and the link 390 may be seized over the trunk 390; all in the manner described in Sect. 7. The operator at the calling switchboard 200 then dials the single digit 7; whereby the connector of the link 390 selects a trunk extending to an idle trunk line circuit, such, for example, as the trunk 391 extending to the trunk line circuit 281. The trunk line circuit 281 controls the trunk line circuit 285 over the trunk line 280; whereby the call is routed to the called switchboard 286 to be answered. The subsequent answering of the call at the called switchboard 286, as well as supervision and the ultimate release of the established connection between the calling switchboard 200 in the toll office 10 and the called switchboard 286 in the magneto office 20, are substantially identical to those previously described in Sects. 6 and 7, since the trunk line circuit 281 is identical to the toll line circuit 250, as previously noted.

*Sect. 10.—Various calls from the switchboard in the magneto office*

The extension of a call from the switchboard 286 in the magneto office 20 to a subscriber substation or a paystation in the tandem office 30 is substantially identical to the extension of a call from the switchboard 200 in the toll office 10 to a subscriber substation or a paystation in the tandem office 30, as described in Sect. 7. In this case, the operator at the switchboard 286 may seize an idle trunk line circuit, such, for example, as the trunk line circuit 285; whereupon the trunk line circuit 281 is controlled over the trunk line 280 in order to bring about control of the line circuit 285 over the trunk 283. The line circuit 385 initiates operation of the distributor 388; whereby the finder of an idle link, such, for example, as the link 390 finds the trunk 283. The operator at the switchboard 286 then dials the directory number of the called subscriber substation or paystation in the tandem office 30 in order to control the connector of the link 390 in the manner previously described.

The extension of a call from the switchboard 286 in the magneto office 20 to a subscriber substation in the sub-office 40 is substantially identical to the extension of a call from the switchboard 200 in the toll office 10 to a subscriber substation in the sub-office 40 as described in Sect. 8. In this case the operator at the switchboard 286 may seize the trunk line circuit 285 and consequently the trunk line circuit 281 over the trunk line 280 in order to cause the link 390 to be connected to the trunk 283. At this time the prefix digit 8 is dialed at the calling switchboard 286 in order to cause the connector of the link 390 to select the trunk 490 extending to the repeater and trunk selector 500. When the link 390 selects the trunk 490, the repeater and trunk selector 500 seizes over the trunk line 600 the trunk circuit 700; whereby the incoming connector 835 is seized over the trunk 800. At this time the operator at the calling switchboard 286 dials the directory number of the called subscriber substation in the sub-office 40 in order to control the incoming connector 835 in the manner previously described.

The extension of a call from the switchboard 286 in the magneto office 20 to the switchboard 200 in the toll office 10 is substantially identical to the extension of a call from the switchboard 200 in the toll office 10 to the switchboard 286 in the magneto office 20 as described in Sect. 9. In this case the operator at the switchboard 286 may seize the trunk line circuit 285 and consequently the trunk line circuit 281 over the trunk line 280 in order to cause the link 390 to be connected to the trunk 283. At this time the single digit 0 is dialed at the calling switchboard 286 in order to cause the connector of the link 390 to select a trunk extending to an idle toll line circuit, such, for example, as the trunk 470 extending to the toll line circuit 250; whereby the toll line circuit 210 is controlled over the toll line 220 in order to extend the call to the switchboard 200 in the toll office 10.

*Sect. 11.—Local calls in the sub-office*

First assuming that a call is initiated at the subscriber substation T2 in the sub-office 40 that is to be completed locally to another subscriber substation therein, the line circuit 882 is controlled via the subscriber line 881 in order to govern operation of the distributor 883; whereby an idle one of the links, such, for example, as the link 884 is assigned thereby. The finder of the assigned link 884 operates to find the subscriber line 881 extending to the calling subscriber substation T2; whereby the line circuit 882 is operated in order to mark the subscriber line 881 as busy to the other links 884, etc. Also the connector of the link 884 operates to return dial tone over the subscriber line 881 to the calling subscriber substation T2; whereby the subscriber at the calling subscriber substation T2 proceeds to dial the directory number of the called subscriber substation, which number might be 42 in order to cause the connector of the link 884 to operate and select the subscriber line extending to the called subscriber substation. The subsequent operation of the link 884 in response to answering the call at the called subscriber substation, as well as the ultimate release of the established connection is in accordance with conventional practice.

*Sect. 12.—A call from a subscriber substation in the sub-office to a subscriber substation or paystation in the tandem office*

First assuming that a call is to be extended from a subscriber substation, such, for example, as the subscriber substation T2 in the sub-office 40 to a called subscriber substation, such, for example, as the subscriber substation T1 in the tandem office 30, the subscriber at the calling subscriber substation T2 first initiates the call; whereby the link 884 may be taken for use in the manner previously explained. The subscriber at the calling subscriber substation T2 then dials the prefix digit 9 followed by the directory number of the called subscriber substation T1; which number might be 2543; whereby 9-2543 may be dialed. The connector of the link 884 responds to the digit 9 to select the corresponding ninth level and then an idle trunk terminated therein, such, for example, as the trunk 1380 extending to the trunk circuit 1200, the trunk 1380 being marked as idle to the connector of the link 884 by the absence of ground potential upon the control conductor C1383 thereof. When the connector of the link 884 seizes the trunk 1380, a loop circuit is completed for energizing in series the windings of the line relays R1380 and R1210 in the trunk circuit 1200; this loop circuit extending from ground potential by way of the winding of the line relay R1380, the contacts 1254 and the lower right-hand winding of the repeating coil RC1275 to the line conductor C1382 of the trunk 1380, and from battery potential by way of the winding of the line relay R1210, the contacts 1152 and the upper right-hand winding of the repeating coil RC1275 to the line conductor C1381 of the trunk 1380. At this time the line conductors C1381 and C1382 of the trunk 1380 are connected together by way of the link 884 and the subscriber line 881 at the calling subscriber substation T2. When this loop circuit is thus completed, both of the line relays R1380 and R1210 operate. Upon operating, the line relay R1210 completes, at the contacts 1211, a circuit, for operating the hold relay R1370. Upon operating, the hold relay R1370 completes at the contacts 1373, a path, including the contacts 1213, for applying battery potential by way of the winding of the supervisory relay R1220 to the simplex conductor C1276; which simplex conductor C1276 is connected by way of the upper and lower left-hand windings of the repeating coil RC1275, the line conductors of the trunk 1190 and the upper and lower right-hand windings of the repeating coil RC1175 to the simplex conductor C1176; which simplex conductor C1176 is connected by way of the contacts 1074 and 1053 and the winding of the simplex relay R1170 in the trunk circuit 1000 to ground potential. Accordingly, at this time the winding of the supervisory relay R1220 in the trunk circuit 1200 is energized in series with the winding of the simplex relay R1170 in the trunk circuit 1000; whereby both the supervisory relay R1220 and the simplex relay R1170 operate. Also upon operating, the hold relay R1370 in the trunk circuit 1200 completes, at the contacts 1372, a circuit, including the contacts 1334, for operating the time release relay R1230. Upon operating, the time release relay R1230 completes, at the contacts 1234, a path for applying ground potential to the control conductor C1383 of the trunk 1380, thereby to mark the trunk 1380 as busy to the other links 884, etc., having access thereto. Also the time release relay R1230 completes, at the contacts 1235, a path for applying ground potential to the timer start conductor C1238 in order to initiate operation of the associated timer, not shown. Further the time release relay R1230 completes, at the contacts 1237, a path, including the contacts 1321 and 1332, for applying battery potential by way of the winding of the timer relay R1330 to the timer conductor C1324; however, the timer relay R1330 is not operated at this time.

Upon operating the simplex relay R1170 in the trunk circuit 1000 completes, at the contacts 1173, a circuit for operating the hold relay R1160. Upon operating, the hold relay R1160 completes, at the contacts 1162, a circuit for operating the switch relay R1150 and a multiple circuit for energizing the lower winding of the answer relay R1140. When the lower winding of the answer relay R1140 is thus energized, it does not operate at this time. Upon operating the switch relay R1150 interrupts, at the contacts 1152 and 1154, normal connections between the windings of the line relays R1110 and R1030 and the upper left-hand winding and the lower left-hand winding, respectively, of the repeating coil RC1175; and completes, at the contacts 1151, 1153, 1155 and 1156, a path, including the resistor 1124 and the upper left-hand winding and the lower left-hand winding of the repeating coil RC1175, for bridging the upper winding of the answer relay R1140 across the line conductors C1181 and C1182 of the trunk 1180 extending to the incoming connector 300. Further, the switch relay R1150 completes, at the contacts 1159, a path, including the contacts 1133, for applying ground potential to the control conductor C403 of the trunk 400, thereby to mark the trunk 400 as busy to the various links 390, etc., having access thereto.

When the upper winding of the answer relay R1140 is thus bridged across the line conductors C1181 and C1182 of the trunk 1180, it is energized, but it is not poled to operate; however the incoming connector 300 is conditioned to be responsive to digits received over the trunk 1180.

When the subscriber at the calling subscriber substation T2 dials the first digit 2 of the directory number of the called subscriber substation T1, the line relays R1380 and R1210 in the trunk circuit 1200 follow. Each time the line relay R1210 restores and then reoperates, it interrupts and then recompletes, at the contacts 1211, the previously mentioned circuit for maintaining operated the hold relay R1370; whereby the latter relay remains operated during impulsing as it is of the slow-to-release type. Also each time the line relay R1210 restores and then reoperates, it completes and then interrupts, at the contacts 1212, a circuit including the contacts 1322 and 1232, for operating the dial relay R1360; whereby the latter relay operates and remains operated during impulsing as it is of the slow-to-release type. Upon operating, the dial relay R1360 completes, at the contacts 1363, a path, including the contacts 1371, for connecting the resistor 1325 in shunt to the winding of the line relay R1380 in order to improve impulsing over the loop circuit extending back to the calling subscriber substation T2. Also the dial relay R1360 completes, at the contacts 1365, a path, including the contacts 1236, for connecting the resistor 1225 in shunt to the winding of the supervisory relay R1220 in order to improve impulsing over the simplex conductor C1276. Also each time the line relay R1210 restores and then reoperates, it interrupts and then recompletes, at the contacts 1213, the previously traced circuit for energizing in series the winding of the supervisory relay R1220 in the trunk circuit 1200 and the winding of the simplex relay R1170 in the trunk circuit 1000; whereby the relays mentioned follow; followed by the supervisory relay R1220 in the trunk circuit 1200 being without effect.

The first time the simplex relay R1170 in the trunk circuit 1000 restores and then reoperates, it completes and then interrupts, at the contacts 1172, a circuit, including the contacts 1164, 1163 and 1043, for energizing in series the upper and lower windings of the seize relay R1040; whereby the latter relay operates. Upon operating the seize relay R1040 completes, at the contacts 1042, a holding circuit, including the contacts 1158 and the grounded control conductors C1183 of the trunk 1180, for energizing in series the upper and lower windings thereof. Also each time the simplex relay R1170 restores and then reoperates, it interrupts and then recompletes, at the contacts 1173, the previously mentioned circuit for maintaining operated the hold relay R1160; whereby the latter relay remains operated during impulsing, as it is of the slow-to-release type. Also, each time the simplex relay R1170 restores and then reoperates, it completes and then interrupts, at the contacts 1172, a circuit, including the contacts 1164 and 1141 for operating the dial relay R1060; whereby the latter relay operates and remains operated during impulsing as it is of the slow-to-release type. Upon operating the dial relay R1060 completes, at the contacts 1061, a path, including the resistor 1123 and the contacts 1161, 1171 and 1151, across the line conductors C1181 and C1182 of the trunk 1180, thereby to improve impulsing over the trunk 1180 to the incoming connector 300. Finally, each time the simplex relay R1170 restores and then reoperates, it interrupts and then recompletes, at the contacts 1171, the previously traced path across the line conductors C1181 and C1182 of the trunk 1180; whereby the impulses of the second digit 2 are transmitted over the trunk 1180 to the incoming connector 300 in order to effect corresponding operation thereof.

At the conclusion of the second digit 2 dialed at the calling subscriber substation T2, the line relays R1380 and R1210 in the trunk circuit 1200 remain operated; whereby the hold relay R1370 is retained in its operated position and shortly thereafter the dial relay R1360 restores. Upon restoring the dial relay R1360 removes the resistors 1325 and 1225 from across the winding of the line relay R1380 and the winding of the supervisory relay R1220, respectively. Also at this time the winding of the supervisory relay R1220 in the trunk circuit 1200 and the winding of the simplex relay R1170 in the trunk circuit 1000 are steadily energized in series circuit relation; whereby the relays mentioned are retained in their operated positions.

The operated simplex relay R1170 in the trunk circuit 1000 retains operated the hold relay R1160 and effects restoration of the dial relay R1060 shortly thereafter, since the latter relay is of the slow-to-release type. Upon restoring the dial relay R1060 interrupts, at the contacts 1061, the previously traced path for connecting the resistor 1123 across the line conductors C1181 and C1182 of the trunk 1180; whereby the upper winding of the answer relay R1140 is no longer short-circuited by the resistor 1123.

Also upon restoring, the dial relay R1060 completes, at the contacts 1064, a holding circuit, including the contacts 1042, 1041, 1157 and 1162, for energizing in series the upper and lower windings of the seize relay R1040; and a multiple path, also including the contacts 1158, for applying ground potential in the trunk circuit 1000 to the control conductor C1183 of the trunk 1180, thereby to retain operated the incoming connector 300.

In view of the foregoing explanation of the manner in which the second digit 2 dialed at the calling subscriber substation T2 is received by the trunk circuit 1200 and repeated therefrom over the trunk 1180 to the trunk circuit 1000 and then repeated to the incoming connector 300, it will be understood that the third, fourth and fifth digits 5, 4 and 3 dialed at the calling subscriber substation T2 are transmitted in an identical manner to the incoming connector 300. The incoming connector 300 responds to the digits 2, 5, 4 and 3 to select the subscriber line 386 extending to the called subscriber substation T1, as well as the required ringing code. The subsequent operation of the incoming connector 300 depends upon the idle or busy condition of the called subscriber substation T1 at this time; and in the event the called subscriber substation T1 is busy at this time, the incoming connector 300 operates in order to return busy tone current over the trunk 1180 to the trunk circuit 1000; which busy tone current traversing the upper left-hand winding and the left-hand winding of the repeating coil RC1175 induces a corresponding busy tone current in the right-hand windings thereof. The busy tone current is returned over the trunk 1190 and traversing the left-hand windings of the repeating coil RC1275 induces a corresponding busy tone current in the upper right-hand winding and the lower right-hand winding thereof, which busy tone current is returned over the loop circuit to the calling subscriber substation T2 in order to indicate to the subscriber thereat that the desired connection cannot be had at this time by virtue of the busy condition of the called subscriber substation T1.

On the other hand, in the event the called subscriber substation T1 is idle at this time, ringing current is projected from the incoming connector 300 over the subscriber line 386 thereto and the line circuit 387 is operated in order to mark the subscriber line 386 as busy to the links 390, etc., having access thereto. Also, ring-back tone current is returned from the incoming connector 300 over the previously traced connection to the calling subscriber substation T2 in order to indicate to the subscriber thereat that the called subscriber substation T1 is being rung.

When the subscriber at the called subscriber substation T1 answers the call, the incoming connector 300 operates in order to reverse the polarity of the trunk 1180; whereby the upper winding of the answer relay R1140 is poled to operate. Upon operating, the answer relay R1140 completes, at the contacts 1142, a circuit for energizing the upper winding of the control relay R1050; whereby the latter relay operates. Upon operating the control relay R1050 completes, at the contacts 1054 a holding circuit, including the contacts 1122 and 1150 and the resistor 1125, for energizing the winding of the simplex relay R1170; interrupts, at the contacts 1053, the previously traced original path for connecting ground potential by way of the winding of the simplex relay R1170 to the simplex conductor C1176; and completes, at the contacts 1052, a path, including the contacts 1074 for connecting battery potential by way of the winding of the supervisory relay R1120 to the simplex conductor C1176. Accordingly, at this time the winding of the supervisory relay R1120 in the trunk circuit 1000 is short-circuited in series with the winding of the supervisory relay R1220 in the trunk circuit 1200; whereby the supervisory relay R1120 is retained in its restored position and the supervisory relay R1220 restores.

Upon restoring, the supervisory relay R1220 in the trunk circuit 1200 completes, at the contacts 1221, a circuit, including the contacts 1371, 1362 and 1231, for energizing the winding of the cut-off relay R1320, and a multiple circuit, also including the contacts 1381, for energizing the winding of the reverse battery relay R1310; whereby the cut-off relay R1320 and the reverse battery relay R1310 operate shortly thereafter, both of these relays being of the slow-to-operate type. Upon operating, the cut-off relay R1320 interrupts, at the contacts 1321, the previously traced connection between the winding of the timer relay R1330 and the timer conductor C1324, thereby positively to prevent operation of the timer relay R1330 under the control of the associated timer, not shown. Operation of the reverse battery relay R1310 is without effect since the connection from the calling subscriber substation T2 to the trunk circuit 1200 is routed via the non-reverse trunk 1380; whereby no charge is assessed against the calling subscriber substation T2 in the sub-office 40. At this time an established connection is completed between the calling subscriber substation T2 in the sub-office 40 and the called subscriber substation T1 in the tandem office 30.

At the conclusion of the established connection, when the subscriber at the called subscriber substation T1 disconnects, the incoming connector 300 is operated in order again to reverse the polarity of the trunk 1180; whereby the answer relay R1140 in the trunk circuit 1000 is poled to restore. Upon restoring, the answer relay R1140 interrupts, at the contacts 1142, the previously mentioned circuit for energizing the upper winding of the control relay R1050, thereby to cause the latter relay to restore. Upon restoring, the control relay R1050 interrupts, at the contacts 1052, the previously traced path for connecting battery potential by way of the winding of the supervisory relay R1120 to the simplex conductor C1176; interrupts, at the contacts 1054, the previously traced holding circuit for maintaining operated the simplex relay R1170; and recompletes, at the contacts 1053, the previously traced original path for applying ground potential by way of the winding of the simplex relay R1170 to the simplex conductor C1176. Accordingly, at this time, the winding of the simplex relay R1170 in the trunk circuit 1000 is again energized in series with the winding of the supervisory relay R1220 in the trunk circuit 1200; whereby the simplex relay R1170 is retained in its operated position and the supervisory relay R1220 reoperates. Upon reoperating, the supervisory relay R1220 interrupts, at the contacts 1221, the previously traced circuits for maintaining operated the cut-off relay R1320 and the reverse battery relay R1310. Upon restoring, the cut-off relay R1320 again completes, at the contacts 1321, the previously traced connection between the winding of the timer relay R1330 and the timer conductor C1324 extending to the timer, not shown, whereby operation of the timer is again rendered effective.

When the subscriber at the calling subscriber substation T2 disconnects, the loop circuit extending to the line relays R1380 and R1210 in the trunk circuit 1200 is interrupted; whereby the relays mentioned restore. Upon restoring, the line relay R1210 interrupts, at the contacts 1211, the previously mentioned circuit for maintaining operated the hold relay R1370; whereby the latter relay restores shortly thereafter, it being of the slow-to-release type. Upon restoring the hold relay R1370 interrupts, at the contacts 1372, the previously traced circuit for maintaining operated the time release relay R1230. Upon restoring, the time release relay R1230 interrupts, at the contacts 1234, the previously mentioned path for applying ground potential to the control conductor 1383 of the trunk 1380 thereby to effect the release of the link 884 and to mark the trunk 1380 as idle to the links 884, etc., having access thereto. When the link 884 is thus released, the line circuit 882 is operated in order again to mark the subscriber line 881 as idle to the links 884, etc., having access thereto. Also upon restoring, the time release relay R1230 interrupts, at the contacts 1235, the previously mentioned circuit for applying ground potential to the timer start conductor C1238 in order to arrest operation of the timer, not shown. Also, the time release relay R1230 interrupts, at the contacts 1237, the previously traced connection between the winding of the timer relay R1330 and the timer conductor C1324. Also when the line relay R1210 restored, it interrupted, at the contacts 1213, the previously traced path for applying battery potential by way of the winding of the supervisory relay R1220 to the simplex conductor C1276 in order to effect restoration of the supervisory relay R1220. Finally, upon restoring, the hold relay R1370 recompleted, at the contacts 1374, the previously traced original path for applying ground potential by way of the winding of the simplex relay R1270 to the simplex conductor C1276; whereby the winding of the simplex relay R1270 in the trunk circuit 1200 is short-circuited in series with the winding of the simplex relay R1170 in the trunk circuit 1000. Accordingly, at this time, the simplex relay R1270 is retained in its restored position and the simplex relay R1170 restores.

Upon restoring, the simplex relay R1170 in the trunk circuit 1000 interrupts, at the contacts 1173, the previously mentioned circuit for maintaining operated the hold relay R1160; whereby the latter relay restores shortly thereafter, it being of the slow-to-release type. Upon restoring, the hold relay R1160 interrupts, at the contacts 1162, the circuit for maintaining operated the switch relay R1150 and the multiple circuit for energizing the lower winding of the answer relay R1140. Upon restoring, the switch relay R1150 interrupts, at the contacts 1151, 1153, 1155 and 1156, further points in the previously traced path for connecting the upper winding of the answer relay R1140 across the line conductors C1181 and C1182 of the trunk 1180. Also, the hold relay R1160 interrupts, at the contacts 1162, the previously traced path for applying ground potential to the control conductor C1183 of the trunk 1180, thereby to bring about the release of the incoming connector 300. Finally, the hold relay R1160 interrupts, at the contacts 1162, the previously traced holding circuit for maintaining operated the seize relay R1040 in order to cause the latter relay to restore shortly thereafter, it being of the slow-to-release type. Finally, the switch relay R1150 interrupts, at the contacts 1159, the previously traced path for applying ground potential to the control conductor C403 of the trunk 400, thereby to mark the trunk 400 as idle to the links 390, etc., having access thereto. When the incoming connector 300 is thus released, the line circuit 387 operates again to mark the subscriber line 386 as idle to the links 390, etc., having access thereto. At this time the established connection between the calling subscriber substation T2 and the called subscriber substation T1 is released, and all of the apparatus involved therein is completely released and available for further use.

Reconsidering the extension of the connection from the calling subscriber substation T2 in the sub-office 40 to the called subscriber substation T1 in the tandem office 30, it is again noted that when the call was answered at the called subscriber substation T1, the supervisory relay R1220 in the trunk circuit 1200 was restored to bring about operation of the cut-off relay R1320 in the manner previously explained. Thus it will be understood that in the event the call is not answered at the called subscriber substation T1 within a predetermined time interval, that the cut-off relay R1320 will remain in its restored position for the predetermined time interval mentioned in order to bring about operation of the timer relay R1330 under the control of the associated timer, not shown, as explained below. Also at the conclusion of the established connection, when the subscriber at the called subscriber substation T1 disconnects, the supervisory relay R1220 is reoperated effecting restoration of the cut-off relay R1320; whereby the timer relay R1330 may be operated under the control of the associated timer, not shown, after the predetermined time interval mentioned.

Now assuming that the subscriber at the called subscriber substation T1 does not answer the call within the predetermined time interval mentioned, or that the subscriber at the calling subscriber substation T2 does not disconnect within the predetermined time interval mentioned after the subscriber at the called subscriber substation T1 disconnects, the restored cut-off relay R1320 in the trunk circuit 1200 permits the winding of the timer relay R1330 to be connected for the predetermined time interval to the timer conductor C1324; whereupon the timer, not shown, operates to apply ground potential to the timer conductor C1324. This application of ground potential to the timer conductor C1324 completes the previously traced circuit for operating the timer relay R1330. Upon operating the timer relay R1330 completes, at the contacts 1331, a holding circuit, including the contacts 1371, 1362, 1321 and 1237, for energizing the winding thereof; and interrupts, at the contacts 1332, the previously traced original operating circuit for energizing the winding thereof. Also the timer relay R1330 completes, at the contacts 1333, an alternative holding circuit, including the contacts 1372 and the timer conductor C1316, for maintaining operated the time release relay R1230, the timer conductor C1316 having ground potential thereof at this time. Finally, the timer relay R1330 interrupts, at the contacts 1334, the previously traced original circuit for maintaining operated the time release relay R1230. After an additional time interval, the timer, not shown, operates to interrupt the application of ground potential upon the timer conductor C1316, thereby to effect the restoration of the time release relay R1230. Accordingly, at the expiration of the predetermined time interval mentioned and the additional time interval mentioned, the time release relay R1230 restores. Upon restoring the time release relay R1230 interrupts, at the contacts 1234, the previously mentioned path for applying ground potential to the control conductor C1383 of the trunk 1380, thereby to effect the release of the link 884; whereby the line relays R1380 and R1210 in the trunk circuit 1200 are restored. Upon restoring the line relay R1210 effects the restoration of the hold relay R1370 shortly thereafter. Also upon restoring the time release relay R1230 interrupts, at the contacts 1237, the previously traced holding circuit for maintaining operated the timer relay R1330; whereby the latter relay restores shortly thereafter, it being of the slow-to-release type. Further the time release relay R1230 interrupts, at the contacts 1235, the previously mentioned path for applying ground potential to the timer start conductor C1238 in order to arrest operation of the associated timer, not shown. When the line relay R1210 restores, it effects restoration of the supervisory relay R1220 and reconnection of ground potential by way of the winding of the simplex relay R1270 to the simplex conductor C1276; all in the manner previously explained. At this time the trunk circuit 1200 is completely released and marked as idle to the links 884, etc., having access thereto by virtue of the absence of ground potential upon the control conductor C1383 of the trunk 1380.

When the trunk circuit is thus released, the trunk circuit 1000 is released in order to effect the release of the incoming connector 300 in a manner substantially identical to that previously explained. Also when the link 884 is released, the line circuit 882 is operated in order to lock out of service the subscriber line 881 extending to the calling subscriber substation T2. Subsequently, when the subscriber at the calling subscriber substation T2 disconnects, the line circuit 882 is controlled in order again to place the subscriber line 881 in service and to mark it as idle to the links 884, etc., having access thereto.

In view of the foregoing, it will be understood that a connection may be extended from a calling subscriber substation in the sub-office 40 to a called paystation in the tandem office 30 in an identical manner.

*Sect. 13.—A call from a subscriber substation in the sub-office to the switchboard in the toll office*

First assuming that a call is to be extended from a subscriber substation, such, for example, as the subscriber substation T2 in the sub-office 40 to the called switchboard 200 in the toll office 10, the call is initiated at the calling subscriber substation T2; whereby the finder of the link 884 may find the subscriber line 881 in the manner previously explained. The subscriber at the calling subscriber substation T2 then dials the single digit 0; whereby the connector of the link 884 operates to select the trunk 970 extending to the trunk circuit 700 and to test the idle or busy condition thereof. In the event the trunk 970 is tested as idle, it is seized by the connector of the link 884; and in the event it is tested as busy, the connector of the link 884 takes an additional step in the rotary direction in order to select the trunk 890 extending to the trunk selector and digit sender 1400. In the event the trunk 890 is tested as idle, it is seized by the connector of the link 884; and in the event it is tested as busy, the connector of the link 884 operates to return busy tone current over the subscriber line 881 to the calling subscriber substation T2.

First assuming that the trunk 970 extending to the trunk circuit 700 is selected by the connector of the link 884 and tested as idle, the trunk 970 being marked as idle by the absence of ground potential upon the control conductor C973 thereof. When the connector of the link 884 operates to seize the trunk 970, a loop circuit is completed for energizing in series the windings of the line relays R740 and R870 in the trunk circuit 700. This loop circuit extends from ground potential by way of the winding of the line relay R870, the contacts 734, the lower right-hand winding of the repeating coil RC760 and the contacts 964 to the line conductor C972 of the trunk 970; and from battery potential by way of the winding of the line relay R740, the contacts 733, the upper right-hand winding of the repeating coil RC760 and the contacts 962 to the line conductor C971 of the trunk 970; the line conductors C971 and C972 of the trunk 970 being extended by way of the link 884 and the subscriber line 881 to the calling subscriber substation T2 and connected together thereat. When this series circuit is thus completed, the line relays R740 and R870 operate. Upon operating the line relay R740 completes, at the contacts 743, a circuit, including the contacts 739, for operating the hold relay R810. Upon operating the hold relay R810 completes, at the contacts 812, a circuit, including the contacts 952, for operating the time release relay R840. Upon operating the time release relay R840 completes, at the contacts 840, a path for applying ground potential to the timer start conductor C939 in order to initiate operation of the timer 936; and completes, at the contacts 843, a circuit, including the contacts 822, for energizing in series the upper and lower windings of the seize relay R920 in order to cause the latter relay to operate. Upon operating the seize relay R920 completes, at the contacts 922, a circuit for operating the start relay R940. Upon operating the start relay R940 completes, at the contacts 941, a circuit for operating the start relay R930; and completes, at the contacts 942, a path for applying ground potential to the motor start conductor C935. Upon operating the start relay R930 completes, at the contacts 933, a path for applying ground potential to the auxiliary tone start conductor C934; and completes, at the contacts 931, a connection, including the condensers 912 and 854 and the contacts 862 and 962, for connecting the ring-back tone conductor C837 to the line conductor C971 of the trunk 970, in order to cause ring-back tone current to be returned over the connection to the calling subscriber substation T2 in order to indicate to the subscriber thereat that the operator switchboard 200 is being rung down.

Also the time release relay R840 completes, at the contacts 842, a path for applying ground potential by way of the upper winding of the tone relay R910 to the control conductor C973 of the trunk 970, thereby to retain operated the link 884. Also at this time, the upper winding of the tone relay R910 is energized causing the latter relay to operate. Further the time release relay R840 completes, at the contacts 848, a connection, including the contacts 814, 836 and 954, between the winding of the timer relay R950 and the timer conductor C938 extending to the timer 936. However, the timer relay R950 is not operated at this time. Also the time release relay R840 completes, at the contacts 849, a circuit, including the contacts 725, for operating the ring-down relay R710. Upon operating the ring-down relay R710 completes, at the contacts 711, a circuit for operating the dial relay R850; and completes, at the contacts 715, a circuit, including the contacts 849, for energizing the winding of the ring-down relay R720 in order to cause the latter relay to operate shortly thereafter as it is of the slow-to-operate type. Upon operating the ring-down relay R720 interrupts, at the contacts 725, a circuit for maintaining operated the ring-down relay R710, thereby to cause the latter relay to restore shortly thereafter as it is of the slow-to-release type. Upon restoring the ring-down relay R710 interrupts, at the contacts 715, the original circuit for operating the ring-down relay R720; and completes, at the contacts 714, a holding circuit, including the contacts 724 and 811, for maintaining operated the ring-down relay R720. Also when the ring-down relay R710 operates, it completes, at the contacts 713, a connection, including the associated resistor, between the generator conductor C716 and the simplex conductor C717; whereby ringing current is projected over the trunk line 600. Subsequently, when the ring-down relay R710 restores, it interrupts, at the contacts 713, the connection between the generator conductor C716 and the simplex conductor C717 in order to cut off the projection of ringing current over the trunk line 600; and to interrupt, at the contacts 711, the circuit for maintaining operated the dial relay R850 in order to cause the latter relay to restore shortly thereafter, it being of the slow-to-release type. During the short-time interval that the dial relay R850 is retained operated, following the restoration of the ring-down relay R710, there is completed, a path, including the contacts 712, 722, 741, the resistor 815, the contacts 852 and 723 and the resistor 726, for connecting battery potential to the simplex conductor C717 in order to permit any condenser charges resulting from ringing current on the trunk line 600 to be discharged, without the possibility of operating the simplex relay R820.

Accordingly, a short splash of ringing current is projected over the trunk line 600 and conducted by way of the simplex conductor C691, the contacts 630, 613, 584, the winding of the ring-down relay R665 in the repeater and trunk selector 500 and the condenser 667 to ground potential; whereby the ring-down relay R665 is operated for the time interval mentioned. Upon operating the ring-down relay R665 completes, at the contacts 666, a circuit, including the contacts 673, for energizing the upper winding of the start relay R680, thereby to cause the latter relay to operate shortly thereafter, it being rendered slightly slow-to-operate by virtue of the normally completed path, including the contacts 685, for short-circuiting the lower winding thereof. This slow-to-operate characteristic of the start relay R680 prevents operation thereof due to momentary operations of the ring-down relay R665, which might be caused by surges on the trunk line 600. Upon operating the start relay R680 interrupts, at the contacts 685, the previously mentioned path for short-circuiting the lower winding thereof; and completes, at the contacts 684, a path, including the contacts 586 and 615, for applying ground potential to the control conductor C493 of the trunk 490 in order to mark the trunk 490 as busy to the links 390, etc., having access thereto. Also the start relay R680 completes, at the contacts 684, a circuit, including the contacts 632′, for energizing the lower winding of the dial relay R620 in order to cause the latter relay to operate. Also upon operating the start relay R680 completes, at the contacts 682, a path, including the contacts 638, 673 and 666, for short-circuiting the winding of the start relay R670, the winding of the start relay R670 being also bridged by the high resistance 674.

At the conclusion of the applicaiton of ringing current to the trunk line 600, the ring-down relay R665 restores, interrupting, at the contacts 666, the above traced path for short-circuiting the winding of the start relay R670; whereby there is completed a circuit substantially identical to that previously traced for energizing the winding of the start relay R670 in series with the upper winding of the start relay R680 causing the start relay R670 to operate and the start relay R680 to be retained in its operated position. Upon operating, the start relay R670 interrupts, at the contacts 673, a further point in the previously traced path for short-circuiting the winding thereof, thereby positively to prevent further short-circuiting of the winding of the start relay R670 should the ring-down relay R665 operate momentarily as the consequence of the appearance of a surge on the trunk line 600. Also the start relay R670 completes, at the contacts 671, a circuit, including the contacts 569, 661 and 571, for operating the start select relay R655. Upon operating the start select relay R655 completes, at the contacts 659, a holding circuit, including the contacts 682, for energizing the winding of the start relay R670 in series with the upper winding of the start relay R680; and completes, at the contacts 656, a path for applying ground potential to one terminal of the lower winding of the test relay R560 for a purpose more fully explained hereinafter. Further, the start select relay R655 completes, at the contacts 657, a circuit, including the contacts 661, for operating the cut-off relay R630 and a multiple circuit for energizing the lower winding of the answer relay R640; however, the latter relay does not operate at this time. Upon operating the cut-off relay R630 interrupts, at the contacts 631 and 633, the normal connections between the upper and lower windings of the line relay R590 and the left-hand windings of the repeating coil RC690; and prepares, at the contacts 632 and 634, a path traced hereinafter for bridging the upper winding of the answer relay R640 across the left-hand windings of the repeating coil RC690. Also the cut-off relay R630 interrupts, at the contacts 630, the normal connection between the winding of the ring-down relay R665 and the simplex conductor C691; and completes, at the contacts 636, a circuit, including the contacts 661 and 571, for operating the supervisory relay R650. Upon operating the supervisory relay R650 completes, at the contacts 651, the previously mentioned path for bridging the upper winding of the answer relay R640 in series with the resistor 643 across the left-hand windings of the repeating coil RC690. Also the cut-off relay R630 interrupts, at the contacts 639, the previously traced original circuit for energizing the winding of the start relay R670 in series with the upper winding of the start relay R680; and completes, at the contacts 635, a circuit, including the contacts 681, 657, 555, 539, 528 and 517 for operating the first select relay R510. Also the cut-off relay R630 interrupts, at the contacts 632′, the previously traced circuit for energizing the lower winding of the dial relay R620 in order to cause the latter relay to restore shortly thereafter, as it is of the slow-to-release type. During the time that the dial relay R620 occupied its operated position, it interrupted, at the contacts 622, a path for connecting ground potential to one terminal of the winding of the release relay R570, thereby positively to prevent operation of the latter relay during the time that the ring-down relay R665 was operated as a consequence of the reception of ringing current over the trunk line 600. However, upon restoring the dial relay R620 completes, at the contacts 622, a path, including the resistor 574, the contacts 547 and 639, for applying ground potential by way of the winding of the release relay R570 to the simplex conductor C691. Also at this time battery potential is applied by way of the upper and lower windings of the simplex relay R820, the resistor 815, the contacts 741, 722 and 712 to the simplex conductor C717. Accordingly the winding of the release relay R570 in the repeater and trunk selector 500 is energized in series with the upper and lower windings of the simplex relay R820 in the trunk circuit 700; however, neither of these relays operates at this time, as they are of the marginal type and the resistors 574 and 815 are included in series circuit relation therewith.

Upon operating the first select relay R510 completes, at the contacts 513, a circuit for testing the idle or busy condition of the first trunk 480 extending to the toll line circuit 250 as determined by the presence of battery potential or ground potential respectively upon the control conductor C483 thereof. More particularly, in the event the toll line circuit 250 is busy at this time, ground potential therein appears upon the control conductor C483 of the trunk 480; whereby there is completed, at the contacts 513, incident to operation of the first select relay R510, a path also including the contacts 523 and 534 for short-circuiting the lower winding of the test relay R560 in the repeater and trunk selector 500. In this case upon operating the first select relay R510 further completes, at the contacts 516, a holding circuit for energizing the winding thereof; and interrupts, at the contacts 517, the previously traced original operating circuit therefor. Further the first select relay R510 completes, at the contacts 515, a circuit, including the contacts 560, 652 and 681, for operating the second select relay R520. Upon operating, the second select relay R520 completes, at the contacts 527, a holding circuit, including the contacts 538, 555, 635, 657 and 681, for energizing the winding thereof; and interrupts, at the contacts 528, the holding circuit for maintaining operated the first select relay R510. Upon restoring the first select relay R510 interrupts, at the contacts 515, the original circuit for operating the second select relay R520; and prepares, at the contacts 514, a circuit traced hereinafter for operating the third select relay R530. Also upon restoring the first select relay R510 interrupts, at the contacts 513, the connection between the control conductor C483 of the first trunk 480 and the lower winding of the test relay R560. Also upon operating the second select relay R520 interrupts, at the contacts 523, a further point in the connection between the control conductor C483 of the first trunk 480 and the lower winding of the test relay R560; and completes, at the contacts 522, a connection, including the contacts 534 between the control conductor of the second trunk and the lower winding of the test relay R560; whereby the idle or busy condition of the second trunk is tested.

In view of the foregoing, it will be understood that when the supervisory relay R650 operates, the first select relay R510 operates in order to bring about the test of the first trunk 480; and in the event the first trunk 480 is busy, the second select relay R520 operates in order to bring about the test of the second trunk. In a similar manner, in the event both the first and second trunks are busy, the third select relay R530 will be ultimately operated in order to bring about the test of the third trunk. Finally, in the event all three of the trunks 480, etc., are busy, the three select relays R510, R520 and R530 are operated sequentially, the second select relay R520 upon operating, effecting the restoration of the first select relay R510, and the third select relay R530 upon operating effecting the restoration of the second select relay R520. Finally, in case all three of the trunks mentioned are busy as noted above, the third select relay R530 completes, at the contacts 536, a circuit, including the contacts 525, 514, 560, 652, 658 and 681, for operating the busy relay R550. Upon operating the busy relay R550 completes, at the contacts 554, a holding circuit, including the contacts 635, 657 and 681, for energizing the winding thereof; and interrupts, at the contacts 555, the previously traced holding circuit for maintaining operated the third select relay R530. Upon restoring the third select relay R530 interrupts, at the contacts 536, the original circuit for operating the busy relay R550; and completes, at the contacts 535, a path, including the contacts 564, 553, 525, 514, 560, 652, 658 and 681, for applying ground potential to one terminal of the lower left-hand winding of the repeating coil RC690. Also upon operating the busy relay R550 completes, at the contacts 551, a connection, including the contacts 561 and the condenser 559, between the busy tone conductor C558 and one terminal of the upper left-hand winding of the repeating coil RC690. Further the busy relay R550 completes, at the contacts 557, a path for applying ground potential to the start tone timer conductor C572; whereby busy tone current is returned from the repeater and trunk selector 500 over the connection to the calling subscriber substation T2 in order to indicate to the subscriber thereat that the desired connection to the called switchboard 200 in the toll office 10 may not be had at this time due to the all-trunks-busy condition mentioned. The subscriber at the calling subscriber substation T2 then proceeds to release the established connection in a manner substantially identical to that described hereinafter.

Finally, the busy relay R550 completes, at the contacts 556, a circuit for energizing the lower winding of the reverse battery relay R540; whereupon the latter relay operates. Upon operating the reverse battery relay R540 interrupts, at the contacts 547, the previously traced circuit for energizing the winding of the release relay R570 in the repeater and trunk selector 500 in series with the upper and lower windings of the simplex relay R820 in the trunk circuit 700; and completes, at the contacts 546, a path, including the contacts 683 and 639, for applying ground potential by way of the winding of the simplex relay R660 to the simplex conductor C691; whereby the winding of the simplex relay R660 in the repeater and trunk selector 500 is energized in series with the upper and lower windings of the simplex relay R820 in the trunk circuit 700; whereby the simplex relay R660 is not operated, but the simplex relay R820 is operated, the simplex relay R660 being of the marginal type. Upon operating the simplex relay R820 completes, at the contacts 823, a circuit for operating the hold relay R830. The hold relay R830 upon operating, completes, at the contacts 834, a multiple holding circuit, including the contacts 724 and 714 for maintaining operated the ring-down relay R720; and completes, at the contacts 833, a multiple holding circuit, including the contacts 847 and 952, for maintaining operated the time release relay R840. Further, the hold relay R830 completes, at the contacts 832, a circuit including the contacts 823, 845 and 867, for operating the control relay R860. Upon operating the control relay R860 completes, at the contacts 866, a holding circuit, including the contacts 853, 833 and 952, for energizing the winding thereof; and interrupts, at the contacts 867, the original operating circuit therefor. Also the control relay R860 interrupts, at the contacts 862, the previously traced circuit for returning ring-back tone current over the connection to the calling subscriber substation T2 since busy tone current is being returned thereto over the connection from the repeater and trunk selector 500 as explained above. Further, the simplex relay R820 interrupts, at the contacts 822, the previously traced circuit for energizing in series the upper and lower windings of the seize relay R920 in order to cause the latter relay to restore shortly thereafter, it being of the slow-to-release type. Upon restoring the seize relay R920 interrupts, at the contacts 922, a circuit for maintaining operated the start relay R940, thereby to cause the latter relay to restore shortly thereafter, it being of the slow-to-release type. Upon restoring the start relay R940 interrupts, at the contacts 941, the previously mentioned circuit for maintaining operated the start relay R930 in order to cause the latter relay to restore shortly thereafter, it being of the slow-to-release type.

Reconsidering the operation of the repeater and trunk selector 500, and now assuming that when the first select relay R510 is operated that the first trunk 480 is tested as being idle, in this event, battery potential appears upon the control conductor C483 of the trunk 480. Specifically, battery potential is applied by way of the upper winding of the seize relay R430 in the toll line circuit 250 and the contacts 318 and 374 to the control conductor C483 of the trunk 480; whereby a series circuit, also including the contacts 513, 523, 534 and 656, is completed for energizing the upper winding of the seize relay R430 and the lower winding of the test relay R560; whereby the test relay R560 operates sufficiently fast to prevent operation of the second select relay R520. Upon operating, the test relay R560 interrupts, at the contacts 560, the previously traced circuit for operating the second select relay R520 in order positively to prevent the latter relay from operating shortly following operation of the first select relay R510. Also the test relay R560 completes, at the contacts 567, a multiple holding circuit, including the contacts 555, 538, 528 and 516, for maintaining operated the first select relay R510. Also the test relay R560 completes, at the contacts 566 and 569, a path including the contacts 681, 658, 652, 534, 523 and 513, for applying direct ground potential to the control conductor C483 of the trunk 480 in order to energize the upper winding of the seize relay R430 in the toll line circuit 250, effecting operation of the latter relay. Further, the test relay R560 completes, at the contacts 569, a direct holding circuit, including the contacts 562, 658 and 681 for energizing the upper winding thereof; and interrupts, at the contacts 568, the previously traced circuit for maintaining operated the start select relay R655 in order to cause the latter relay to restore shortly thereafter, it being of the slow-to-release type. Further, the test relay R560 interrupts, at the contacts 561 and 564, the previously traced connection bridging the upper winding of the answer relay R640 across the line conductors C492 and C491 of the trunk 490; and completes, at the contacts 562, a circuit, also including the contacts 511 and 512 of the operated first select relay R510, for bridging the upper winding of the answer relay R640 across the line conductors C481 and C482 of the trunk 480.

When the upper winding of the answer relay R640 in the repeater and trunk selector 500 is thus bridged across the line conductors C481 and C482 of the trunk 480, there is completed a series loop circuit energizing the windings of the line relays R330 and R410 in the toll line circuit 250 and the upper winding of the answer relay R640; whereby the line relays mentioned operate; however, the answer relay R640 does not operate as it is of the differential type. This loop circuit extends from ground by way of the winding of the line relay R410, the contacts 315, the conductor C227, the upper right-hand winding of the repeating coil RC223, the conductor C225 and the contacts 464 to the line conductor C482 of the trunk 480; and from battery potential by way of the winding of the line relay R330, the contacts 314, the conductor C226, the upper left-hand winding of the repeating coil RC223, the conductor C224 and the contacts 462 to the line conductor C481 of the trunk 480. Upon operating the line relay R330 effects operation of the hold relay R350; the latter relay effects operation of the time release relay R370; and the latter relay effects operation of the time release relay R340; all in the manner previously explained. Upon operating the time release relay R370 interrupts, at the contacts 374, the previously traced circuit for energizing the upper winding of the seize relay R430 in order to cause the latter relay to restore shortly thereafter since it is of the slow-to-release type. When the seize relay R430 operated, it effected operation of the start relay R450; and the latter relay effected operation of the start relay R445; all in the manner previously explained. Also upon operating the time release relay R370 completes, at the contacts 375, a path for applying ground potential to the control conductor C483 of the trunk 480, thereby to complete a holding circuit, also including the contacts 513, 523, 534 and 566, for energizing the upper winding of the test relay R560 in the repeater and trunk selector 500 subsequent to the restoration of the start select relay R655. Also upon operating, the line relay R330 effects operation of the supervisory relay R240, which latter relay controls the contacts 243 and 244 in order to retain restored the signal relay R230 in the toll line circuit 250 and to effect operation of the signal relay R215 in the toll line circuit 210; all in the manner previously described. Upon operating the signal relay R215 completes, at the contacts 216, the previously traced circuit for illuminating the supervisory lamp L205 at the switchboard 200 in order to indicate to the operator thereat that a call is waiting to be answered on the toll line circuit 210.

Upon restoring the start select relay R655 in the repeater and trunk selector 500 interrupts, at the contacts 658, the original holding circuit for energizing the upper winding of the test relay R560; interrupts, at the contacts 657, the original circuit for operating the cut-off relay R630 and for energizing in multiple the lower winding of the answer relay R640; and interrupts, at the contacts 659, the original circuit for maintaining operated the start relay R670 and R680. However, at this time the cut-off relay R630 is retained in its operated position by virtue of the operated test relay R560 over a holding circuit, including the contacts 567 and 635; and the start relays R670 and R680 are retained in their operated positions by virtue of the operated test relay R560 over a holding circuit, including the contacts 561', 637 and 642. The operator at the switchboard 200 answers the call by connecting to the conductors C201, C202 and C203 extending therefrom to the toll line circuit 210; whereby the simplex pulse relay R210 is operated in order to control the contacts 211 and 212; whereby the signal relay R215 in the toll line circuit 210 is retained in its operated position and the signal relay R230 in the toll line circuit 250 is operated. Upon operating the signal relay R230 effects operation of the pulse relay R260; and the latter relay effects operation of the hold relay R360. Upon operating the hold relay R360 completes, at the contacts 362, a circuit, including the contacts 263, 342, 411 and 441, for operating the reverse battery relay R460. Upon operating the reverse battery relay R460 completes, at the contacts 465, a holding circuit, including the contacts 342, 362 and 263, for energizing the winding thereof; and reverses, at the contacts 461, 462, 463 and 464, the polarity of the trunk 480 with respect to the line relays R330 and R410 in the toll line circuit 250; whereby the upper winding of the answer relay R640 in the repeater and trunk selector 500 is poled to operate. Upon operating, the answer relay R640 completes, at the contacts 641, a circuit, including the contacts 637 and 561'; for energizing the lower winding of the reverse battery relay R540; whereby the latter relay operates. Upon operating the reverse battery relay R540 completes, at the contacts 545, a holding circuit, including the contacts 635 and 567, for energizing the upper winding thereof; and interrupts, at the contacts 547, the previously traced path for connecting ground potential by way of the winding of the release relay R570 to the simplex conductor C691. Also the reverse battery relay R540 completes, at the contacts 546, a circuit, including the contacts 683 and 639, for connecting ground potential by way of the winding of the simplex relay R660 to the simplex conductor C691; whereby the winding of the simplex relay R660 in the repeater and trunk selector 500 is energized in series with the upper and lower windings of the simplex relay R820 in the trunk circuit 700 and also the resistor 815; whereby the simplex relay R820 operates but the simplex relay R660 does not operate as it is of the marginal type and will not operate in series with the resistor 815. Upon operating the simplex relay R820 interrupts, at the contacts 822, the previously traced circuit for energizing in series the upper and lower winding of the seize relay R920 in order to cause the latter relay to restore shortly thereafter, it being of the slow-to-release type. Also the simplex relay R820 completes, at the contacts 823, a circuit for operating the hold relay R830; which latter relay upon operating, completes, at the contacts 832, a circuit, including the contacts 823, 845 and 867, for operating the control relay R860. Also the hold relay R830 completes, at the contacts 833, a holding circuit, including the contacts 847 and 952, for maintaining operated the time release relay R840; and completes, at the contacts 834, a multiple holding circuit, including the contacts 724 and 714, for maintaining operated the ringdown relay R720. Further the hold relay R830 interrupts, at the contacts 836, the previously traced connection between the timer conductor C938 and the winding of the timer relay R950. Upon operating the control relay R860 completes, at the contacts 866, a holding circuit, including the contacts 853, 833 and 952, for energizing the winding thereof.

Upon restoring the seize relay R920 interrupts, at the contacts 922, the circuit for maintaining operated the start relay R940 in order to cause the latter relay to restore shortly thereafter, it being of the slow-to-release type. Upon restoring the start relay R940 interrupts, at the contacts 941, the circuit for maintaining operated the start relay R930 in order to cause the latter relay to restore shortly thereafter, it being of the slow-to-release type. Also upon restoring, the seize relay R920 completes, at the contacts 921, a path, including condenser 912 and the contacts 863, 931 and 932, for bridging the lower winding of the tone relay R910 across the right-hand windings of the repeating coil RC760. Upon restoring the start relay R930 interrupts, at the contacts 931 and 932, the above traced path for bridging the lower winding of the tone relay R910 across the right-hand windings of the repeating coil RC760. During the short-time interval that the lower winding of the tone relay R910 is thus bridged across the right-hand windings of the repeating coil RC760, any tone current induced therein from the lower winding thereof is transmitted to the called switchboard 200 in the toll office 10; which operation is without effect at this time since no tone current traverses the circuit for energizing the upper winding of the tone relay R910 by way of the control conductor C973 of the trunk 970.

Also when the seize relay R430 in the toll line circuit 250 restores, it effects the restoration of the start relay R450 shortly thereafter; which latter relay effects restoration of the start relay R445 shortly thereafter. During the short-time interval that the start relay R445 occupies its operated position, after the seize relay R430 is restored, the upper winding of the tone relay R440 is bridged across the conductors C224 and C225 extending to the upper windings of the repeating coil RC223; however, without effect at this time since the toll line circuit 250 has not been seized via the trunk 470. At this time an established connection is completed between the calling subscriber substation T2 in the sub-office 40 and the called switchboard 200 in the toll office 10; which connection is routed via the link 884, the trunk 970, the trunk circuit 700, the trunk line 600, the repeater and trunk selector 500, the trunk 480, the toll line circuit 250, the toll line 220, and the toll line circuit 210. It is noted that since the reverse battery relay R360 in the trunk circuit 700 is not operated incident to answering the call at the called switchboard 200 that no charge is assessed against the calling subscriber substation T2. The subscriber at the calling subscriber substation T2 then advises the operator at the called switchboard 200 concerning the extension of the present connection or the required service.

After the operator at the switchboard 200 has extended the established connection, should it be necessary for the subscriber at the calling subscriber substation T2 again to signal the operator at the switchboard 200, this may be accomplished by operating the switchhook at the calling subscriber substation T2. More particularly, when the subscriber at the calling subscriber substation T2 operates the switchhook thereat, the line relays R740 and R870 in the trunk circuit 700 follow over the loop circuit extending to the calling subscriber substation T2. Each time the line relay R740 restores, it interrupts, at the contacts 741, the previously traced path for connecting battery potential by way of the upper and lower windings of the simplex relay R820 and the resistor 815 to the simplex conductor C717; and completes, at the contacts 742, a path, including the contacts 712, 722 and 753 for applying battery potential by way of the upper winding of the simplex relay R820 to the simplex conductor C717. Each time the line relay R740 reoperates, it recompletes, at the contacts 741, the previously traced high resistance path; and interrupts, at the contacts 742, the previously traced low resistance path. Accordingly, the simplex relay R820 in the trunk circuit 700 is retained in its operated position; and each time the low resistance path is completed, the simplex relay R660 in the repeater and trunk selector 500 operates as it is of the marginal type; whereby the simplex relay R660 follows. Each time the simplex relay R660 operates and then restores, it interrupts and then recompletes, at the contacts 661, the circuit for maintaining operated the supervisory relay R650; whereby the latter relay follows. Each time the supervisory relay R650 restores and then reoperates, it interrupts and then recompletes, at the contacts 651, the previously traced loop circuit for energizing in series the upper winding of the answer relay R640 in the repeater and trunk selector 500; and the windings of the line relays R330 and R410 in the toll line circuit 250; whereby the line relays mentioned follow. Each time the line relay R330 restores and then reoperates, it interrupts and then recompletes, at the contacts 332, the circuit for maintaining operated the supervisory relay R240; whereby the latter relay follows. Each time the supervisory relay R240 restores and then reoperates, it controls the contacts 244 and 243; whereby the signal relay R230 in the toll line circuit 250 is retained in its operated position and the signal relay R215 in the toll line circuit 210 follows. As the signal relay R215 restores and then reoperates, it completes and then interrupts, at the contacts 216, the previously traced path for flashing the supervisory lamp L205 at the switchboard 200, thereby to render to the operator thereat recall supervision. The operator at the switchboard 200 then re-enters the connection and converses with the subscriber at the calling subscriber substation T2.

At the conclusion of the established connection, when the subscriber at the calling subscriber substation T2 in the sub-office 40 disconnects, the loop circuit extending by way of the link 834 and the trunk 970 to the trunk circuit 700 is interrupted; whereby the line relays R740 and R870 in the trunk circuit 700 restore. Upon restoring, the line relay R740 interrupts, at the contacts 741, the high resistance path; and completes, at the contacts 742, the low resistance path; whereby the simplex relay R820 in the trunk circuit 700 is retained in its operated position and the simplex relay R660 in the repeater and trunk circuit 500 operates as previously explained. Also the line relay R740 interrupts, at the contacts 743, the previously mentioned circuit for maintaining operated the hold relay R810; whereby the latter relay restores shortly thereafter, it being of the slow-to-release type. Upon restoring the hold relay R810 recompletes, at the contacts 813, the previously traced connection, including the contacts 835, 848 and 954, between the timer conductor C938 and the winding of the timer relay R950.

Upon operating the simplex relay R660 in the repeater and trunk selector 500 effects the restoration of the supervisory relay R650; and the latter relay effects the restoration of the answer relay R640 in the repeater and trunk selector 500 and the line relays R330 and R410 in the toll line circuit 250 in the manner previously explained. Upon restoring the line relay R330 interrupts, at the contacts 331, the previously mentioned circuit for maintaining operated the hold relay R350 in order to cause the latter relay to restore shortly thereafter, it being of the slow-to-release type. Upon restoring, the hold relay R350 recompletes, at the contacts 354, the previously traced connection between the timer conductor C427 and the winding of the timer relay R420. Also upon restoring, the line relay R330 effects the restoration of the supervisory relay R240; whereby the latter relay controls the contacts 244 and 243 in order to maintain operated the signal relay R230 in the toll line circuit 250 and to effect restoration of the signal relay R215 in the toll line circuit 210. Upon restoring, the signal relay R215 interrupts, at the contacts 216, the previously mentioned circuit for illuminating the supervisory lamp L205 at the switchboard 200 in order to render to the operator thereat disconnect supervision.

When the operator at the switchboard 200 then disconnects the cord circuit thereat from the conductors C201, C202 and C203 extending to the toll line circuit 210, the circuit for maintaining operated the simplex pulse relay R210 is interrupted. Upon restoring the simplex pulse relay R210 controls the contacts 212 and 211 to retain the signal relay R215 in the toll line circuit 210 in its restored position and to effect restoration of the signal relay R230 in the toll line circuit 250. Upon restoring, the signal relay R230 effects the restoration of the pulse relay R260; and the latter relay effects the restoration of the hold relay R360 shortly thereafter. Upon restoring the hold relay R360 effects the restoration of the time release relay R370 and the control relay R320; and upon restoring the time release relay R370 effects the restoration of the time release relay R340 shortly thereafter; all in the manner previously explained. Also upon restoring the pulse relay R260 interrupts, at the contacts 263, the previously traced circuit for maintaining operated the reverse battery relay R460. Upon restoring the time release relay R370 interrupts, at the contacts 373, the previously traced path for applying ground potential by way of the lower winding of the tone relay R440 to the control conductor C473 of the trunk 470, thereby again to mark the trunk 470 as idle to the links 390, etc., having access thereto. Further, the time release relay R370 interrupts, at the contacts 375, the previously mentioned path for applying ground potential to the control conductor C483 of the trunk 480, thereby again to mark the trunk 480 as idle to the repeater and trunk selector 500; and to interrupt the previously traced holding circuit for energizing the upper winding of the test relay R560. The test relay R560 in the repeater and trunk selector 500 then restores, interrupting, at the contacts 567, the holding circuit for maintaining operated the first select relay R510, as well as the multiple holding circuit for maintaining operated the cut-off relay R630 and for energizing the lower winding of the answer relay R640 and finally the holding circuit for energizing the upper winding of the reverse battery relay R540; whereby the first select relay R510, the cut-off relay R630, and the reverse battery relay R540 restore. Also upon restoring the cut-off relay R630 interrupts, at the contacts 631', the previously completed alternate path, including the contacts 586 and 615, for applying ground potential to the control conductor C493 of the trunk 490, thereby again to mark the trunk 490 as idle to the links 390, etc., having access thereto. Further, upon restoring the test relay R560 interrupts, at the contacts 561', the previously traced holding circuit for energizing in series the winding of the start relay R670 and the upper winding of the start relay R680, thereby to cause the start relay R680 to restore immediately and the start relay R670 to restore shortly thereafter as it is of the slow-to-release type. Further, upon restoring, the reverse battery relay R540 interrupts, at the contacts 546, the previously traced path for applying ground potential by way of the winding of the simplex relay R660 to the simplex conductor C691, thereby to cause restoration of the simplex relay R660 in the repeater and trunk selector 500 and the simplex relay R820 in the trunk circuit 700. Finally, upon restoring the cut-off relay R630 recompletes, at the contacts 630, the previously traced connection between the winding of the ring-down relay R665 and the simplex conductor C691.

Upon restoring, the simplex relay R820 in the trunk circuit 700 interrupts, at the contacts 823, the circuit for maintaining operated the hold relay R830, thereby to cause the latter relay to restore shortly thereafter. Upon restoring, the hold relay R830 interrupts, at the contacts 834, the holding circuit for maintaining operated the ring-down relay R720; and interrupts, at the contacts 833, the holding circuit for maintaining operated the time release relay R840 and the multiple circuit for maintaining operated the control relay R860 in order to cause the latter relay to restore shortly thereafter, it being of the slow-to-release type. Upon restoring, the time release relay R840 interrupts, at the contacts 842, the previously traced path for applying ground potential by way of the upper winding of the tone relay R910 to the control conductor C973 of the trunk 970, thereby to effect the restoration of the tone relay R910 and the release of the link 884. When the link 884 is thus released, the line circuit 882 is operated in order again to mark the subscriber line 881 extending to the subscriber substation T2 as idle to the links 884, etc., having access thereto. At this time the established connection between the calling subscriber substation T2 in the sub-office 40 and the called switchboard 200 in the toll office 10 is released and all of the apparatus involved therein is completely released and available for further use.

Reconsidering the extension of the connection from the calling subscriber substation T2 in the sub-office 40 to the called switchboard 200 in the toll office 10, it is again noted that when the operator at the switchboard 200 answers the call, operation of the hold relay R350 in the toll line circuit 250 is brought about in order to arrest the previously described timing operation between the time 425 and the timer relay R420, as explained in Sect. 5. Thus, it will be understood that in the event the operator at the switchboard 200 delays answering the call for the predetermined time interval mentioned, the timer relay R420 in the toll line circuit 250 is operated, and after the additional time interval mentioned, the toll line circuit 250 is released, as explained in Sect. 5. When the toll line circuit 250 is thus released under the control of the timer 425, ground potential is removed from the control conductor C483 of the trunk 480, thereby to bring about the release of the repeater and trunk selector 500 in the manner previously explained.

Also in the conjunction, it is pointed out that when the operator at the switchboard 200 in the toll office 10 answers the call, that the simplex relay R820 in the trunk circuit 700 is operated in order to effect operation of the hold relay R830; whereby the latter relay, upon operating, interrupts, at the contacts 836, the previously traced connection between the timer conductor C938 and the winding of the timer relay R950. Thus, it will be understood that in the event the operator at the switchboard 200 delays answering the call for the predetermined time interval mentioned, the timer relay R950 in the trunk circuit 700 will be operated under the control of the timer 936. Upon operating the timer relay R950 completes, at the contacts 953, a holding circuit, including the contacts 836, 814 and 848, for energizing the winding thereof; and interrupts, at the contacts 954, the previously traced original circuit for operating the timer relay R950. Also the timer relay R950 completes, at the contacts 951, an alternative holding circuit, including the contacts 812 and the grounded timer conductor C937, for maintaining operated the time release relay R840; and interrupts, at the contacts 952, the previously traced original circuit for operating the time release relay R840. After an additional time interval, the timer 936 operates to remove ground potential from the timer conductor C937, thereby to interrupt the holding circuit for maintaining operated the time release relay R840. Upon restoring the time release relay R840 interrupts, at the contacts 842, the previously traced path for applying ground potential by way of the upper winding of the tone relay R910 to the control conductor C973 in order to cause the tone relay R910 to restore and to effect the release of the link 884. When the link 884 is thus released, the line circuit 882 operates in order to lock out of service the subscriber line 881 extending to the calling subscriber substation T2. Subsequently, when the subscriber at the calling subscriber substation T2 disconnects, the line circuit 882 is controlled in order again to place the subscriber line 881 in service and to mark it as idle to the links 884, etc., having access thereto.

When the link 884 is thus released, the loop circuit for maintaining operated the line relays R740 and R870 in the trunk circuit 700 is interrupted. Upon restoring the line relay R740 effects the restoration of the hold relay R810 shortly thereafter; which latter relay interrupts, at the contacts 811, the holding circuit for maintaining operated the ring-down relay R720. At this time the trunk circuit 700 is completely released.

Again considering the established connection from the calling subscriber substation T2 in the sub-office 40 to the called switchboard 200 in the toll office 10, it is noted that when the subscriber at the calling subscriber substation T2 disconnects, the line relays R740 and R870 in the trunk circuit 700 restore; upon restoring the line relay R740 effects the restoration of the hold relay R810 shortly thereafter, and upon restoring the hold relay R810 recompletes, at the contacts 813, an alternative connection including the contacts 835, 848, and 954, between the timer conductor C938 and the winding of the timer relay R950. Accordingly, in the event the operator, upon receiving disconnect supervision in the manner previously explained, does not disconnect within the predetermined time interval, the timer relay R950 is operated under the control of the timer 936. After an additional time interval the timer 936 operates to remove the application of ground potential from the timer conductor C937 in order to bring about the restoration of the time release relay R840 and the consequent release of the trunk circuit 700 and the link 884; all in the manner previously described.

Also in this conjunction when the subscriber at the calling subscriber substation T2 disconnects, the line relays R330 and R410 in the toll line circuit 250 restore; upon restoring, the line relay R330 effects the restoration of the hold relay R350 shortly thereafter; and upon restoring the hold relay R350 recompletes, at the contacts 354, the alternative connection between the timer conductor C427 and the winding of the timer relay R420. Accordingly, in the event the operator at the switchboard 200 does not disconnect within the predetermined time interval mentioned, the timer relay R420 is operated. After the additional time interval mentioned, the timer 423 brings about the restoration of the time release relay R370 and the consequent release of the toll line circuit 250; all in the manner explained in Sect. 5. When the toll line circuit 250 is thus released, the repeater and trunk selector 500 is thus released in the manner explained above. Subsequently, when the operator at the switchboard 200 disconnects, the toll line circuits 210 and 250 are completely released as explained in Sect. 5.

As previously explained, when the subscriber at the calling subscriber substation T2 in the sub-office 40 dials the single digit 0 in order to extend the call to the called switchboard 200 in the toll office 10, the connector of the link 884 first tests the idle or busy condition of the trunk 970 extending to the toll line circuit and then tests the idle or busy condition of the trunk 890 extending to the trunk selector and digit sender 1400 in the event that the trunk 970 is tested as being busy. Now assuming that the connector of the link 884 selects the trunk 890 extending to the trunk selector and digit sender 1400 and tests it as being idle, the trunk 890 being marked as idle by the absence of ground potential upon the control conductor C893 thereof. The link 884 seizes the trunk 890 completing a loop circuit from the calling subscriber substation T2 to the line relay R1475 in the trunk selector and digit sender 1400. This loop circuit extends from ground potential by way of the contacts 1453 to the line conductor C892 of the trunk 890; and from battery potential by way of the winding of the line relay R1475 and the contacts 1451 to the line conductor C891 of the trunk 890; whereby the line relay R1475 operates shortly thereafter, it being of the slow-to-operate type. Upon operating the line relay R1475 completes, at the contacts 1476, a circuit, including the contacts 1441', for operating the start relay R1490. Upon operating, the start relay R1490 completes, at the contacts 1495, a path for applying ground potential to the control conductor C893 of the trunk 890, thereby to retain operated the link 884 and to mark the trunk 890 as busy to the other links 884, etc. Also the start relay R1490 completes, at the contacts 1496, a circuit, including the contacts 1484, the wiper 1402 of the send switch 1401 and the engaged home contact in the associated contact bank, for operating the control relay R1480. Upon operating the control relay R1480 completes, at the contacts 1483, a holding circuit, including the contacts 1456 and 1495, for energizing the winding thereof; and interrupts, at the contacts 1484, the previously traced original circuit for operating the control relay R1480. Also the control relay R1480 completes, at the contacts 1481, a path, including the contacts 1492, for applying ground potential to one terminal of the upper winding of the test relay R1440. Also the start relay R1490 completes, at the contacts 1494, a circuit, including the contacts 1433, 1427, and 1417, for operating the first select relay R1410. Upon operating the first select relay R1410 completes, at the contacts 1416, a substantially identical holding circuit for energizing the winding thereof; and interrupts, at the contacts 1417, the original circuit for energizing the winding thereof. Also the first select relay R1410 completes, at the contacts 1413, a connection, including the contacts 1423, between the control conductor C1383 of the first trunk 1380 and the other terminal of the upper winding of the test relay R1440; whereby the idle or busy condition of the first trunk 1380 is tested. In the event the first trunk 1380 is busy at this time, ground potential appears upon the control conductor C1383 thereof, completing a path for short-circuiting the upper winding of the test relay R1440; on the other hand in the event the first trunk 1380 is idle at this time, battery potential apears upon the control conductor C1383 thereof completing a circuit for energizing the upper winding of the test relay R1440. First assuming that the first trunk 1380 is busy at this time, the upper winding of the test relay R1440 is short-circuited; whereby the first select relay R1410 completes, at the contacts 1415, a circuit, including the contacts 1448, 1482 and 1493 for operating the second select relay R1420. Upon operating the second select relay R1420 completes, at the contacts 1426, a holding circuit, including the contacts 1433 and 1494, for energizing the winding thereof; and interrupts, at the contacts 1427, the previously traced holding circuit for maintaining operated the first select relay R1410. Also the second select relay R1420 completes, at the contacts 1424, a connection between the control conductor of the second trunk and the upper winding of the test relay R1440; whereby the second trunk mentioned is tested. Assuming that the second trunk is also busy, upon operating the second select relay R1420 completes, at the contacts 1425, a circuit, including the contacts 1414, 1448, 1482 and 1493, for energizing the winding of the busy relay R1430 in order to cause the latter relay to operate shortly thereafter, it being of the slow-to-operate type. Upon operating, the busy relay R1430 completes, at the contacts 1432, a holding circuit, including the contacts 1494, for energizing the winding thereof; and interrupts, at the contacts 1433, the holding circuit for maintaining operated the second select relay R1420. Also the busy relay R1430 completes, at the contacts 1431, a connection, including the contacts 1451, and the condenser 1419, between the busy tone conductor C1418 and the line conductor C891 of the trunk 890; whereby busy tone current is returned over the link 884 and the subscriber line 881 to the calling subscriber substation T2 indicating the all-trunks-busy condition noted. Thereupon the subscriber at the calling subscriber substation T2 disconnects in order to effect the release of the link 884 and the trunk selector and digit sender 1400 in a manner substantially identical to that explained hereinafter.

Now assuming that when the first select relay R1410 in the trunk selector and digit sender 1400 operated that the first trunk 1380 extending to the trunk circuit 1200 was tested as idle, the series circuit is completed for energizing the upper winding of the test relay R1440; which circuit includes the contacts 1481, 1492 and 1413, the control conductor C1383 of the trunk 1380, the contacts 1233 and 1259', and the lower winding of the seize relay R1340 in the trunk circuit 1200 connected to battery potential. When this series circuit is completed, the test relay R1440 operates sufficiently fast to prevent operation of the second select relay R1420 by interrupting, at the contacts 1448, the previously traced circuit for operating the second select relay R1420. Also the test relay R1440 completes, at the contacts 1447, a holding circuit, including the contacts 1482 and 1493, for energizing the lower winding thereof; and completes, at the contacts 1449, a holding circuit, including the contacts 1433, 1427 and 1416, for maintaining operated the first select relay R1410. Also the test relay R1440 completes, at the contacts 1447 and 1446, a path, including the contacts 1482, 1493, 1423 and 1413, for applying direct ground potential to the control conductor C1383 of the trunk 1380, thereby to complete a circuit substantially identical to that previously traced for energizing the lower winding of the seize relay R1340 in the trunk circuit 1200 causing the latter relay to operate. Further, the test relay R1440 interrupts, at the contacts 1441', the previously traced circuit for maintaining operated the start relay R1490 in order to cause the latter relay to restore shortly thereafter, it being of the slow-to-release type. Further, the test relay R1440 completes, at the contacts 1441 and 1443, a bridge connection, including the contacts 1411 and 1412 and the contacts 1471 and 1477 and the resistor 1496', across the line conductors C1381 and C1382 of the trunk 1380; thereby to complete a loop circuit, also including the right-hand windings of the repeating coil RC1275 and the contacts 1252 and 1254, for energizing in series the windings of the line relays R1210 and R1380 in the trunk circuit 1200; whereupon the line relays mentioned operate. Further, the test relay R1440 completes, at the contacts 1445, a connection, including the contacts 1423 and 1413 between the control conductor C893 of the trunk 890 and the control conductor C1383 of the trunk 1380.

Upon operating the line relay R1210 in the trunk circuit 1200 completes, at the contacts 1211, a circuit for operating the hold relay R1370; and upon operating the hold relay R1370 completes, at the contacts 1372, a circuit, including the contacts 1334, for operating the time release relay R1230. Upon operating the time release relay R1230 interrupts, at the contacts 1233, the previously traced circuit for energizing the lower winding of the seize relay R1340 in order to cause the latter relay to restore shortly thereafter, it being of the slow-to-release type. Also the time release relay R1230 completes, at the contacts 1234, a direct path for applying ground potential to the control conductor C1383 of the trunk 1380; whereby ground potential is applied to the control conductor C893 of the trunk 890 in order to maintain the link 884 in its operated position. Also upon operating the hold relay R1370 interrupts, at the contacts 1374, the previously traced path for applying ground potential by way of the winding of the simplex relay R1270 to the simplex conductor C1276; and completes, at the contacts 1373, a circuit, including the contacts 1213, for applying battery potential by way of the winding of the supervisory relay R1220 to the simplex conductor C1276; whereby the supervisory relay R1220 in the trunk circuit 1200 is operated in series with the simplex relay R1170 in the trunk circuit 1000 in the manner previously explained. Upon operating the simplex relay R1170 in the trunk circuit 1000 brings about operation of the hold relay R1160 and the consequent operation of the switch relay R1150; whereupon the upper winding of the answer relay R1140 is bridged across the line conductors C1181 and C1182 of the trunk 1180, thereby to seize the incoming connector 300.

Upon restoring, the start relay R1490 in the trunk selector and digit sender 1400 completes, at the contacts 1491, a circuit, including the contacts 1481, 1457 and 1486, for operating the pulse relay R1455. The pulse relay R1455 completes, at the contacts 1456', a holding circuit, including the contacts 1496, for energizing the winding thereof; and completes, at the contacts 1457', a circuit for operating the pulse relay R1460. Upon operating, the pulse relay R1460 completes, at the contacts 1462, a circuit for operating the pulse relay R1485. Upon operating, the pulse relay R1485 interrupts, at the contacts 1486, the holding circuit for maintaining operated the pulse relay R1455. Upon restoring the pulse relay R1455 effects the restoration of the pulse relay R1460; whereby the latter relay effects the restoration of the pulse relay R1485; whereupon the latter relay effects the reoperation of the pulse relay R1455. Accordingly, the pulse relays R1455, R1460 and R1485 operate cyclically. Each time the pulse relay R1460 operates and then restores, it completes and then interrupts, at the contacts 1463, a circuit for operating the magnet M1494 of the send switch 1401; whereby the latter magnet operates and restores in order to drive the wipers 1402 and 1403 of the send switch 1401 one step in the clockwise direction away from their home positions. Also each time the pulse relay R1460 operates and then restores, it interrupts and then recompletes, at the contacts 1461, a path in multiple to the contacts 1471 connected across the line conductors C1381 and C1382 of the trunk 1380.

After the wipers noted of the end switch 1401 have been driven, for example, three steps in the clockwise direction away from their home positions, the wiper 1403 engages the multiple in the associated contact bank terminating the conductor C1406; whereby there is completed a circuit, also including the contacts 1485, 1449 and 1476, for operating the shunt relay R1470. Upon operating, the shunt relay R1470 interrupts, at the contacts 1471, the multiple path with respect to the contacts 1461 of the pulse relay R1460. Accordingly, subsequent operations and restorations of the pulse relay R1460 cause impulses, at the contacts 1461 thereof, to be transmitted over the line conductors C1381 and C1382 of the trunk 1380 to the line relays R1210 and R1380 in the trunk circuit 1200. The wiper 1403 of the send switch 1401 is driven eleven additional steps in the clockwise direction by the pulsing relays R1460, etc.; whereupon it disengages the thirteenth contact in the associated contact bank interrupting the previously traced circuit for maintaining operated the shunt relay R1470. Accordingly, the shunt relay R1470 again restores to recomplete, at the contacts 1471, the bridge path across the line conductors C1381 and C1382 of the trunk 1380, thereby disabling the contacts 1461 of the pulse relay R1460. In view of the foregoing, it will be understood that the shunt relay R1460 is initially restored when operation of the pulsing relays R1460, etc., is initiated; that the shunt relay R1470 is operated and remains operated during ten cycles of operation of the pulse relay R1460; and that the shunt relay R1470 is again restored. Thus the pulse relay R1460 is effective automatically to transmit ten impulses comprising the digit 0 over the line conductors C1381 and C1382 to the line relays R1210 and R1380 in the trunk circuit 1200. The line relay R1210 repeats, at the contacts 1213, the impulses of the digit 0 over the simplex conductor C1276 to the simplex relay R1170 in the trunk circuit 1000; whereby the latter relay repeats, at the contacts 1171, the impulses of the digit 0 over the line conductors C1181 and C1182 of the trunk 1180 to the incoming connector 300; all in the manner previously explained. The incoming connector 300 responds to the digit 0 in order to select an idle trunk in the associated fourth level, such, for example, as the trunk 480 extending to the toll line circuit 250; all in the manner previously explained. When the trunk 480 is thus seized by the incoming connector 470, the toll line circuit 250 operates to control the toll line circuit 210 over the toll line 220 in order to bring about illumination of the supervisory lamp L205 at the called switchboard 200 in the toll office 10 in order to indicate to the operator thereat the presence of a call waiting to be answered on the toll line circuit 210.

Operation of the pulse relays R1460, etc., in the trunk selector and digit sender 1400 continues until the wiper 1403 of the send switch 1401 engages, for example, the twenty-first contact in the associated contact bank terminating the cut-off conductor C1407; whereby there is completed, a circuit, including the contacts 1476, 1440 and 1485 for energizing the upper winding of the cut-off relay R1450 in order to cause the latter relay to operate. Upon operating the cut-off relay R1450 completes, at the contacts 1455, a holding circuit, including the grounded control conductor C893 of the trunk 890, for energizing the lower winding thereof; and interrupts, at the contacts 1451 and 1453, the previously traced circuit for maintaining operated the line relay R1475. Also the cut-off relay R1450 completes, at the contacts 1452 and 1454, a direct connection between the line conductors C891 and C892 of the trunk 890 and the line conductors C1381 and C1382 of the trunk 1380; the last-mentioned connection also including the contacts 1441 and 1443 of the operated test relay R1440 and the contacts 1411 and 1412 of the operated first select relay R1410; whereby a direct loop circuit is completed between the calling subscriber substation T2 and the line relays R1210 and R1380 in the trunk circuit 1200. Upon restoring the line relay R1475 interrupts, at the contacts 1477, the previously traced bridge connection across the line conductors C1381 and C1382 of the trunk 1380; and interrupts, at the contacts 1476, the previously traced original circuit for energizing the upper winding of the cut-off relay R1450. Also the cut-off relay R1450 interrupts, at the contacts 1456, the holding circuit, including the contacts 1483 and the grounded control conductor C893, for maintaining operated the control relay R1480. Further, the cut-off relay R1450 interrupts, at the contacts 1457, the circuit for operating the pulse relay R1455, thereby to arrest further operation of the pulse relays R1455, R1460 and R1465. Upon restoring the control relay R1480 completes, at the contacts 1484, a path for applying ground potential to the wiper 1402 of the send switch 1401, thereby to complete a buzz circuit, including the contacts 1495, for operating the magnet M1404. The magnet M1404 operates buzzer fashion to drive the wipers noted thereof back into their home positions; whereupon the wiper 1402 disengages the twenty-fourth contact in the associated contact bank interrupting the buzz circuit for operating the magnet M1404.

When the operator at the switchboard 200 answers the call by connecting a cord circuit to the conductors C201, C202 and C203 extending to the toll line circuit 210, the simplex pulse relay R210 in the toll line circuit 210 operates in order to bring about operation of the signal relay R230 in the toll line circuit 250; whereby the pulse relay R260, the hold relay R360, and the control relay R320 and the reverse battery relay R460 are operated in the manner previously explained. Upon operating the reverse battery relay R460 reverses the polarity of the trunk 480 and consequently through the incoming connector 300, the polarity of the trunk 1180; whereby the upper winding of the answer relay R1140 in the trunk circuit 1000 is energized and poled to operate. Upon operating the answer relay R1140 effects operation of the control relay R1050; whereby the latter relay completes a local holding circuit for maintaining operated the simplex relay R1170, disconnects the simplex relay R1170 from the simplex conductor C1176, and connects the winding of the supervisory relay R1120 to the simplex conductor C1176. Accordingly, at this time the winding of the supervisory relay R1120 in the trunk circuit 1000 is short-circuited in series relation with the winding of the supervisory relay R1220 in the trunk circuit 1200; whereupon the latter relay restores. Upon restoring the supervisory relay R1220 effects operation of the cut-off relay R1320 and the reverse battery relay R1310; operation of the reverse battery relay R1310 being without effect since the cell is routed via the non-reverse trunk 1380.

At this time the established connection is completed between the calling subscriber substation T2 in the sub-office 40 and the called switchboard 200 in the toll office 10; which connection is routed via the link 894, the trunk 890, the trunk selector and digit sender 1400, the trunk 1380, the trunk circuit 1200, the trunk 1190, the trunk circuit 1000, the trunk 1180, the incoming connector 300, the trunk 480, the toll line circuit 250, the toll line 220, and the toll line circuit 210. It is noted that since the polarity of the trunk 1380 is not reversed incident to answering the call at the called switchboard 200 that no charge is assessed against the calling subscriber substation T2. The subscriber at the calling subscriber substation T2 then advises the operator at the called switchboard 200 concerning the extension of the present connection or the required service.

After the operator at the switchboard 200 has extended the established connection, should it be necessary for the subscriber at the calling subscriber substation T2 again to signal the operator at the switchboard 200, this may be accomplished by operating the switchhook at the calling subscriber substation T2. More particularly, when the subscriber at the calling subscriber substation T2 operates the switchhook thereat, the line relays R1210 and R1380 in the trunk circuit 1200 follow. When the line relay R1210 restores, it interrupts, at the contacts 1213, the previously traced path, including the contacts 1373, for applying battery potential by way of the winding of the supervisory relay R1220 to the simplex conductor C1276; interrupts, at the contacts 1211, the circuit for maintaining operated the hold relay R1370; and completes, at the contacts 1212, a path, including the contacts 1323 and 1373, for applying ground potential by way of the lower winding of the control relay R1350 to the simplex conductor C1276. The hold relay R1370 being of the slow-to-release type, does not restore immediately; and when ground potential is applied by way of the lower winding of the control relay R1350, to the simplex conductor C1276, the lower winding of the control relay R1350 is energized causing the latter relay to operate. Upon operating the control relay R1350 completes, at the contacts 1351, an alternative holding circuit, including the contacts 1372 and 1334, for maintaining operated the hold relay R1370. Also at this time, the lower winding of the control relay R1350 in the trunk circuit 1200 is energized in series with the winding of the supervisory relay R1220 in the trunk circuit 1000, thereby to cause the latter relay to operate. Upon operating the supervisory relay R1220 interrupts, at the contacts 1122, the previously traced local holding circuit, including the resistor 1125 and the contacts 1150 and 1054, for maintaining operated the simplex relay R1170. Upon restoring the simplex relay R1170 interrupts, at the contacts 1173, the circuit for maintaining operated the hold relay R1160; and interrupts, at the contacts 1171, the loop circuit extending via the trunk 1180, the incoming connector 300 and the trunk 480 to the line relays R330 and R410 in the toll line circuit 250 in order to cause the latter relays mentioned to restore.

When the line relays R1210 and R1380 in the trunk circuit 1200 then reoperate, the line relay R1210 recompletes, at the contacts 1211, the circuit for maintaining operated the hold relay R1370; and interrupts, at the contacts 1212, the previously traced circuit for energizing the lower winding of the control relay R1350 in the trunk circuit 1200 in series with the winding of the supervisory relay R1120 in the trunk circuit 1000; whereby the relays mentioned restore. Upon restoring, the control relay R1350 interrupts, at the contacts 1351, the alternative holding circuit for maintaining operated the hold relay R1370; and upon restoring the supervisory relay R1120 recompletes, at the contacts 1122, the previously traced local holding circuit for operating the simplex relay R1170. Upon reoperating the simplex relay R1170 recompletes, at the contacts 1173, the circuit for maintaining operated the hold relay R1160; and recompleted, at the contacts 1171, the previously traced loop circuit for operating the line relays R330 and R410 in the toll line circuit 250. Accordingly, in the manner described above, the line relays R330 and R410 in the toll line circuit 250 follow the switchhook at the calling subscriber substation T2. Each time the line relay R330 restores and then reoperates, it effects restoration and subsequent reoperation of the supervisory relay R240; whereby the latter relay controls the contacts 244 and 243, maintaining operated the signal relay R230 in the toll line circuit 250 and effecting restoration and subsequent reoperation of the signal relay R215 in the toll line circuit 210. Each time the signal relay R215 restores and then reoperates, it interrupts and then recompletes, at the contacts 216, the circuit for illuminating the supervisory lamp L205 at the switchboard 200; whereby the supervisory lamp L205 is flashed, rendering to the operator at the switchboard 200 recall supervision. The operator at the switchboard 200 then re-enters the connection and converses with the subscriber at the calling subscriber substation T2.

At the conclusion of the established connection, when the subscriber at the calling subscriber substation T2 disconnects the loop circuit extending by way of the link 884, the trunk 890, the trunk selector and digit sender 1400, and the trunk 1380 to the trunk circuit 1200 is interrupted, causing the line relays R1210 and R1380 in the trunk circuit 1200 to restore. Upon restoring the line relay R1210 effects operation of the control relay R1350 in the trunk circuit 1200 and the supervisory relay R1120 in the trunk circuit 1000 in the manner previously explained. Upon operating the supervisory relay R1120 effects restoration of the simplex relay R1170; and upon restoring the simplex relay R1170 interrupts, at the contacts 1171, the loop circuit extending via the trunk 1180, the incoming connector 300 and the trunk 480 to the toll line circuit 250 in order to effect restoration of the line relays R330 and R410 in the toll line circuit 250. Also upon restoring, the simplex relay R1170 interrupts, at the contacts 1173, the circuit for maintaining operated the hold relay R1160; whereby the latter relay restores shortly thereafter, it being of the slow-to-release type. Upon restoring the hold relay R1160 interrupts, at the contacts 1162, the circuit for maintaining operated the switch relay R1150 and the multiple circuit for energizing the lower winding of the answer relay R1140; whereby the answer relay R1140 is restored at this time. Upon restoring the answer relay R1140 interrupts, at the contacts 1142, the circuit for energizing the upper winding of the control relay R1050 in order to cause the latter relay to restore. Upon restoring, the control relay R1050 interrupts, at the contacts 1052, the previously traced path for applying battery potential by way of the winding of the supervisory relay R1120 to the simplex conductor C1176; and completes, at the contacts 1053, the previously traced original path for applying ground potential by way of the winding of the simplex relay R1170 to the simplex conductor C1176. Accordingly, the winding of the supervisory relay R1120 in the trunk circuit 1000 is de-energized causing the latter relay to restore; and the winding of the simplex relay R1170 in the trunk circuit 1000 is short-circuited in series with the lower winding of the control relay R1350 in the trunk circuit 1200 in order to prevent operation of the simplex relay R1170 and to cause restoration of the control relay R1350. Upon restoring the control relay R1350 interrupts, at the contacts 1351, the alternative holding circuit for maintaining operated the hold relay R1370, thereby to cause the latter relay to restore shortly thereafter, it being of the slow-to-release type.

Upon restoring, the hold relay R1370 recompletes, at the contacts 1374, the previously traced original path for shortcircuiting the winding of the simplex relay R1270 in the trunk circuit 1200 in series with the winding of the simplex relay R1170 in the trunk circuit 1000; whereby the relays mentioned remain in their restored positions. Also upon restoring, the hold relay R1370 interrupts, at the contacts 1372, the circuit for maintaining operated the time release relay R1230; and upon restoring, the time release relay R1230 interrupts, at the contacts 1231, the multiple circuits for maintaining operated the cut-off relay R1320 and the reverse battery relay R1310. Also upon restoring, the time release relay R1230 interrupts, at the contacts 1234, the previously mentioned path for applying ground potential to the control conductor C1383 of the trunk 1380, thereby to bring about the release of the link 884; whereupon the line circuit 882 is controlled in order to mark the subscriber line 881 extending to the subscriber substation T2 as idle to the links 884, etc., having access thereto. Also when ground potential is removed from the control conductor C1383 of the trunk 1380, the previously traced holding circuit for energizing the lower winding of the test relay R1440 in the trunk selector and digit sender 1400 is interrupted, causing the latter relay to restore. Upon restoring, the test relay R1440 interrupts, at the contacts 1449, the previously traced holding circuit for maintaining operated the first select relay R1410; and interrupts, at the contacts 1441, 1443 and 1445, the previously traced connection between the trunk 890 and the trunk 1380. Also at this time, ground potential is removed from the control conductor C893 of the trunk 890 in order to mark the trunk 890 as idle to the links 884, etc., having access thereto; and to interrupt the holding circuit for energizing the lower winding of the cut-off relay R1450; whereupon the latter relay restores.

Also upon restoring, the switch relay R1150 in the trunk circuit 1000 interrupts, at the contacts 1158, the previously traced path for applying battery potential by way of the upper and lower windings of the seize relay R1040 to the control conductor C1183 of the trunk 1180, thereby to effect the restoration of the seize relay R1040 shortly thereafter, it being of the slow-to-release type. Also upon restoring the switch relay R1150 interrupts, at the contacts 1159, the previously traced path for applying ground potential to the control conductor C403 of the trunk 400, thereby to mark the trunk 400 as idle to the links 390, etc., having access thereto. When the line relay R330 in the toll line circuit 250 restores, it brings about the restoration of the hold relay R350 shortly thereafter; and also restoration of the supervisory relay R240. Upon restoring, the supervisory relay R240 controls the contacts 244 and 243, thereby to maintain operated the signal relay R230 in the toll line circuit 250 and to effect restoration of the signal relay R215 in the toll line circuit 210. Upon restoring the signal relay R215 interrupts, at the contacts 216, the circuit for illuminating the supervisory lamp L205 at the switchboard 200 in order to render to the operator thereat, disconnect supervision.

When the operator at the switchboard 200 then disconnects from the conductors C201, C202 and C203 extending the toll line circuit 210, the simplex pulse relay R210 is restored to control the contacts 212 and 211; whereby the signal relay R215 in the toll line circuit 210 is retained in its restored position and the signal relay R230 in the toll line circuit 250 is restored. Upon restoring the signal relay R230 effects restoration of the pulse relay R260; whereby the hold relay R360 is restored shortly thereafter in order to effect the restoration of the time release relay R370 and the control relay R320. Upon restoring the time release relay R370 effects the restoration of the time release relay R340 shortly thereafter. Also upon restoring the pulse relay R260 effects the restoration of the reverse battery relay R460. Finally, upon restoring the time release relay 8370 interrupts, at the contacts 375, the previously mentioned path for applying ground potential to the control conductor C483 of the trunk 480 in order to effect the release of the incoming connector 300 and to mark the trunk 480 as idle to the incoming connectors 300, etc., having access thereto; and interrupts, at the contacts 373, the path for applying ground potential by way of the lower winding of the tone relay R440 to the control conductor C473 of the trunk 470 in order to mark the trunk 470 as idle to the links 390, etc., having access thereto. At this time the established connection between the calling subscriber substation T2 in the sub-office 40 and the called switchboard 200 in the toll office 10 is released and all of the apparatus involved therein is completely released and available for further use.

Reconsidering the extension of the connection from the calling subscriber substation T2 in the sub-office 40 to the called switchboard 200 in the toll office 10, it is again noted that when the operator at the switchboard 200 answers the call, operation of the hold relay R360 in the toll line circuit 250 is brought about in order to arrest the previously described timing operation between the timer 425 and the timer relay R420, as explained in Sect. 5. Thus it will be understood that in the event the operator at the switchboard 200 delays answering the call for the predetermined time interval mentioned, the timer relay R420 in the toll line circuit 250 is operated, and after the additional time interval mentioned, the toll line circuit 250 is released, as explained in Sect. 5. When the toll line circuit 250 is thus released, under the control of the timer 425, ground potential is removed from the control conductor C483 of the trunk 480, thereby to bring about the release of the incoming connector 300 in the manner previously explained.

Also in this conjunction, it is pointed out that when the operator at the switchboard 200 in the toll office 10 answers the call, the reverse battery relay R460 in the toll line circuit 250 is operated, as a consequence of the operation of the hold relay R360 as previously explained; and operation of the reverse battery relay R460 effects operation of the answer relay R1140 in the trunk circuit 1000. Upon operating the answer relay R1140 effects operation of the control relay R1050; whereby the previously traced local holding circuit for maintaining operated the simplex relay R1170 is completed; and the winding of the supervisory relay R1120 in the trunk circuit 1000 is short-circuited in series with the winding of the supervisory relay R1220 in the trunk circuit 1200 causing the latter relay to restore. Upon restoring the supervisory relay R1220 effects operation of the cut-off relay R1320; whereupon the latter relay disconnects the winding of the timer relay R1330 from the associated timer, not shown. Thus it will be understood that in the event the operator at the switchboard 200 delays answering the call for the predetermined time interval mentioned, the timer relay R1330 in the trunk circuit 1200 will be operated under the control of the associated timer, not shown; and after the additional time interval mentioned, the trunk circuit 1200 is released as explained in Sect. 12. When the trunk circuit 1200 is thus released, it effects the release of the trunk circuit 1000, the trunk selector and digit sender 1400, as well as the link 884. When the link 884 is thus released, the line circuit 882 operates in order to lock out of service the subscriber line 881 extending to the calling subscriber substation T2. Subsequently, when the subscriber at the calling subscriber substation T2 disconnects, the line circuit 882 is controlled in order again to place the subscriber line 881 in service and to mark it as idle to the links 884, etc., having access thereto.

Again considering the established connection from the calling subscriber substation T2 in the sub-office 40 to the called switchboard 200 in the toll office 10, it is noted that when the subscriber at the calling subscriber substation T2 disconnects, the trunk circuit 1000, the trunk circuit 1200, the trunk selector and digit sender 1400, and the link 884 are released in the manner previously explained; and the line relays R330 and R410 in the trunk circuit 250 are restored. Upon restoring the line relay R330 in the toll line circuit 250 effects the restoration of the hold relay R360 shortly thereafter; whereby the latter relay recompletes, at the contacts 366, the previously traced alternative connection between the winding of the time relay R420 and the timer 425. Also at this time, disconnect supervision is returned to the operator at the called switchboard 200. In the event the operator at the switchboard 200 delays disconnection for the predetermined time interval mentioned and the additional time interval mentioned, the toll line circuit 250 is timed out and released in the manner explained in Sect. 5 in order to effect the release of the incoming connector 300. Subsequently, when the operator at the switchboard 200 disconnects, the toll line circuit 210 and the toll line circuit 250 are completely released as explained in Sect. 5.

*Sect. 14.—A call from a subscriber substation in the sub-office to the switchboard in the magneto office*

First assuming that a call is to be extended from a calling subscriber substation, such, for example, as the subscriber substation T2 in the sub-office 40 to the switchboard 286 in the magneto office 20, the subscriber at the calling subscriber substation T2 initiates the call; whereby the link 884 may be taken for use in the manner previously explained. The subscriber at the calling subscriber substation T2 then dials the prefix digit 9; whereby the connector of the link 884 may select the trunk 1380 extending to the trunk circuit 1200 in order to cause the trunk circuit 1200 to seize the trunk circuit 1000 over the trunk 1190 and to cause the trunk circuit 1000 to seize the incoming connector 300 over the trunk 1180; all in the manner described in Sect. 12. The subscriber at the calling subscriber substation T2 then dials the digit 7; whereby the incoming connector 300 may select the trunk 391 extending to the trunk line circuit 281; whereby the trunk line circuit 281 operates in order to seize the trunk line circuit 285 over the trunk line 280; whereupon the call is routed to the switchboard 286 in the magneto office 20; all in the manner described in Sect. 6. The operator at the switchboard 286 answers the call; whereby the trunk line circuit 285 controls the trunk line circuit 281 over the trunk line 280 in order to cause the trunk line circuit 281 to govern the trunk circuit 1000 over the trunk 391, the incoming connector 300 and the trunk 1180; whereupon the trunk circuit 1000 governs the trunk circuit 1200 over the trunk 1190 in order to complete the connection between the calling subscriber substation T2 in the sub-office 40 and the called switchboard 286 in the magneto office 20 in a manner substantially identical to that previously explained. The subscriber at the calling subscriber substation T2 advises the operator at the switchboard 286 concerning the extension of the connection; whereby the subsequent extension of the connection and the ultimate release thereof are the same as previously described in Sect. 13.

In conjunction with the extension of the connection from the calling subscriber substation T2 in the sub-office 40 to the switchboard 286 in the magneto office 20, it is noted that the call is routed via the non-reverse trunk 1380 to the trunk circuit 1200; whereby no charge is assessed against the calling subscriber substation T2 when the call is answered at the switchboard 286.

*Sect. 15.—Conclusions*

In view of the foregoing, it is apparent that there has been provided a telephone system comprising a C. A. X network, including improved facilities for setting up connections among the various offices, for supervising certain of the connections from the switchboards in the toll office and in the magneto office, and for effecting automatic release of the apparatus in the event the operators at the switchboards in the toll office and in the magneto office are otherwise engaged and unable to answer and release the calls and the connections promptly. Also the tandem office comprises automatic switching apparatus of the restricted service type, preventing the setting up of certain unauthorized connections without the aid of the operator at the switchboard in the toll office.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system including a switchboard, a line accessible to said switchboard, a line circuit terminating said line, an outgoing trunk extending from said line circuit, and automatic switching apparatus accessible to said outgoing trunk; said line circuit comprising a signal relay, a supervisory relay, a control relay, means for operating said signal relay, means whereby said last-mentioned means is responsive to seizure of said line at said switchboard, means for operating said supervisory relay, means for connecting said switching apparatus to said outgoing trunk, means whereby said last-two-mentioned means are responsive to operation of said signal relay, means for returning a delay signal over said line to said switchboard, means whereby said last-mentioned means is responsive to operation of said supervisory relay, means for operating said control relay, means whereby said last-mentioned means is responsive to connection of said switching apparatus to said outgoing trunk, means for restoring said supervisory relay, means whereby said last-mentioned means is responsive to operation of said control relay, means for cutting-off the return of said delay signal over said line to said switchboard, means whereby said last-mentioned means is responsive to restoration of said supervisory relay, means controllable from said switchboard for selectively operating said switching apparatus over said line and said outgoing trunk, means for reoperating said supervisory relay, means whereby said last-mentioned means is responsive to completion of the connection over said outgoing trunk, means for returning an answer signal over said line to said switchboard, and means whereby said last-mentioned means is responsive to reoperation of said supervisory relay.

2. In a telephone system including a switchboard, a line accessible to said switchboard, a line circuit terminating said line, an incoming trunk extending to said line circuit, an outgoing trunk extending from said line circuit, and automatic switching apparatus having access to said incoming trunk and accessible to said outgoing trunk; said line circuit comprising a signal relay, a supervisory relay, a control relay, a line relay, an answer relay, means for operating said signal relay, means whereby said last-mentioned means is responsive to seizure of said line at said switchboard, means for operating said supervisory relay, means for connecting said switching apparatus to said outgoing trunk, means whereby said last-two-mentioned means are responsive to operation of said signal relay, means for returning a delay signal over said line to said switchboard, means whereby said last-mentioned means is responsive to operation of said supervisory relay, means for operating said control relay, means whereby said last-mentioned means is responsive to connection of said switching apparatus to said outgoing trunk, means for restoring said supervisory relay, means whereby said last-mentioned means is responsive to operation of said control relay, means for cutting-off the return of said delay signal over said line to said switchboard, means whereby said last-mentioned means is responsive to restoration of said supervisory relay, means then controllable from said switchboard for selectively operating said switching apparatus over said line and said outgoing trunk, means for operating said answer relay, means whereby said last-mentioned means is responsive to completion of the connection over said outgoing trunk, means for reoperating said supervisory relay, means whereby said last-mentioned means is responsive to operation of said answer relay, means for returning an answer signal over said line to said switchboard, means whereby said last-mentioned means is responsive to reoperation of said supervisory relay, means for operating said line relay, means whereby said last-mentioned means is responsive to seizure of said incoming trunk by said switching apparatus, additional means for operating said supervisory relay, means whereby said additional means is responsive to operation of said line relay, means for transmitting a call signal over said line to said switchboard, and means whereby said last-mentioned means is responsive to said last-mentioned operation of said supervisory relay.

3. In a telephone system including a switchboard, a line accessible to said switchboard, a line circuit terminating said line, an incoming trunk extending to said line circuit, an outgoing trunk extending from said line circuit, and automatic switching apparatus having access to said incoming trunk and accessible to said outgoing trunk; said line circuit comprising a signal relay, a supervisory relay, a control relay, a line relay, an answer relay, means for operating said signal relay, means whereby said last-mentioned means is responsive to seizure of said line at said switchboard, means for operating said supervisory relay, means for connecting said switching apparatus to said outgoing trunk, means whereby said last-two-mentioned means are responsive to operation of said signal relay, means for returning a delay signal over said line to said switchboard, means whereby said last-mentioned means is responsive to operation of said supervisory relay, means for operating said control relay, means whereby said last-mentioned means is responsive to connection of said switching apparatus to said outgoing trunk, means for restoring said supervisory relay, means whereby said last-mentioned means is responsive to operation of said control relay, means for cutting-off the return of said delay signal over said line to said switchboard, means whereby said last-mentioned means is responsive to restoration of said supervisory relay, means then controllable from said switchboard for selectively operating said switching apparatus over said line and said outgoing trunk, means for operating said answer relay, means whereby said last-mentioned means is responsive to completion of the connection over said outgoing trunk, means for reoperating said supervisory relay, means whereby said last-mentioned means is responsive to operation of said answer relay, means for returning an answer signal over said line to said switchboard, means whereby said last-mentioned means is responsive to reoperation of said supervisory relay, means for operating said line relay, means whereby said last-mentioned means is responsive to seizure of said incoming trunk by said switching apparatus, means for initiating the return of a ring-back signal over said incoming trunk, additional means for operating said supervisory relay, means whereby said last-two-mentioned means are responsive to operation of said line relay, means for transmitting a call signal over said line to said switchboard, means whereby said last-mentioned means is responsive to said last-mentioned operation of said supervisory relay, means for operating said signal relay, means whereby said last-mentioned means is responsive to answering at said switchboard, means for operating said control relay, means whereby said last-mentioned means is responsive to operation of said signal relay, means for arresting the return of said ring-back signal over said incoming trunk, and means whereby said last-mentioned means is responsive to operation of said control relay.

4. In a telephone system including a switchboard, a line accessible to said switchboard, said switchboard being provided with answer apparatus operative to answer a call on said line, a line circuit terminating said line, a trunk extending to said line circuit, automatic switching apparatus having access to said trunk, a station having access to said switching apparatus, and means controllable from said station for seizing said switching apparatus and for operating it to select said trunk; said line circuit comprising a line relay, a supervisory relay, a signal relay, a control relay, means for operating said line relay, means whereby said last-mentioned means is responsive to the selection of said trunk by said switching apparatus, means for initiating the return of a ring-back signal over said trunk, means for operating said supervisory relay, means whereby said last-two-mentioned means are responsive to operation of said line relay, means for transmitting a call signal over said line to said switchboard, means whereby said last-mentioned means is responsive to operation of said supervisory relay, means for operating said signal relay, means whereby said last-mentioned means is responsive to operation of said answer apparatus at said switchboard, means for operating said control relay, means whereby said last-mentioned means is responsive to operation of said signal relay, means for arresting the return of said ring-back signal over said trunk, and means whereby said last-mentioned means is responsive to operation of said control relay.

5. In a telephone system including a switchboard, a line accessible to said switchboard, said switchboard being provided with answer apparatus operative to answer a call on said line, a line circuit terminating said line, a trunk extending to said line circuit, automatic switching apparatus having access to said trunk, a station having access to said switching apparatus, and means controllable from said station for seizing said switching apparatus and for operating it to select said trunk; said trunk comprising a pair of line conductors and a control conductor; said switching apparatus being operative to transmit a tone signal over said control conductor indicative of the class of said station; said line circuit comprising a line relay, a supervisory relay, a signal relay, a control relay, a tone relay provided with two coupled windings, means for operating said line relay, means whereby said last-mentioned means is responsive to the selection of said trunk by said switching apparatus, means for initiating the return of a ring-back signal over the line conductors of said trunk, means for connecting the control conductor of said trunk to one of the windings of said tone relay, means for operating said supervisory relay, means whereby said last-three-mentioned means are responsive to operation of said line relay, means for transmitting a call signal over said line to said switchboard, means whereby said last-mentioned means is responsive to operation of said supervisory relay, means for operating said signal relay, means whereby said last-mentioned means is responsive to operation of said answer apparatus at said switchboard, means for operating said control relay, means whereby said last-mentioned means is responsive to operation of said signal relay, means for connecting the other winding of said tone relay to said line, means whereby said last-mentioned means is responsive to operation of said control relay, means for disconnecting said other winding of said tone relay from said line, means whereby said last-mentioned means is responsive to operation of said signal relay, means for arresting the return of said ring-back signal over said trunk, and means whereby said last-mentioned means is responsive to operation of said control relay.

6. In a telephone system including a switchboard, a line accessible to said switchboard, said switchboard being provided with answer apparatus operative to answer a call on said line, a line circuit terminating said line, a trunk extending to said line circuit, automatic switching apparatus having access to said trunk, a station having access to said switching apparatus, and means controllable from said station for seizing said switching apparatus and for operating it to select said trunk; said line circuit comprising a line relay, a supervisory relay, a signal relay, a hold relay, means for operating said line relay, means whereby said last-mentioned means is responsive to the selection of said trunk by said switching apparatus, a timer, means for initiating a timing operation of said timer, means for operating said supervisory relay, means whereby said last two-mentioned means are responsive to operation of said line relay, means for transmitting a call signal over said line to said switchboard, means whereby said last-mentioned means is responsive to operation of said supervisory relay, means for operating said signal relay, means whereby said last-mentioned means is responsive to operation of said answer apparatus at said switchboard, means for operating said hold relay, means whereby said last-mentioned means is responsive to operation of said signal relay, means for arresting said timing operation of said timer, means whereby said last-mentioned means is responsive to operation of said hold relay, means for releasing said switching apparatus, means for locking said station out-of-service, and means whereby said last-two-mentioned means are responsive to a predetermined timing operation of said timer.

7. In a telephone system including a switchboard, a line accessible to said switchboard, said switchboard being provided with answer apparatus operative to answer a call on said line, a line circuit terminating said line, a trunk extending to said line circuit, automatic switching apparatus having access to said trunk, a station having access to said switching apparatus, and means controllable from said station for seizing said switching apparatus and for operating it to select said trunk; said line circuit comprising a line relay, a supervisory relay, a signal relay, a control relay, a first hold relay, a second hold relay, means for operating said line relay, means whereby said last-mentioned means is responsive to the selection of said trunk by said switching apparatus, means for operating said first hold relay, means whereby said last-mentioned means is responsive to operation of said line relay, a timer, means for initiating the return of a ring-back signal over said trunk, means for initiating a timing operation of said timer, means whereby said last-two-mentioned means are responsive to operation of said first hold relay, means for operating said supervisory relay, means whereby said last-mentioned means is responsive to operation of said line relay, means for transmitting a call signal over said line to said switchboard, means whereby said last-mentioned means is responsive to operation of said supervisory relay, means for operating said signal relay, means whereby said last-mentioned means is responsive to operation of said answer apparatus at said switchboard, means for operating said second hold relay, means whereby said last-mentioned means is responsive to operation of said signal relay, means for operating said control relay, means whereby said last-mentioned means is responsive to operation of said second hold relay, means for arresting the return of said ring-back signal over said trunk, means whereby said last-mentioned means is responsive to operation of said control relay, means for arresting said timing operation of said timer, means whereby said last-mentioned means is responsive to operation of said second hold relay, means for releasing said switching apparatus, means for locking said station out-of-service, and means whereby said last-two-mentioned means are responsive to a predetermined timing operation of said timer.

8. In a telephone system including a switchboard, a line accessible to said switchboard, said switchboard being provided with answer apparatus operative to answer a call on said line, a line circuit terminating said line, a trunk extending to said line circuit, automatic switching apparatus having access of said trunk, a station having access to said switching apparatus, and means controllable from said station for seizing said switching apparatus and for operating it to select said trunk; said line circuit comprising a line relay, a supervisory relay, a signal relay, a control relay, a hold relay, means for operating said line relay, means whereby said last-mentioned means is responsive to the selection of said trunk by said switching apparatus, means for operating said hold relay, means whereby said last-mentioned means is responsive to operation of said line relay, means for initiating the return of a ring-back signal over said trunk, means whereby said last-mentioned means is responsive to operation of said hold relay, means for operating said supervisory relay, means whereby said last-mentioned means is responsive to operation of said line relay, means for transmitting a call signal over said line to said switchboard, means whereby said last-mentioned means is responsive to operation of said supervisory relay, means for operating said signal relay, means whereby said last-mentioned means is responsive to operation of said answer apparatus at said switchboard, means for operating said control relay, means whereby said last-mentioned means is responsive to operation of said signal relay, means for arresting the return of said ring-back signal over said trunk, means whereby said last-mentioned means is responsive to operation of said control relay, means for restoring said line relay, means whereby said last-mentioned means is responsive to disconnecting at said station, means for restoring said supervisory relay, means whereby said last-mentioned means is responsive to restoration of said line relay, means for transmitting a disconnect signal over said line to said switchboard, and means whereby said last-mentioned means is responsive to restoration of said supervisory relay.

9. In a telephone system including a switchboard, a line accessible to said switchboard, said switchboard being provided with answer apparatus operative to answer a call on said line, a line circuit terminating said line, a trunk extending to said line circuit, automatic switching apparatus having access to said trunk, a station having access to said switching apparatus, and means controllable from said station for seizing said switching apparatus and for operating it to select said trunk; said line circuit comprising a line relay, a supervisory relay, a signal relay, a control relay, a hold relay, means for operating said line relay, means whereby said last-mentioned means is responsive to the selection of said trunk by said switching apparatus, means for operating said hold relay, means whereby said last-mentioned means is responsive to operation of said line relay, means for initiating the return of a ring-back signal over said trunk, means whereby said last-mentioned means is responsive to operation of said hold relay, means for operating said supervisory relay, means whereby said last-mentioned means is responsive to operation of said line relay, means for transmitting a call signal over said line to said switchboard, means whereby said last-mentioned means is responsive to operation of said supervisory relay, means for operating said signal relay, means whereby said last-mentioned means is responsive to operation of said answer apparatus at said switchboard, means for operating said control relay, means whereby said last-mentioned means is responsive to operation of said signal relay, means for arresting the return of said ring-back signal over said trunk, means whereby said last-mentioned means is responsive to operation of said control relay, means for restoring said line relay, means whereby said last-mentioned means is responsive to disconnecting at said station, means for restoring said supervisory relay, means whereby said last-mentioned means is responsive to restoration of said line relay, means for transmitting a disconnect signal over said line to said switchboard, means whereby said last-mentioned means is responsive to restoration of said supervisory relay, means for restoring said signal relay, means whereby said last-mentioned means is responsive to disconnecting at said switchboard, means for restoring said control relay, means for releasing said switching apparatus, and means whereby said last-two-mentioned means are responsive to restoration of said signal relay.

10. In a telephone system including a switchboard, a line accessible to said switchboard, said switchboard being provided with answer apparatus operative to answer a call on said line, a line circuit terminating said line, a trunk extending to said line circuit, automatic switching apparatus having access to said trunk, a station having access to said switching apparatus, and means controllable from said station for seizing said switching apparatus and for operating it to select said trunk; said line circuit comprising a line relay, a supervisory relay, a signal relay, a control relay, a first hold relay, a second hold relay, means for operating said line relay, means whereby said last-mentioned means is responsive to the selection of said trunk by said switching apparatus, means for operating first hold relay, means whereby said last-mentioned means is responsive to operation of said line relay, means for initiating the return of a ring-back signal over said trunk, means whereby said last-mentioned means is responsive to operation of said first hold relay, means for operating said supervisory relay, means whereby said last-mentioned means is responsive to operation of said line relay, means for transmitting a call signal over said line to said switchboard, means whereby said last-mentioned means is responsive to operation of said supervisory relay, means for operating said signal relay, means whereby said last-mentioned means is responsive to operation of said answer apparatus at said switchboard, means for operating said second hold relay, means whereby said last-mentioned means is responsive to operation of said signal relay, means for operating said control relay, means whereby said last-mentioned means is responsive to operation of said second hold relay, means for arresting the return of said ring-back signal over said trunk, means whereby said last-mentioned means is responsive to operation of said control relay, means for restoring said line relay, means whereby said last-mentioned means is responsive to disconnecting at said station, a timer, means for restoring said first hold relay, means whereby said last-mentioned means is responsive to restoration of said line relay, means for initiating a timing operation of said timer, means whereby said last-mentioned means is responsive to restoration of said first hold relay, means for restoring said supervisory relay, means whereby said last-mentioned means is responsive to restoration of said line relay, means for transmitting a disconnect signal over said line to said switchboard, means whereby said last-mentioned means is responsive to restoration of said supervisory relay, means for restoring said signal relay, means whereby said last-mentioned means is responsive to disconnecting at said switchboard, means for restoring said second hold relay, means whereby said last-mentioned means is responsive to restoration of said signal relay, means for restoring said control relay, means for releasing said switching apparatus, means for arresting said timing operation of said timer, means whereby said last-three-mentioned means are responsive to restoration of said second hold relay, additional means for releasing said switching apparatus, and means whereby said additional means is responsive to a predetermined timing operation of said timer.

11. In a telephone system including a switchboard, a line accessible to said switchboard, said switchboard being provided with answer apparatus operative to answer a call on said line, a line circuit terminating said line, a trunk extending to said line circuit, automatic switching apparatus having access to said trunk, a station having access to said switching apparatus, and means controllable from said station for seizing said switching apparatus and for operating it to select said trunk; said line circuit comprising a line relay, a supervisory relay, a signal relay, a control relay, a first hold relay, a second hold relay, means for operating said line relay, means whereby said last-mentioned means is responsive to the selection of said trunk by said switching apparatus, means for operating said first hold relay, means whereby said last-mentioned means is responsive to operation of said line relay, a timer, means for initiating a first timing operation of said timer, means whereby said last-mentioned means is responsive to operation of said first hold relay, means for operating said supervisory relay, means whereby said last-mentioned means is responsive to operation of said line relay, means for transmitting a call signal over said line to said switchboard, means whereby said last mentioned means is responsive to operation of said supervisory relay, means for operating said signal relay, means whereby said last-mentioned means is responsive to operation of said answer apparatus at said switchboard, means for operating said second hold relay, means whereby said last-mentioned means is responsive to operation of said signal relay, means for arresting said first timing operation of said timer, means whereby said last-mentioned means is responsive to operation of said second hold relay, means for releasing said switching apparatus, means for locking said station out-of-service, means whereby said last-two-mentioned means are responsive to said first predetermined timing operation of said timer, means for restoring said line relay, means whereby said last-mentioned means is responsive to disconnecting at said station, means for restoring said first hold relay, means whereby said last-mentioned means is responsive to restoration of said line relay, means for initiating a second timing operation of said timer, means whereby said last-mentioned means is responsive to restoration of said first hold relay, means for restoring said supervisory relay, means whereby said last-mentioned means is responsive to restoration of said line relay, means for transmitting a disconnect signal over said line to said switchboard, means whereby said last-mentioned means is responsive to restoration of said supervisory relay, means for restoring said signal relay, means whereby said last-mentioned means is responsive to disconnecting at said switchboard, means for restoring said second hold relay, means whereby said last-mentioned means is responsive to restoration of said signal relay, means for restoring said control relay, means for releasing said switching apparatus, means for arresting said second timing operation of said timer, means whereby said last-three-mentioned means are responsive to restoration of said second hold relay, additional means for releasing said switching apparatus, and means whereby said last-mentioned means is responsive to a second predetermined timing operation of said timer.

PIER BAKKER.

REFERENCES CITED

The following references are of record in the file of this patent:

UNITED STATES PATENTS

| Number | Name | Date |
| --- | --- | --- |
| 1,542,847 | Bailey | June 23, 1925 |
| 2,358,013 | Kessler | Sept. 12, 1944 |
| 2,367,634 | Wicks et al. | Jan. 16, 1945 |
| 2,415,057 | Wicks | Jan. 28, 1947 |